(12) United States Patent
Yamamichi et al.

(10) Patent No.: US 7,471,792 B2
(45) Date of Patent: Dec. 30, 2008

(54) KEY AGREEMENT SYSTEM, SHARED-KEY GENERATION APPARATUS, AND SHARED-KEY RECOVERY APPARATUS

(75) Inventors: Masato Yamamichi, deceased, late of Kadoma (JP); by Masami Yamamichi, legal representative, Ota (JP); by Satomi Yamamichi, legal representative, Ota (JP); by Keiko Yamamichi, legal representative, Maebashi (JP); Yuichi Futa, Osaka (JP); Motoji Ohmori, Hirakata (JP); Makoto Tatebayashi, Takarazuka (JP)

(73) Assignee: Panasonic Corporation, Osaka (JP)

( * ) Notice: Subject to any disclaimer, the term of this patent is extended or adjusted under 35 U.S.C. 154(b) by 650 days.

(21) Appl. No.: 10/725,102

(22) Filed: Dec. 2, 2003

(65) Prior Publication Data

US 2004/0165726 A1    Aug. 26, 2004

(30) Foreign Application Priority Data

Dec. 3, 2002  (JP)  ............................. 2002-351062
Dec. 3, 2002  (JP)  ............................. 2002-351063

(51) Int. Cl.
*H04K 1/00*   (2006.01)
*H04L 9/00*   (2006.01)
*H04L 9/28*   (2006.01)
*H04L 9/30*   (2006.01)

(52) U.S. Cl. ............................. 380/44; 380/28; 380/30; 380/286

(58) Field of Classification Search .................... 380/44
See application file for complete search history.

(56) References Cited

U.S. PATENT DOCUMENTS 5,907,618 A * 5/1999 Gennaro et al. ............. 380/286
5,937,066 A * 8/1999 Gennaro et al. ............. 380/286

(Continued)

FOREIGN PATENT DOCUMENTS

JP    2000-516733    12/2000
JP    2001-222218     8/2001

(Continued)

OTHER PUBLICATIONS

Victor Shoup, "A Proposal for an ISO standard for public key encryption (version 2.1)", Dec. 20, 2001.

(Continued)

*Primary Examiner*—Nasser G Moazzami
*Assistant Examiner*—Oscar A Louie
(74) *Attorney, Agent, or Firm*—Wenderoth, Lind & Ponack, L.L.P.

(57) ABSTRACT

Provided is a content distribution system that prevents different keys to be derived between an encryption apparatus and a decryption apparatus. A random-number generating unit 112d, in an encryption apparatus 110d, generates a random number s, and a first function unit 113d generates a functional value G(s) of the random number s, and generates a verification value a and a shared key K from the functional value G(s). An encryption unit 114d generates a first cipher text c1 of the verification value a using a public-key polynomial h, and a second function unit 115d generates a functional value H(a, c1) of the verification value a and the first cipher text c1, and a random-number mask unit 116d generates a second cipher text c2=s xor H(a,c1). A decryption unit 123d, in a decryption apparatus 120d, decrypts the first cipher text c1 using a secret-key polynomial f, to generate a decryption verification value a'. A third function unit 124d generates a functional value H(a',c1) of the decryption verification value a' and the first cipher text c1, and a random-number mask removal unit 125d generates a decryption random number s'=c2 xor H(a',c1). A fourth function unit 126d generates a hash functional value G(s') of the decryption random number s', and generates a verification value a" and a shared key K' from the functional value G(s') A comparison unit 127d outputs the shared key K' if the decryption verification value a' is equal to the verification value a".

51 Claims, 20 Drawing Sheets

U.S. PATENT DOCUMENTS 5,953,420 A * 9/1999 Matyas et al. ............... 713/171
2002/0116612 A1 8/2002 Yamamichi et al.
2003/0120929 A1 * 6/2003 Hoffstein et al. ............ 713/176

FOREIGN PATENT DOCUMENTS

| JP | 2002-252611 | 9/2002 |
|---|---|---|
| WO | 98/08323 | 2/1998 |
| WO | WO 9808323 A1 * | 2/1998 |

OTHER PUBLICATIONS

Howgrave-Graham, N. et al., "The Impact of Decryption Failures on the Security of NTRU Encryption," *International Association for Cryptologic Research*, (2003), vol. 2729, pp. 226-246.

Whyte, W. ed., "Efficient Embedded Security Standards," *Consortium for Efficient Embedded Security*, (2003), Draft Ver. 2, p. 1-78.

Lieman, D., et al., eds., "Standard Specification for Public-Key Cryptographic Techniques Based on Hard Problems Over Lattices," *Institute of Electrical and Electronics Engineers, Inc.*, (2001) Draft Ver. 2, p. 1-38.

Menezes, A., et al., *Handbook of Applied Cryptology*, (1997), ch. 12, p. 506-508, ch. 13, p. 551-552, and ch. 9, p. 359-362.

* cited by examiner

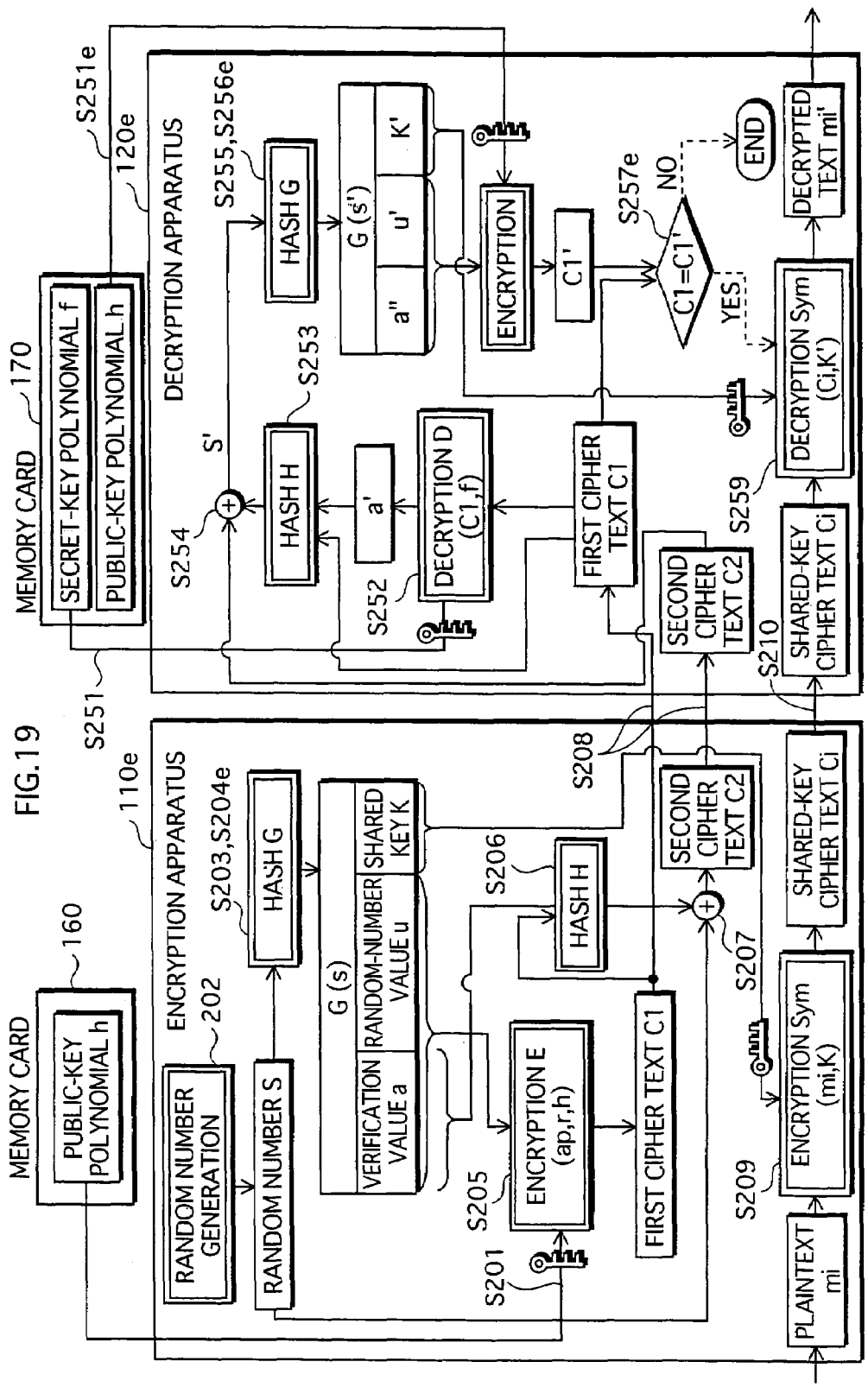

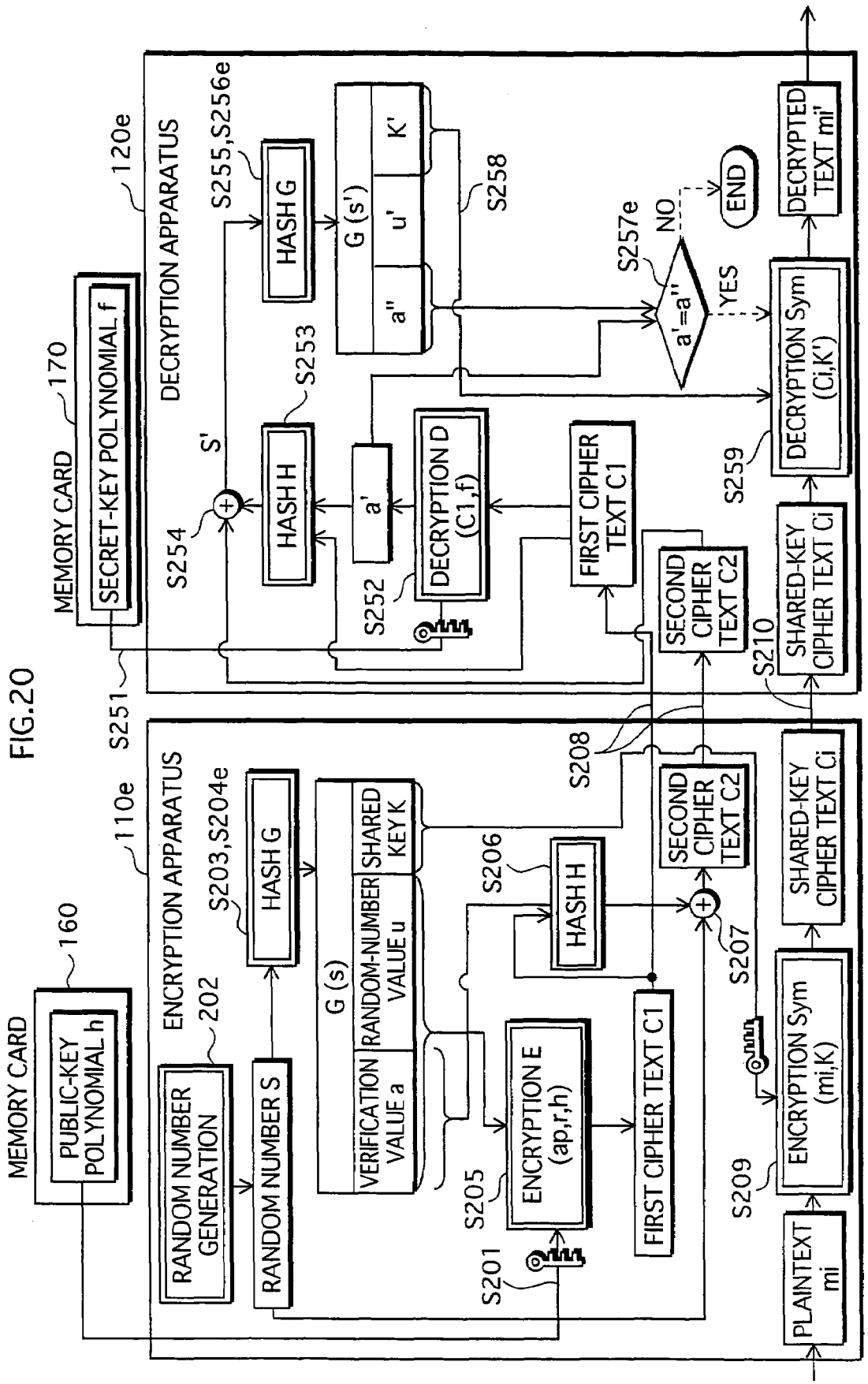

KEY AGREEMENT SYSTEM, SHARED-KEY GENERATION APPARATUS, AND SHARED-KEY RECOVERY APPARATUS

BACKGROUND OF THE INVENTION

1. Field of the Invention

The present invention relates to a cryptographic technology used as an information security technology. The present invention particularly relates to a technology of distributing a key, in secrecy.

2. Description of Related Art

Conventionally, the public-key cryptosystem has been used for transmitting information from a transmission apparatus to a reception apparatus in secrecy.

In the public-key cryptosystem, a transmission apparatus encrypts a communication content using the public key of a reception apparatus, and sends the encrypted communication content to the reception apparatus. The reception apparatus receives the encrypted communication content, and decrypts the encrypted communication content using a secret key, thereby obtaining the original communication content (e.g. refer to the non-patent reference 1).

In the year of 1996, the NTRU cryptosystem was proposed, as a public-key cryptosystem for high-speed processing (e.g. refer to the non-patent reference 2). The NTRU cryptosystem performs encryption/decryption using a polynomial operation that enables high-speed computation. The NTRU cryptosystem enables higher-speed processing using software, compared to the conventional public-key cryptosystems such as the RSA cryptosystem and the elliptic curve cryptosystem, the RSA cryptosystem performing exponentiation, and the elliptic curve cryptosystem performing scalar multiplication on a point of an elliptic curve.

In this NTRU cryptosystem, a decrypted text is generated by the processes in which the plaintext is encrypted using the public key to generate a cipher text, and then this cipher text is decrypted using the secret key. However, the mentioned processes have a possibility of yielding decrypted text that is different from the original plaintext. This phenomenon is called "decryption error". Here, the patent reference 1, for example, discloses a method of avoiding such decryption errors. In this method, a plaintext is added additional information before being encrypted, and the cipher text is transmitted together with the hash value of the plaintext.

Meanwhile, a mechanism called "key encapsulation mechanism" has recently been proposed as a new notion of the public-key cryptosystem (e.g. refer to the non-patent reference 3). This key encapsulation mechanism is an algorithm that enables distribution of a shared key between a transmission apparatus and a reception apparatus, using the public-key cryptosystem. In this mechanism, the transmission apparatus inputs a public key pk of a receiver into an encryption algorithm E, to generate a cipher text C and a shared key K, and transmits this cipher text C to the reception apparatus. Next, the reception apparatus inputs a secret key sk and the cipher text C into a decryption algorithm D, thereby obtaining the same shared key K that the transmission apparatus owns.

After both of the transmission apparatus and the reception apparatus have established therein the shared key K using the key encapsulation mechanism, as described above, the transmission apparatus encrypts the plaintext to be transmitted to the reception apparatus, according to the symmetric key cryptography and using the shared key K, to generate a cipher text, and transmits the generated cipher text to the reception apparatus. The reception apparatus, in turn, receives the cipher text, and decrypts the received cipher text according to the same symmetric key cryptography and using the shared key K, to generate decrypted text.

With the key encapsulation mechanism, a transmitter cannot take a whole liberty with creation of a shared key, and therefore is prevented from committing fraud even though information is only allowed to be distributed from the transmitter to the receiver. This is the distinctive feature that the conventional arts do not have.

As one example of the mentioned key encapsulation mechanism, an algorithm called PSEC-KEM is disclosed (e.g. the non-patent references 3 and 4). The following describes the PSEC-KEM algorithm disclosed in the non-patent reference 4.

(1) System Parameter of PSEC-KEM

The PSEC-KEM has the following system parameters:
elliptic curve: E
a point with the order of n on the elliptic curve: P
hash functions: G, H Note here that the elliptic curve, the order, and the hash functions are detailed in the non-patent reference 1, and so will not be described here.

(2) Public Key and Secret Key of PSEC-KEM

An element x is randomly selected from Zn, to generate $W=x*P$.

Here, Zn is a set comprised of $\{0, 1, \ldots, n-1\}$ and x*P signifies a point on the elliptic curve that is obtained by adding up, for x times, the point P on the elliptic curve. Note that the adding method for the point on the elliptic curve is detailed in the non-patent reference 1.

A public key pk is set as (E,P,W,n), and a secret key sk as x.

(3) Encryption of PSEC-KEM

In encryption, the public key pk is inputted into an encryption algorithm KemE detailed below, thereby outputting a shared key K and a cipher text C. The encryption algorithm KemE is specifically as follows.

Randomly generate an element s whose length is the same as the output length of the hash function H.

Generate G(s), then by dividing G(s), generates a and K. a is a bit sequence comprised of higher order bits of G(s), and K is a bit sequence comprised of the rest of the bits. Here, G(s)=a||K holds. Since "||" is an operand representing a bit connecting, this expression represents that the bit connecting of "a" and "K" yields G(s).

Generate $R=a*P$, $Q=a*W$.

Generate v=s xor H(R||Q). Here, "xor" represents bitwise exclusive-or.

Output the shared key K and the cipher text C=(R, v).

(4) Decryption of PSEC-KEM

In decryption, the cipher text C=(R,v), the public key pk, and the secret key sk are inputted into a decryption algorithm KemD detailed below, thereby outputting a shared key K. The decryption algorithm KemD is specifically as follows.

Generate $Q=x*R$.

Generate S=v xor H(R||Q)

Generate G(s), and divide G(s) into G(s)=a||K.

See if $R=a*P$ holds. If this holds, the shared key K is outputted.

When this PSEC-KEM algorithm is applied to the cryptosystem where cryptographic communication is performed between its transmission apparatus and reception apparatus, first of all, the transmission apparatus obtains a public key pk of the reception apparatus which is a communication destination, derives a shared key K and a cipher text C by inputting the obtained public key pk into the aforementioned encryption algorithm KemE, and transmits the cipher text C to the reception apparatus.

Next, the reception apparatus receives the cipher text C from the transmission apparatus, and derives a shared key K by inputting, into the aforementioned decryption algorithm KemD, the cipher text C that is received, and a public key pk and a secret key sk that are owned by the reception apparatus. Here, the shared key K that the reception apparatus has derived is the same as that obtained by the transmission apparatus.

Greater detail is described as follows.

In the PSEC-KEM algorithm, input in the hash function is represented as (a*P||a*W). In the encryption algorithm KemE, v is generated by making the value of H(a*P||a*W) operate on the randomly generated element s.

Meanwhile, in the decryption algorithm KemD, $Q=x*R=x*(a*P)=a*(x*P)=a*W$ is obtained using $R=a*P$ and the secret key sk(=x). From this, it is possible to obtain the random element s from the encryption algorithm KemE, by making the value of H(a*P||a*W) operate on v.

Therefore, in the encryption algorithm KemE and in the decryption algorithm KemD, the same value for s can be inputted in the hash function G, thereby deriving the same shared key K. That is, the reception apparatus owning the secret key sk can derive the shared key K which is the same as that derived by the transmission apparatus.

On the contrary, other reception apparatuses that do not know about the secret key sk(=x) cannot calculate $Q=a*W(=(ax)*P)$ from $R=a*P$ even if they have obtained the public key pk and received the cipher text C. This means that these reception apparatuses cannot derive the same shared key K as that derived by the transmission apparatus.

More specifically, other reception apparatuses that do not know about the secret key sk can only use the public key pk. Therefore in calculation of the aforementioned Q, they have to use $W=x*P$ of the public key pk, instead of the secret key sk(=x). Generally, it is called a Diffie-Hellman problem on an elliptic curve, to try to solve $Q=a*W(=(ax)*P)$ from a*P and $W=x*P$. This problem is considered impossible to calculate the aforementioned Q without knowing the values for a and x (e.g. refer to the non-patent reference 5).

This means that in the PSEC-KEM algorithm, a shared key K is derived using, in the final stage, the Diffie-Hellman problem with which it is difficult to calculate a*W from a*P without using a secret key. This prevents the shared key K to be derived without knowing the secret key.

As described above, the transmission apparatus and the reception apparatus are enabled to secretly share a shared key K. As a result, data of the communication content is encrypted according to the symmetric key cryptography and using the shared key K, before being transmitted from the transmission apparatus to the reception apparatus using the secret-key cryptography.

(patent reference 1)
Japanese Laid-Open Patent application 2002-252611
(non-patent reference 1)
Tatsuaki Okamoto, Hirosuke Yamamoto "Modern cryptography", Series/Mathematics in Information Science, Sangyo-tosho, 1997 (ISBN4-7828-5353-X C3355)
(non-patent reference 2)
Jeffery Hoffstein, Jill Pipher, and Joseph H. Silverman, "NTRU: A ring based public key cryptosystem," Lecture Notes in Computer Science, 1423, pp. 267-288, Springer-Verlag, 1998.
(non-patent reference 3)
Victor Shoup, "A proposal for an ISO standard for public key encryption (version 2.1)", online, Dec. 20, 2001 (retrieved on Sep. 29, 2002 on the Internet <URL: http://shoup-.net/papers/iso-2_1.pdf>)
(non-patent reference 4)
Tatsuaki Okamoto, "Generic conversions for constructing IND-CCA2 public-key encryption in the random oracle model", online, The 5$^{th}$ Workshop on Elliptic Curve Cryptography (ECC 2001), Oct. 30, 2001
(non-patent reference 5)
Neal Koblitz, "Algebraic Aspects of Cryptography", Algorithms and Computation in Mathematics Vol. 3, pp. 132-133, Springer-Verlag, 1998

PROBLEM TO BE SOLVED BY THE INVENTION

As described above, in the conventional PSEC-KEM algorithm, the hash function H has a*P, a*W as inputs, and these a*P, a*W are calculated making use of the Diffie-Hellman problem that necessitates a secret key at the final stage, thereby deriving a shared key K. As a result, the shared key K will be only derived when the secret key is known.

However, other public-key cryptographies that do not use Diffie-Hellman problem, such as the NTRU cryptography, do not have counterparts of a*P, and a*W of the Diffie-Hellman problem. Therefore, PSEC-KEM algorithm cannot be applied to such public-key cryptographies. This further means that the NTRU cryptography that enables high-speed processing cannot perform shared-key distribution making use of PSEC-KEM algorithm that is a key encapsulation mechanism, and so there is a problem that it is impossible to perform cryptographic communication between the transmission apparatus and the reception apparatus with use of this shared key.

SUMMARY OF THE INVENTION

An object of the present invention, in view of the above-described problems, is to provide a key agreement system, a shared-key generation apparatus, a shared-key recovery apparatus, a shared-key generating method, a shared-key recovery method, a shared-key generating program, and a shared-key recovery program, which, even when using a cryptography that does not use the Diffie-Hellman problem, enable a shared key to be distributed from the shared-key generation apparatus to the shared-key recovery apparatus, in secrecy, and at the same time prevent derivation of different keys between the shared-key generation apparatus and the shared-key recovery apparatus.

So as to achieve the above-stated object, the present invention provides a key agreement system having a shared-key generation apparatus and a shared-key recovery apparatus, each apparatus establishing therein a same shared key in secrecy, where the shared-key generation apparatus includes: a seed-value generating unit operable to generate a seed value; a first shared-key generating unit operable to generate a verification value and a shared key, from the seed value; a first encryption unit operable to encrypt the verification value to generate first encryption information; a second encryption unit operable to encrypt the seed value based on the verification value, to generate second encryption information; and a transmitting unit operable to transmit the first encryption information and the second encryption information, and the shared-key recovery apparatus includes: a receiving unit operable to receive the first encryption information and the second encryption information; a first decryption unit operable to decrypt the first encryption information, to generate a first decryption verification value; a second decryption unit operable to decrypt the second encryption information based on the first decryption verification value, to generate a decryption seed value; a second shared-key generating unit operable to generate a second decryption verification value and a decryption shared key, from the decryption seed value and according to a same method as used in the first shared-key generating unit; a judging unit operable to judge, based on the first decryption verification value and the second decryption verification value, whether the decryption shared key should be outputted; and an outputting unit operable, when the judging unit has judged affirmatively, to output the decryption shared key.

According to this construction, the shared-key generation apparatus generates a verification value and a shared key from a seed value, encrypts the verification value to generate first encryption information, encrypts the seed value based on the verification value to generate second encryption information. Meanwhile the shared-key recovery apparatus decrypts the first encryption information to generate a first decryption verification value, decrypts the second encryption information based on the first decryption verification value, to generate a decryption seed value, generates a second decryption verification value and a decryption shared key from the decryption seed value, in the same method as used in the shared-key generation apparatus, and judges, based on the first decryption verification value and the second decryption verification value, whether the generated decryption shared key should be outputted. Therefore, a shared key can be distributed from the shared-key generation apparatus to the shared-key recovery apparatus, in secrecy. At the same time, there is an effect of preventing different keys to be derived between the shared-key generation apparatus and the shared-key recovery apparatus.

Here, the shared-key generation apparatus may further include: an obtaining unit operable to obtain a content; and an encryption unit operable to encrypt the obtained content using the shared key, to generate an encrypted content, the transmitting unit further transmits the encrypted content, the receiving unit further receives the encrypted content, and the shared-key recovery apparatus may further include: a decryption unit operable to decrypt the received encrypted content using the decryption shared key, to generate a decrypted content; and an outputting unit operable to output the decrypted content.

According to this construction, the shared-key generation apparatus encrypts the obtained content using the generated shared key, to generate an encrypted content, and the shared-key recovery apparatus decrypts the received encrypted content, using the decryption shared key having been outputted, to generate a decrypted content. Therefore, there is an effect that a content can be transmitted in secrecy, from the shared-key generation apparatus to the shared-key recovery apparatus.

In addition, the present invention is a shared-key generation apparatus that notifies a destination apparatus about a shared key in secrecy, the shared-key generation apparatus including: a seed-value generating unit operable to generate a seed value; a shared-key generating unit operable to generate a verification value and a shared key, from the seed value; a first encryption unit operable to encrypt the verification value to generate first encryption information; a second encryption unit operable to encrypt the seed value based on the verification value, to generate second encryption information; and a transmitting unit operable to transmit the first encryption information and the second encryption information.

According to this construction, the shared-key generation apparatus encrypts a verification value to generate first encryption information, and encrypts a seed value based on the verification value to generate second encryption information. This double encryption has an effect of further heightening security. Accordingly, an unauthorized third party cannot obtain the shared key without knowing the two kinds of encryption performed by the first and second encryption units.

Here, the seed-value generating unit may generate a random number, as the seed value.

According to this construction, the shared-key generation apparatus generates a random number, and sets the random number as the seed value. This realizes generation of a seed value which is different from another seed value that has been generated first during a series of processes as follows: generating a seed value, generating a verification value and a shared key, generating first and second encryption information, and transmitting the first and second encryption information. Accordingly, the first encryption information and the second encryption information will be different each time of transmission from the shared-key generation apparatus. Therefore, even if an unauthorized third party illegally intercepts and records the first and second encryption information, it is quite difficult for him to guess an original seed value, from the recorded first and second encryption information.

Here, the shared-key generating unit may perform a one-way function on the seed value to generate a functional value, and generate the verification value and the shared key from the functional value.

According to this construction, the verification value is generated by performing a one-way function on the seed value. Therefore, it is difficult for a third party to obtain the seed value even if he happens to know about the verification value. Therefore, it can be said practically impossible to obtain the seed value from the verification value, and further to obtain the shared key.

Here, the shared-key generating unit may perform, on the seed value, a hash function as the one-way function, to generate the functional value.

According to this construction, the one-way function is a hash function, whose computation algorithm is well-known, and which is easy to apply.

Here, the shared-key generating unit may generate the verification value by setting a part of the functional value as the verification value, and generate the shared key by setting another part of the functional value as the shared key.

According to this construction, a part of the functional value is set as the verification value, and another part of the functional value is set as the shared key. This makes it easy to generate the verification value and the shared key.

Here, the shared-key generating unit may perform a one-way function on the seed value to generate a functional value, and generate the verification value, the shared key, and a blind value, from the functional value.

According to this construction, the verification value is generated by performing a one-way function on the seed value. Therefore, it is difficult for a third party to obtain the seed value even if he happens to know about the verification value. Therefore, it can be said practically impossible to obtain the seed value from the verification value, and further to obtain the shared key.

Here, the first encryption unit may include: a public-key obtaining subunit operable to obtain a public key; and a public-key encryption subunit operable to perform a public-key encryption algorithm on the verification value, using the public key and the blind value, to generate the first encryption information. Alternatively, the first encryption unit may include: a public-key obtaining subunit operable to obtain a public key; and a public-key encryption subunit operable to perform a public-key encryption algorithm on the verification value, using the public key, to generate the first encryption information.

According to the above constructions, the first encryption unit may use a public-key cryptography in which key management is easier than in a symmetric key cryptography.

Here, the public-key encryption algorithm may conform to an NTRU cryptosystem, the public-key obtaining subunit may obtain a public-key polynomial generated according to a key-generation algorithm of the NTRU cryptosystem, as the public key, and the public-key encryption subunit may generate a verification-value polynomial from the verification value, generate a blind-value polynomial from the blind value, and encrypt the verification-value polynomial according to an encryption algorithm of the NTRU cryptosystem, using the public-key polynomial as a key, and using the blind-value polynomial to randomize the verification-value polynomial, to generate the first encryption information as a polynomial. Alternatively, the public-key encryption algorithm may conform to an NTRU cryptosystem, the public-key obtaining subunit may obtain a public-key polynomial generated according to a key-generation algorithm of the NTRU cryptosystem, as the public key, and the public-key encryption subunit may generate a verification-value polynomial from the verification value, generates a blind value, generate a blind-value polynomial from the blind value, and encrypt the verification-value polynomial according to an encryption algorithm of the NTRU cryptosystem, using the public-key polynomial as a key, and using the blind-value polynomial to randomize the verification-value polynomial, to generate the first encryption information as a polynomial.

According to these constructions, the NTRU cryptography may be adopted.

Here, the second encryption unit may perform a one-way function on the verification value to generate a functional value, and perform an encryption algorithm, on the seed value, using the functional value, to generate the second encryption information.

According to this construction, an encryption algorithm is performed on the seed value using the functional value obtained by performing a one-way function on the verification value, so as to generate the second encryption information. Therefore, an unauthorized third party cannot obtain the seed value from the second encryption information unless knowing about the one-way function and the encryption algorithm.

Here, the second encryption unit may perform bitwise exclusive-or as the encryption algorithm, on the functional value and the seed value, to generate the second encryption information.

According to this construction, the encryption algorithm is bitwise exclusive-or, which is an easy computation and has an inverse operation.

Here, the second encryption unit may perform a symmetric key encryption algorithm as the encryption algorithm, on the functional value and the seed value, to generate the second encryption information.

According to this construction, the encryption algorithm is a symmetric key encryption algorithm, which is well-known, easy to apply, and has an inverse operation.

Here, the second encryption unit may perform addition as the encryption algorithm, on the functional value and the seed value, to generate the second encryption information.

According to this construction, the encryption algorithm is addition, which is an easy computation and has an inverse operation.

Here, the second encryption unit may perform multiplication as the encryption algorithm, on the functional value and the seed value, to generate the second encryption information.

According to this construction, the encryption algorithm is multiplication, which is an easy computation and has an inverse operation.

Here, the second encryption unit may perform, on the verification value, a hash function as the one-way function, to generate the functional value.

According to this construction, the one-way function is a hash function, whose computation algorithm is well known and which is easy to apply.

Here, the second encryption unit may perform an encryption algorithm on the seed value using the verification value, to generate the second encryption information.

According to this construction, an encryption algorithm is performed on the seed value, using the verification value. This is a simple computation and is easy to apply.

Here, the second encryption unit may encrypt the seed value using the verification value and the first encryption information.

According to this construction, the seed value is encrypted using the verification value and the first encryption information. Therefore an unauthorized third party cannot obtain the seed value unless knowing about the verification value and the first encryption information, which heightens security.

Here, the second encryption unit may perform a one-way function on the verification value and the first encryption information, to generate the functional value, and perform an encryption algorithm on the seed value using the functional value, to generate the second encryption information.

According to this construction, a one-way function and an encryption algorithm is used. Therefore an unauthorized third party, even if knowing about the first and second encryption information, cannot obtain the seed value unless at least knowing about the one-way function and the encryption algorithm, which heightens security.

Here, the second encryption unit may perform bitwise exclusive-or as the encryption algorithm, on the functional value and the seed value, to generate the second encryption information.

According to this construction, the encryption algorithm is bitwise exclusive-or, which is an easy computation and has an inverse operation.

Here, the shared-key generation apparatus may further include: an obtaining unit operable to obtain a content; and an encryption unit operable to encrypt the obtained content using the shared key, to generate an encrypted content, wherein the transmitting unit further transmits the encrypted content.

According to this construction, the shared-key generation apparatus transmits a content to a destination apparatus, in secrecy.

Furthermore, the present invention is a shared-key recovery apparatus that receives a shared key from a shared-key generation apparatus in secrecy, the shared-key generation apparatus generating a seed value, generating a verification value and a shared key from the seed value, encrypting the verification value to generate first encryption information, encrypting the seed value based on the verification value to generate second encryption information, and transmitting the first encryption information and the second encryption information, the shared-key recovery apparatus including: a receiving unit operable to receive the first encryption information and the second encryption information; a first decryption unit operable to decrypt the first encryption information, to generate a first decryption verification value; a second decryption unit operable to decrypt the second encryption information based on the first decryption verification value, to generate a decryption seed value; a shared-key generating unit operable to generate a second decryption verification value and a decryption shared key, from the decryption seed value and according to a same method as used in the shared-key generation apparatus; a judging unit operable to judge, based on the first decryption verification value and the second decryption verification value, whether the decryption shared key should be outputted; and an outputting unit operable, when the judging unit has judged affirmatively, to output the decryption shared key.

According to this construction, a shared key is received from the shared-key generation apparatus, in secrecy. At the same time, this construction has an effect of preventing different shared keys to be derived between the shared-key generation apparatus and the shared-key recovery apparatus.

Here, the shared-key generation apparatus may obtain a public key, and perform a public-key encryption algorithm on the verification value, using the public key, to generate the first encryption information, and the first decryption unit may include: a secret-key obtaining subunit operable to obtain a secret key that corresponds to the public key; and a public-key decryption subunit operable to perform a public-key decryption algorithm on the first encryption information, to generate the first decryption verification value, the public-key decryption algorithm corresponding to the public-key encryption algorithm.

According to this construction, the first decryption unit uses a public-key cryptography in which key management is easier than in a symmetric key cryptography.

Here, the public-key encryption algorithm and the public-key decryption algorithm may confirm to an NTRU cryptosystem, the shared-key generation apparatus may obtain, as the public key, a public-key polynomial generated according to a key-generation algorithm of the NTRU cryptosystem, generate a verification-value polynomial from the verification value, generate a blind value, generates a blind-value polynomial from the blind value, and encrypt the verification-value polynomial according to an encryption algorithm of the NTRU cryptosystem, using the public-key polynomial as a key, and using the blind-value polynomial to randomize the verification-value polynomial, to generate the first encryption information as a polynomial, the receiving unit may receive the first encryption information as a polynomial, the secret-key obtaining subunit may obtain, as the secret key, a secret-key polynomial generated according to the key-generation algorithm of the NTRU cryptosystem, and the public-key decryption subunit may decrypt the first encryption information as a polynomial, according to a decryption algorithm corresponding to the NTRU cryptosystem's encryption algorithm, using the secret-key polynomial as a key, to generate a decryption verification-value polynomial, and generate the first decryption verification value from the decryption verification-value polynomial.

According to this construction, the NTRU cryptography may be adopted.

Here, the shared-key generation apparatus may perform a one-way function on the verification value, to generate a functional value, and perform an encryption algorithm on the seed value using the functional value, to generate the second encryption information, and the second decryption unit may perform the one-way function on the first decryption verification value, to generate a decryption functional value, and perform, on the second encryption information, a decryption algorithm corresponding to the encryption algorithm, using the decryption functional value, to generate the decryption seed value.

According to this construction, the second decryption unit adopts a two-phase computation method that uses a one-way function and a decryption algorithm. Therefore an unauthorized third party, even if knowing about the first and second encryption information, cannot obtain the seed value unless at least knowing about the one-way function and the decryption algorithm, which heightens security.

Here, the shared-key generation apparatus may perform, on the functional value and the seed value, bitwise exclusive-or as the encryption algorithm, to generate the second encryption information, and the second decryption unit may perform, on the decryption functional value and the second encryption information, bitwise exclusive-or as the decryption algorithm, to generate the decryption seed value.

According to this construction, the decryption algorithm is bitwise exclusive-or, which is an easy computation and is the inverse operation of the encryption algorithm.

Here, the shared-key generation apparatus may perform, on the functional value and the seed value, a symmetric key encryption algorithm as the encryption algorithm, to generate the second encryption information, and the second decryption unit may perform, on the decryption functional value and the second encryption information, a symmetric key decryption algorithm as the decryption algorithm, to generate the decryption seed value, the symmetric key decryption algorithm corresponding to the symmetric key encryption algorithm.

According to this construction, the decryption algorithm is a symmetric key decryption algorithm, which is well-known, easy to apply, and is the inverse operation of the encryption algorithm.

Here, the shared-key generation apparatus may perform, on the functional value and the seed value, addition as the encryption algorithm, to generate the second encryption information, and the second decryption unit may perform, on the decryption functional value and the second encryption information, subtraction as the decryption algorithm, to generate the decryption seed value.

According to this construction, the decryption algorithm is subtraction, which is an easy computation and is the inverse operation of the encryption algorithm.

Here, the shared-key generation apparatus may perform, on the functional value and the seed value, multiplication as the encryption algorithm, to generate the second encryption information, and the second decryption unit may perform, on the decryption functional value and the second encryption information, division as the decryption algorithm, to generate the decryption seed value.

According to this construction, the decryption algorithm is division, which is an easy computation and is the inverse operation of the encryption algorithm.

Here, the shared-key generation apparatus may perform, on the verification value, a hash function as the one-way function, to generate the functional value, and the second decryption unit may perform, on the first decryption verification value, the hash function as the one-way function, to generate the decryption functional value.

According to this construction, the one-way function is a hash function, whose computation algorithm is well-known and which is easy to apply.

Here, the shared-key generation apparatus may perform an encryption algorithm on the seed value using the verification value, to generate the second encryption information, and the second decryption unit may perform a decryption algorithm corresponding to the encryption algorithm, on the second encryption information using the first decryption verification value, to generate the decryption seed value.

According to this construction, the second encryption information is decrypted using the first decryption verification value, which makes computation easy.

Here, the shared-key generation apparatus may encrypt the seed value using the verification value and the first encryption information, and the second decryption unit may decrypt the second encryption information, using the first decryption verification value and the first encryption information, to generate the decryption seed value.

According to this construction, the second encryption information is decrypted using the first decryption verification value and the first encryption information. Therefore, an unauthorized third party cannot obtain the seed value unless knowing about the first decryption verification value and the first encryption information, which heightens security.

Here, the shared-key generation apparatus may perform a one-way function on the verification value and the first encryption information, to generate a functional value, and performs an encryption algorithm on the seed value, to generate the second encryption information, and the second decryption unit may perform the one-way function on the first decryption verification value and the first encryption information, to generate a decryption functional value, and perform a decryption algorithm corresponding to the encryption algorithm, on the second encryption information, using the decryption functional value, to generate the decryption seed value.

According to this construction, the second decryption unit adopts a two-phase computation method that uses a one-way function and a decryption algorithm. Therefore an unauthorized third party, even if knowing about the first and second encryption information, cannot obtain the seed value unless at least knowing about the one-way function and the decryption algorithm, which heightens security.

Here, the shared-key generation apparatus may perform bitwise exclusive-or as the encryption algorithm, on the functional value and the seed value, to generate the second encryption information, and the second decryption unit may perform bitwise exclusive-or as the decryption algorithm, on the decryption functional value and the second encryption information, to generate the decryption seed value.

According to this construction, the decryption algorithm is bitwise exclusive-or, which is an easy computation and is the inverse operation of the encryption algorithm.

Here, the shared-key generation apparatus may perform a one-way function on the seed value, to generate a functional value, and generate the verification value and the shared key from the functional value, and the shared-key generating unit may perform the one-way function on the decryption seed value, to generate a decryption functional value, and generate the second decryption verification value and the decryption shared key from the decryption functional value.

According to this construction, the second decryption verification value is generated by performing a one-way function on the decryption seed value. Therefore if a third party happens to know about the second decryption verification value, it is still difficult for him to obtain the seed value. Accordingly, it is practically impossible to obtain the seed value from the second decryption verification value, and further to obtain the shared key.

Here, the shared-key generation apparatus may perform, on the seed value, a hash function as the one-way function, to generate the functional value, and the shared-key generating unit may perform, on the decryption seed value, the hash function as the one-way function, to generate the decryption functional value.

According to this construction, the one-way function is a hash function, whose computation algorithm is well known and which is easy to apply.

Here, the shared-key generation apparatus may generate the verification value by setting a part of the functional value as the verification value, and generate the shared key by setting another part of the functional value as the shared key, and the shared-key generating unit may generate the second decryption verification value by setting a part of the decryption functional value as the second decryption verification value, and generate the decryption shared key by setting another part of the decryption functional value as the decryption shared key.

According to this construction, a part of the decryption functional value is set as the second decryption verification value, and another part thereof is set as the decryption shared key. This makes it easy to generate the second decryption verification value and the decryption shared key.

Here, the shared-key generation apparatus may perform a one-way function on the seed value, to generate a functional value, generate the verification value, the shared key, and a blind value, from the functional value, obtain a public key, and performs a public-key encryption algorithm on the verification value, using the public key and the blind value, to generate the first encryption information, and the shared-key generating unit may perform the one-way function on the decryption seed value, to generate a decryption functional value, and generates, from the decryption functional value, the second decryption verification value, the decryption shared key, and the decryption blind value.

According to this construction, the second decryption verification value is generated by performing a one-way function on the decryption seed value. Therefore if a third party happens to know about the second decryption verification value, it is still difficult for him to obtain the seed value. Accordingly, it is practically impossible to obtain the seed value from the second decryption verification value, and further to obtain the shared key.

Here, the shared-key generation apparatus may obtain a public key, perform a public-key encryption algorithm on the verification value, using the public key and the blind value, to generate the first encryption information, and the judging unit, instead of performing the judging based on the first decryption verification value and the second decryption verification value, may include: a public-key obtaining subunit operable to obtain the public key; a re-encryption subunit operable to perform the public-key encryption algorithm on one of the first decryption verification value and the second decryption verification value, using the public key and the decryption blind value, to generate re-encryption information; and a judging subunit operable to judge, based on the first encryption information and the re-encryption information, whether the decryption shared key should be outputted or not.

According to this construction, judgment, as to whether to output the generated decryption shared key, is based on the received first encryption information and the generated re-encryption information. Therefore, a shared key is received from the shared-key generation apparatus, in secrecy. At the same time, this construction has an effect of preventing different shared keys to be derived between the shared-key generation apparatus and the shared-key recovery apparatus.

Here, the judging subunit may compare the first encryption information and the re-encryption information, thereby judging that the decryption shared key should be outputted if the first encryption information is identical to the re-encryption information. Alternatively, the judging unit may compare the first decryption verification value and the second decryption verification value, thereby judging that the decryption shared key should be outputted if the first decryption verification value is identical to the second decryption verification value.

According to this construction, a decryption shared key is outputted if the first encryption information is identical to the re-encryption information. Therefore it becomes possible to assuredly perform the judgment as to whether to output the decryption shared key.

Here, the public-key encryption algorithm may conform to an NTRU cryptosystem, the shared-key generation apparatus may obtain, as the public key, a public-key polynomial generated according to a key-generation algorithm of the NTRU cryptosystem, generate a verification-value polynomial from the verification value, generate a blind-value polynomial from the blind value, and encrypt the verification-value polynomial according to an encryption algorithm of the NTRU cryptosystem, using the public-key polynomial as a key, and using the blind-value polynomial to randomize the verification-value polynomial, to generate the first encryption information as a polynomial, the public-key obtaining subunit may obtain the public-key polynomial, and the re-encryption subunit may generate a decryption verification-value polynomial from the second decryption verification value, generate a decryption blind-value polynomial from the decryption blind value, and encrypt the decryption verification-value polynomial according to the encryption algorithm of the NTRU cryptosystem, using the public-key polynomial as a key, and using the decryption blind-value polynomial to randomize the decryption verification-value polynomial, to generate the re-encryption information as a polynomial.

According to this construction, the NTRU cryptography may be adopted.

Here, the shared-key generation apparatus may further obtain a content, encrypt the content using the shared key to generate an encrypted content, and transmit the encrypted content, the receiving unit may further receive the encrypted content, and the shared-key recovery apparatus may further includes: a decryption unit operable to decrypt the received encrypted content using the decryption shared key, to generate a decrypted content; and an outputting unit operable to output the decrypted content.

According to this construction, the shared-key generation apparatus encrypts the obtained content using the generated shared key, to generate an encrypted content; and the shared-key recovery apparatus decrypts the received encrypted content using the decryption shared key having been outputted, to generate a decrypted content. Therefore it has an effect of transmitting a content from the shared-key generation apparatus to the shared-key recovery apparatus, in secrecy.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 19 is a process-block diagram showing the operations of the encryption apparatus 110$e$ and the decryption apparatus 120$e$; and FIG. 20 is a process-block diagram showing the operations of a modification example for the encryption apparatus 110$e$ and the decryption apparatus 120$e$.

DESCRIPTION OF THE PREFERRED EMBODIMENTS

1. First Embodiment

Figure 1:
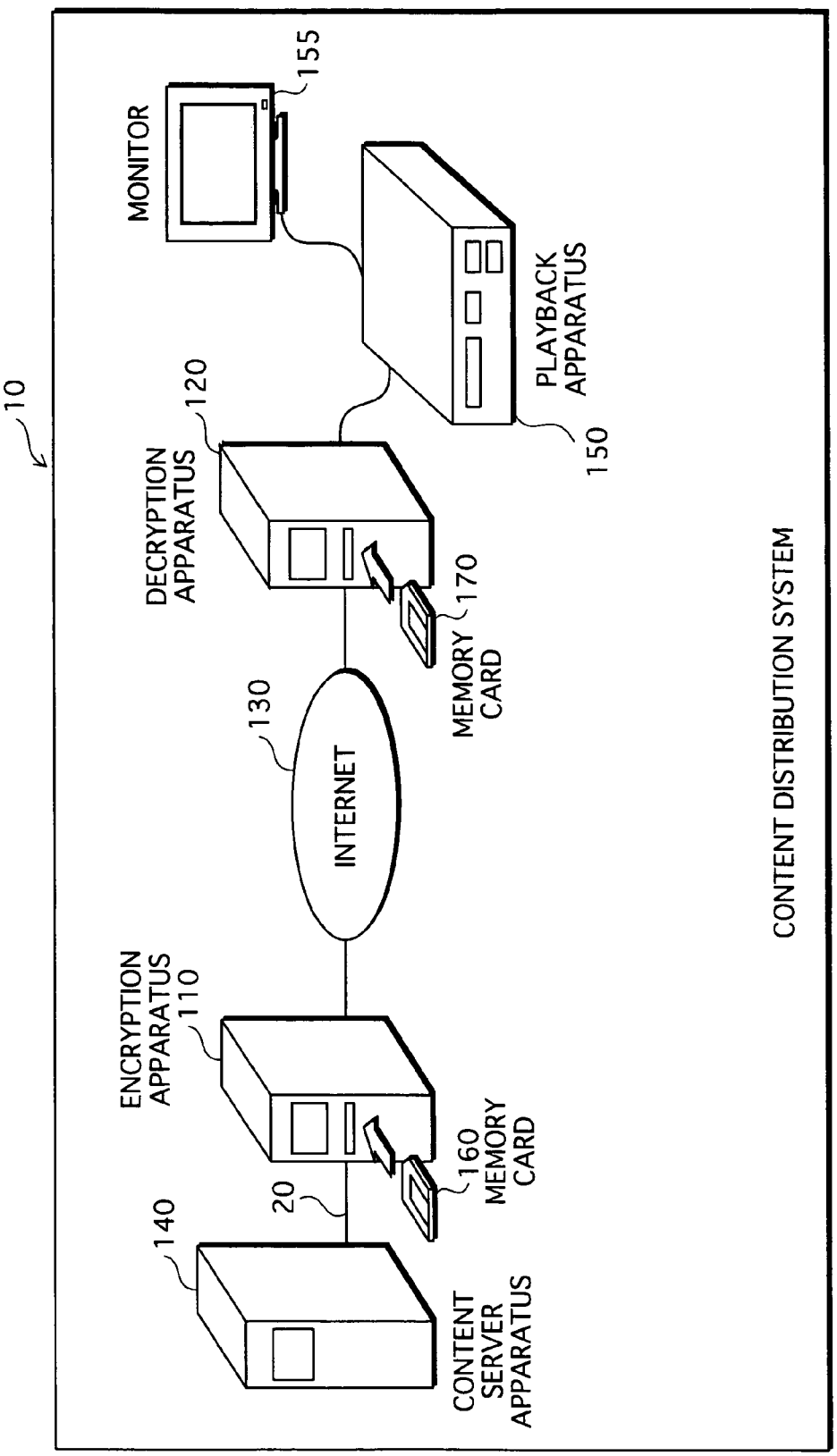
FIG. 1 is a conceptual diagram showing the structure of a content distribution system 10, and how its components are connected to each other.

The following describes a content distribution system 10, as one embodiment relating to the present invention. The content distribution system 10 is a cryptographic communication system that performs cryptographic communication using the NTRU cryptosystem and performing key distribution according to the key encapsulation mechanism.

1.1 NTRU Cryptosystem

As follows, the NTRU cryptosystem used in the content distribution system 10 is briefly described. The NTRU cryptosystem is a public-key cryptosystem that performs encryption/decryption using polynomial operation.

Note that the NTRU cryptosystem and the method that the NTRU cryptosystem adopts for generating public key and secret key are detailed in the non-patent reference 2.

(1) System Parameter of NTRU Cryptosystem

In the NTRU cryptosystem, system parameters N, p, q (that are integers) exist, and the encryption apparatus and the decryption apparatus, which are detailed later, have these system parameters.

In the mentioned reference, three examples of system parameters are listed, namely, (N, p, q)=(107, 3, 64), (N, p, q)=(167,3,128), and (N, p, q)=(503,3,256).

Hereinafter in this embodiment, the system parameter N=167 is used for description.

(2) Polynomial Operation in NTRU Cryptosystem

As aforementioned, the NTRU cryptosystem is a public-key cryptosystem that performs encryption/decryption using polynomial operation.

The polynomial used in the NTRU cryptosystem is N−1 degrees for the system parameter N. When, for example, N=5, the polynomial is $X^4+X^3+1$, and the like. Here, $X^a$ means the ath power of X.

Furthermore, a public key h, a secret key f, a plaintext m, a random number r, and a cipher text c, which are used in encryption or decryption, are expressed as polynomial that is N−1 degree or below. (hereinafter, each are referred to as "public-key polynomial h", "secret-key polynomial f", "plaintext polynomial m", "random-number polynomial r", and "cipher text polynomial c".)

The polynomial operation is arranged to yield a result being a polynomial at N−1 degree or below, by using the relational expression $X^N=1$, for the system parameter N.

For example, when N=5, the product of $X^4+X^2+1$ and $X^3+X$ is calculated as follows, using the relational expression $X^5=1$, where the product between polynomials is represented as *, and the product between an integer and a polynomial as .

$$(X^4 + X^2 + 1) * (X^3 + X) = X7 + 2 \cdot X^5 + 2 \cdot X^3 + X$$
$$= X^2 \cdot 1 + 2 \cdot 1 + 2 \cdot X^3 + X$$
$$= 2 \cdot X^3 + X^2 + X + 2$$

As in the above, the polynomial operation is arranged always to yield a polynomial at N-1 degrees or below.

(3) Encryption in NTRU Cryptosystem

The encryption apparatus, which will be described later, performs encryption according to the NTRU cryptosystem, as described as follows.

In encryption, the encryption algorithm E, which is a polynomial computation, is performed on the plaintext polynomial m, using a random-number polynomial r and a public-key polynomial h (which are detailed later), to generate a cipher text polynomial c=E(m,r,h).

This E(m,r,h) is a result of the polynomial operation, which is obtained by inputting, in the NTRU cryptographic encryption algorithm E, the plaintext polynomial m, the random-number polynomial r, and the public-key polynomial h. The encryption algorithm E is detailed in the non-patent reference 2, therefore is not described here.

Note that in the NTRU cryptosystem, a parameter d for generating the random polynomial r is determined in advance. The random polynomial r is selected so that, among the terms constituting the random-number polynomial r, the coefficient for d terms is 1, the coefficient for other d terms is −1, and the coefficient for the rest of the terms is 0.

To summarize, the random-number polynomial r is a polynomial being N−1 degrees or below, and N coefficients exit for N terms from the degree 0(constant term)to the degree N−1. The random-number polynomial r is selected so that, out of these N coefficients, d coefficients are 1, other d coefficients are −1, and (N−2d) coefficients are 0.

In the non-patent reference 2, when the parameter N=167, d=18. That is, the random polynomial r is selected so that 18 coefficients are 1, 18 coefficients are −1, and 131 coefficients (i.e. 167-36) are 0.

(4) Decryption in NTRU Cryptosystem

The decryption apparatus, which will be described later, performs decryption according to the NTRU cryptosystem, as described as follows.

In decryption, the decryption algorithm D, which is a polynomial calculation, is performed on the cipher text polynomial c, using a secret-key polynomial f, to generate a decrypted text polynomial m'=D(c,f).

This D(c,f) is a result of the polynomial operation, which is obtained by inputting, in the NTRU cryptographic decryption algorithm D, the cipher text polynomial c and the secret-key polynomial f. The decryption algorithm D is detailed in the non-patent reference 2, therefore is not described here.

(5) Decryption Error in NTRU Cryptosystem

In this NTRU cryptosystem, it sometimes happens that the generated decrypted text polynomial m' is different from the plaintext polynomial m. In such a case, the correct plaintext m will not be obtained in decryption. This occurrence is called "decryption error".

1.2 Structure of Content Distribution System 10

The content distribution system 10, as shown in FIG. 1, is comprised of a content server apparatus 140, an encryption apparatus 110, a decryption apparatus 120, a playback apparatus 150, and a monitor 155. The content server apparatus 140 and the encryption apparatus 110 are connected to each other, via a dedicated circuit 20. The encryption apparatus 110 and the decryption apparatus 120 are connected to each other, via the Internet 130. The playback apparatus 150 is connected to the decryption apparatus 120 and to the monitor 155 that contains therein a speaker. The encryption apparatus 110 is equipped with a memory card 160, and the decryption apparatus 120 is equipped with a memory card 170.

The content server apparatus 140 transmits a content comprised of image and audio, such as a movie, to the encryption apparatus 110 via the dedicated circuit 20.

The encryption apparatus 110 and the decryption apparatus 120 respectively generate a shared key K and a shared key K' that are identical to each other. Next, the encryption apparatus 110 encrypts a received content using the shared key K to generate an encrypted content, and transmits the encrypted content. The decryption apparatus 120 receives the encrypted content, and decrypts the received encrypted content to generate a playback content. The playback apparatus 150 generates an image signal and an audio signal, from the playback content, and the monitor 155 displays the images and outputs the audio.

1.3 Structure of Content Server Apparatus 140

The content server apparatus 140 is a computer system (unshown in any drawing), that is comprised of a microprocessor, a ROM, a RAM, a hard disk unit, a display unit, a communication unit, a key board, a mouse, and the like. The RAM and the hard disk unit record thereon a computer program. The content server apparatus 140 performs part of its function, by operation of the microprocessor according to the computer program.

The content server apparatus 140 prestores the content, where the content is made up of a plurality of partial contents $m_i(1 \leq i \leq n)$. The content server apparatus 140 reads the partial contents $m_i$, in accordance with the request by the encryption apparatus 110, and transmits the read partial contents mi to the encryption apparatus 110 via the dedicated circuit 20.

1.4 Structure of Memory Card 160 and Memory Card 170

The memory card 160 is a card-type storage apparatus that adopts a flash memory as a recording medium. The memory card 160 prestores therein a public-key polynomial h.

Meanwhile, the memory card 170 is a storage apparatus that is a card-type just like the memory card 160, and prestores therein a secret-key polynomial f and the public-key polynomial h.

Here, the secret-key polynomial f and the public-key polynomial h are generated according to the NTRU cryptosystem, and correspond to each other.

1.5 Structure of Encryption Apparatus 110

Figure 2:
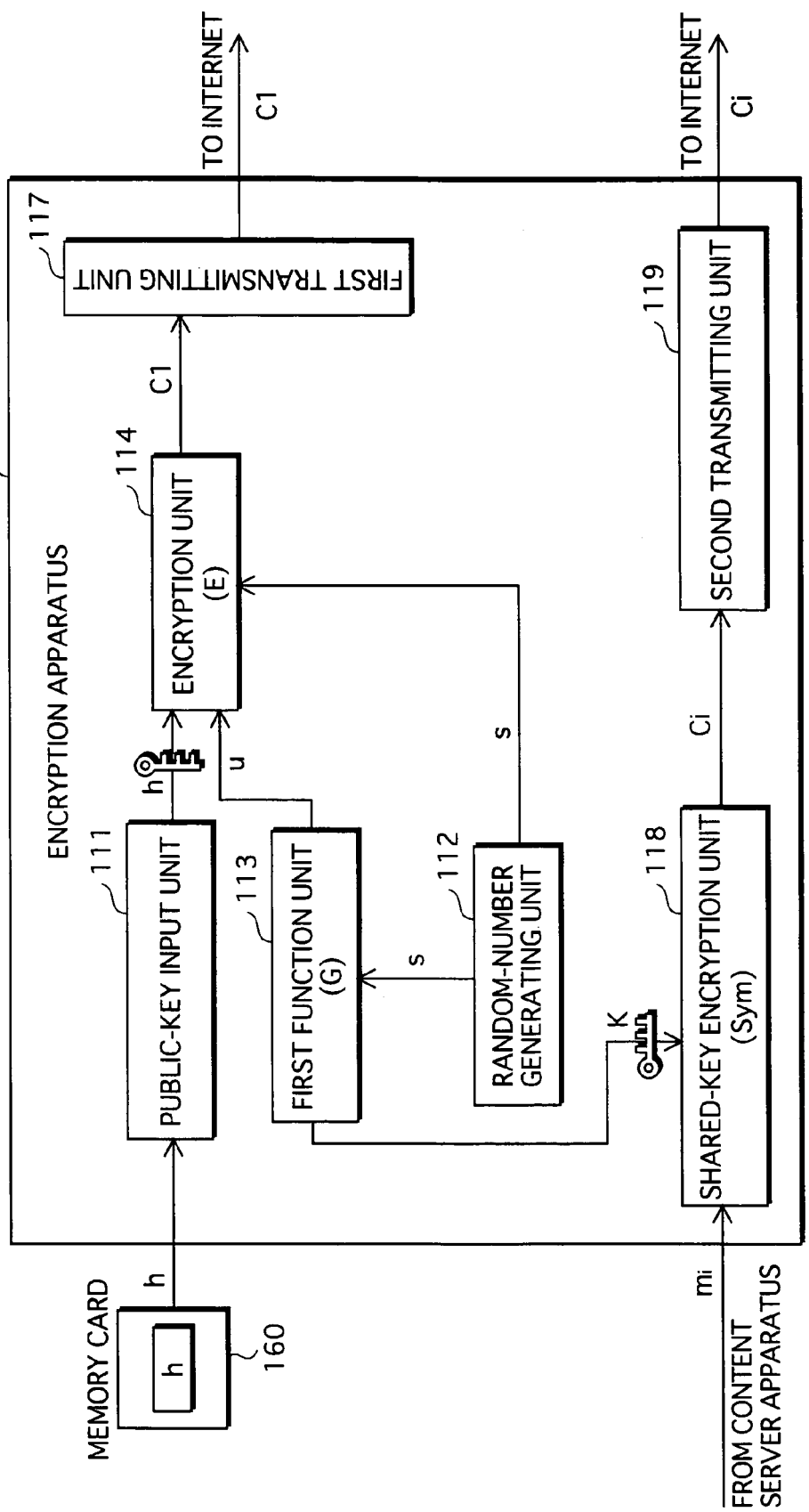
FIG. 2 is a block diagram showing the structure of an encryption apparatus 110.

The encryption apparatus 110 is, as shown in FIG. 2, comprised of a public-key input unit 111, a random-number generating unit 112, a first function unit 113, an encryption unit 114, a first transmitting unit 117, a shared-key encryption unit 118, and a second transmitting unit 119.

The encryption apparatus 110 is specifically a computer system comprised of a microprocessor, a ROM, a RAM, and a communication unit, and so on. The RAM stores therein a computer program. The encryption apparatus 110 pursues its function, by operation of the microprocessor according to the computer program.

(1) Public-key Input Unit 111

The public-key input unit 111 reads, from the memory card 160, the public-key polynomial h for the decryption apparatus 120, and outputs the read public-key polynomial h to the encryption unit 114.

(2) Random-number Generating Unit 112

The random-number generating unit 112 generates a random number s, as a seed value on which the generation of the shared key bases, and outputs the generated random number s to the first function unit 113 and the encryption unit 114.

(3) First Function Unit 113

The first function unit 113 receives a random number s from the random-number generating unit 112, and generates the functional value G(s). Here, the function G is a hash function having output length of 2k bits. Note that the hash function is one of the one-way functions. Next, the first function unit 113 sets the k highest-order bits of the functional value G(s) as a random-number value u, and the k lowest-order bits of the G(s) as a shared key K, to generate the shared key K and the random-number value u from the generated functional value G(s). Then, the first function unit 113 outputs the generated random-number value u to the encryption unit 114, and outputs the shared key K to the shared-key encryption unit 118.

(4) Encryption Unit 114

The encryption unit 114 receives the public-key polynomial h from the public-key input unit 111, receives the random number s from the random-number generating unit 112, and receives the random-number value u from the first function unit 113. Next, as described below, the encryption unit 114 generates a first cipher text c1 of the random number s, using the public-key polynomial h and the random-number value u. Here, the random-number value u is a blind value, and is used for making the random number s unclear, the random numbers being a target of encryption.

The encryption unit 114 generates a random-number polynomial r having the following characteristic, so that it is uniquely defined by the random-number value u. The characteristic of the random-number polynomial r is such that, with respect to the parameter d of NTRU cryptosystem, the coefficient of d terms is 1, the coefficient of d terms is −1, and the coefficient of the rest of the terms is 0.

For example, the encryption unit 114 sets the random-number value u as a default value of pseudo-random number system (random-number seed), and thereby generates $2d$ pseudo-random numbers, from among $\{0, 1, \ldots, N-1\}$, that do not overlap with each other. Then, the encryption unit 114 sets the coefficient of d terms of degree shown by each of the first d pseudo-random numbers as 1. The encryption unit 114 sets the coefficient of d terms of degree shown by each of the rest of d pseudo-random numbers as −1, and the coefficient of the other terms of degree as 0.

Next, the encryption unit 114 constructs the random-number polynomial sp, so that the element for each bit of an N-bit bit sequence in which the random number s is represented in binary form, corresponds to the coefficient of a different one of the terms of the random-number polynomial sp. This is for applying the random number s to the encryption algorithm E of the NTRU cryptosystem. For example, the value of the b-th lowest bit of the random number s will be set as the coefficient of the term $X^b$. Concretely, when s=10010 (representation in bit form), the random-number polynomial sp=$X^5+X^2$ is generated.

Next, the encryption unit 114 performs the encryption algorithm E on the random-number polynomial sp, using the public-key polynomial h and the random-number polynomial r, to generate the following:

The first cipher text c1=the cipher text polynomial E(sp,r, h).

Next, the encryption unit 114 outputs the generated first cipher text c1 to the first transmitting unit 117.

Note that in FIG. 2, each block representing a respective constituting part of the encryption apparatus 110 is connected to the other blocks via a connection line. Here, each connection line signifies a path via which signals and information are conveyed. Further, among the plurality of connection lines that are connected to the block for the encryption unit 114, one that has a key mark on the connection line signifies a path via which information as a key is conveyed to the encryption unit 114. The same thing applies to the block for the shared-key encryption unit 118. This also applies to the other diagrams.

(5) First Transmitting Unit 117

The first transmitting unit 117 receives the first cipher text c1 from the encryption unit 114, and transmits the first cipher text c1 to the decryption apparatus 120 via the Internet 130.

(6) Shared-key Encryption Unit 118

The shared-key encryption unit 118 has a symmetric key cryptographic algorithm Sym, such as the DES cryptosystem.

Generally, in the symmetric key cryptography, an apparatus at the encryption side performs a symmetric key cryptographic algorithm Sym on a plaintext m, using an encryption key K, to generate a cipher text=Sym (m, K), while an apparatus at the decryption side performs a symmetric key cryptographic algorithm Sym on the cipher text c, using an encryption key K, to generate a decrypted text m'=Sym(c,K) Here, if the encryption key K used in generation of the cipher text is identical to the encryption key K used in generation of the decrypted text, then m'=m holds. Note that the symmetric key cryptography and the DES cryptosystem are detailed in the non-patent reference 1, therefore detailed description thereof is omitted here.

Next, the shared-key encryption unit 118 outputs the shared-key cipher text Ci(1=<i=<n) to the second transmitting unit 119.

(7) Second Transmitting Unit 119

The second transmitting unit 119 receives the shared-key cipher text $Ci(1 \leq i \leq n)$, and transmits the received shared-key cipher text $Ci(1 \leq i \leq n)$ to the decryption apparatus 120 via the Internet 130.

1.6 Structure of Decryption Apparatus 120

Figure 3:
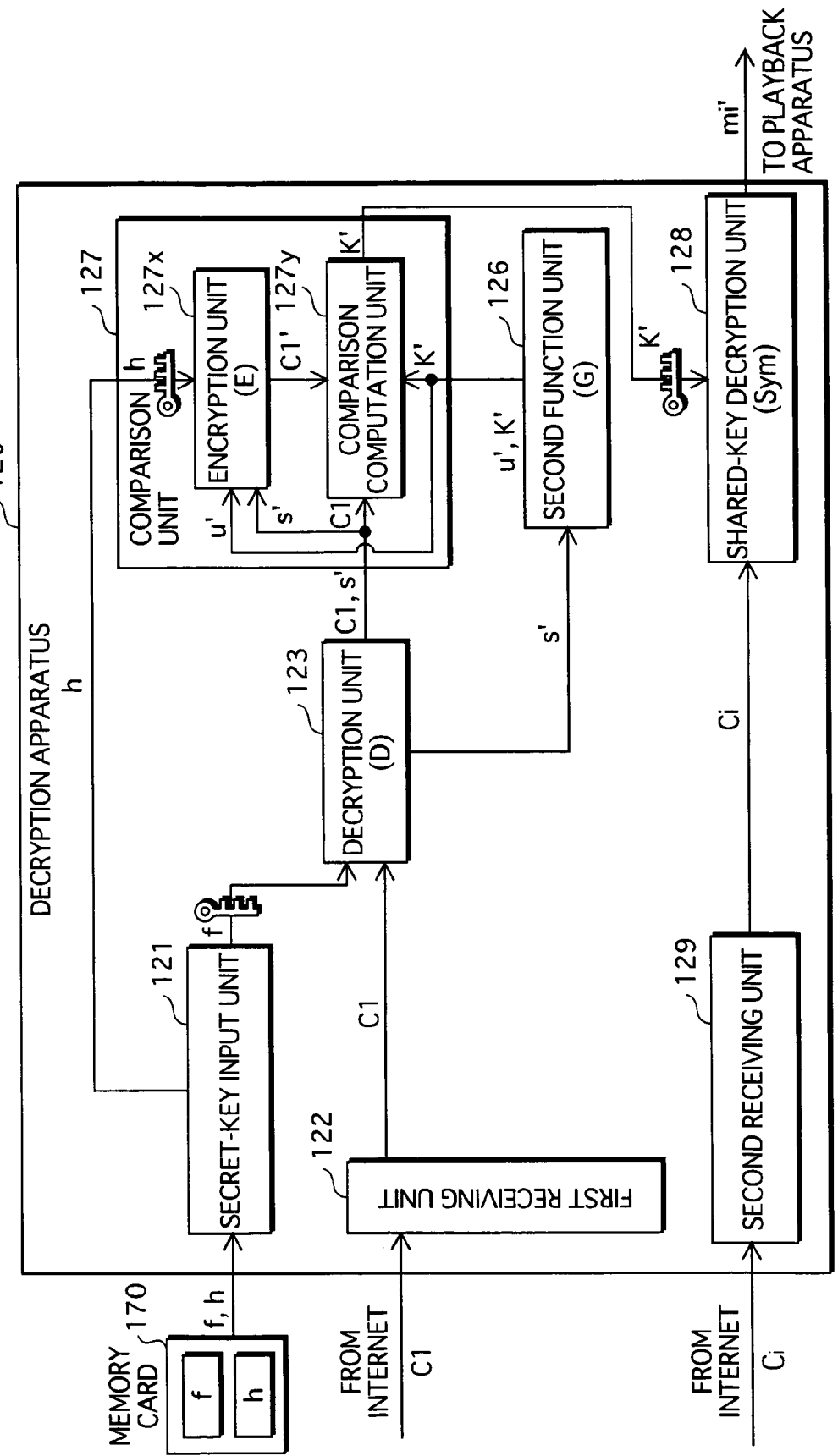
FIG. 3 is a block diagram showing the structure of a decryption apparatus 120.

The decryption apparatus 120 is, as shown in FIG. 3, comprised of a secret-key input unit 121, a first receiving unit 122, a decryption unit 123, a second function unit 126, a comparison unit 127, a shared-key decryption unit 128, and a second receiving unit 129.

The decryption apparatus 120 is specifically a computer system just like the encryption apparatus 110. The decryption apparatus 120 pursues its function, by operation of its microprocessor according to the computer program.

(1) Secret-key Input Unit 121

The secret-key input unit 121 reads, from the memory card 170, the secret-key polynomial f and the public-key polynomial h, which are for the decryption apparatus 120, and outputs the read secret-key polynomial f to the decryption unit 123, and the read public-key polynomial h to the comparison unit 127.

(2) First Receiving Unit 122

The first receiving unit 122 receives the first cipher text c1 from the encryption apparatus 110 via the Internet 130, and outputs the received first cipher text c1 to the decryption unit 123.

(3) Decryption Unit 123

The decryption unit 123 receives the secret-key polynomial f from the secret-key input unit 121, and receives the first cipher text c1 from the first receiving unit 122. Then, as shown as follows, the decryption unit 123 decrypts the first cipher text c1 according to the NTRU cryptography and using the secret-key polynomial f, to generate the decryption random number s'.

The decryption unit 123 performs the decryption algorithm D on the first cipher text c1 using the secret-key polynomial f, to generate the decryption random-number polynomial sp'=D(c1,f). Next, since the decryption random-number polynomial sp' is an NTRU cryptographic decrypted text, and is represented in polynomial form, the decryption unit 123 generates a decryption random number s' so that the coefficient for each term of the decryption random-number polynomial sp' corresponds to each element of the N-bit bit sequence in which the decryption random number s' is represented in binary form. For example, the coefficient of the term $X^b$ which is b-th degree of the decryption random-number polynomial sp' will be the element of the b-th lowest-order bit of the decryption random number s'.

Concretely, when the decryption random-number polynomial sp'=$X^5+X^2$, the decryption random number s'=10010 (representation in bit form) is generated.

Next, the decryption unit 123 outputs the received first cipher text c1 and the generated random number s' to the comparison unit 127. The decryption unit 123 also outputs the generated random number s' to the second function unit 126.

(4) Second Function Unit 126

The second function unit 126 has an algorithm for a function G that is the same as the function owned by the first function unit 113.

The second function unit 126 receives the decryption random number s' from the decryption unit 123, and generates the functional value G(s') for the decryption random number s', in the same manner as in the first function unit 113. Next, the second function unit 126 generates a random-number value u' and a shared key K', from the functional value G(s'), and outputs the random-number value u' and the shared key K' that have been generated, to the comparison unit 127.

(5) Comparison Unit 127

The comparison unit 127 is, as shown in FIG. 3, comprised of an encryption unit 127x and a comparison computation unit 127y.

The encryption unit 127x receives the public-key polynomial h from the secret-key input unit 121, receives the decryption random number s' from the decryption unit 123, and receives the random-number value u' from the second function unit 126. Next, the encryption unit 127x, just as the encryption unit 114, encrypts the decryption random number s' using the public-key polynomial h and the random-number value u', to generate a first re-cipher text c1', and outputs the first re-cipher text c1' to the comparison computation unit 127y.

The comparison computation unit 127y receives the first cipher text c1 from the decryption unit 123, receives the shared key K' from the second function unit 126, and receives the first re-cipher text c1' from the encryption unit 127x. Then, the comparison computation unit 127y compares the first cipher text c1 and the first re-cipher text c1', and judges whether they are identical. When they are judged to be identical, the comparison computation unit 127y outputs the received shared key K' to the shared-key decryption unit 128. When they are judged not to be identical, the comparison computation unit 127y does not output the shared key K'.

(6) Second Receiving Unit 129

The second receiving unit 129 receives the shared-key cipher text $Ci(1 \leq i \leq n)$, and outputs the received shared-key cipher text $Ci(1 \leq i \leq n)$ to the shared-key decryption unit 128 via the Internet 130.

(7) Shared-key Decryption Unit 128

The shared-key decryption unit 128 prestores a symmetric key cryptographic algorithm Sym that is the same as the symmetric key cryptographic algorithm Sym owned by the shared-key encryption unit 118.

The shared-key decryption unit 128 receives the shared key K' from the comparison unit 127, and receives the shared-key cipher text $Ci(1 \leq i \leq n)$ from the second receiving unit 129. Then the shared-key decryption unit 128 performs the symmetric key cryptographic algorithm Sym on the shared-key cipher text $Ci(1 \leq i \leq n)$, using the received shared key K', to generate the decrypted text mi'=Sym(Ci,K) $(1 \leq i \leq n)$.

Next, the shared-key decryption unit 128 outputs the generated decrypted text mi'$((1 \leq i \leq n)$ to the playback apparatus 150.

1.7 Playback Apparatus 150 and Monitor 155

The playback apparatus 150 receives the decrypted text mi'$(1 \leq i \leq n)$ from the decryption apparatus 120, generates image/audio signals from the received decrypted text mi' $(1 \leq i \leq n)$, and outputs the generated image/audio signals to the monitor 155.

The monitor 155 receives the image/audio signals from the playback apparatus 150, and displays an image and outputs an audio, according to the received image/audio signals.

1.8 Operation Performed by Encryption Apparatus 110 and by Decryption Apparatus 120

Figure 4:
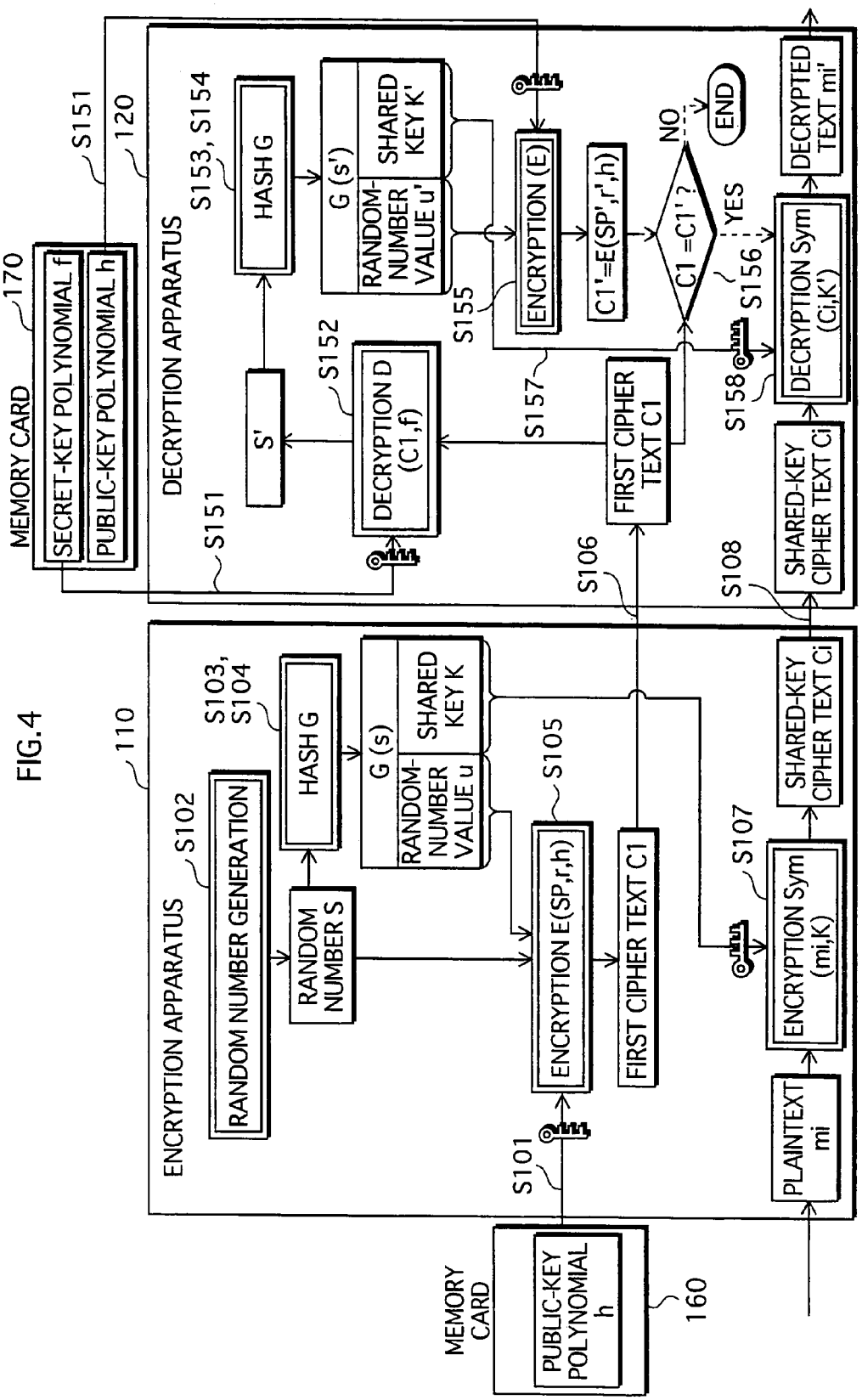
FIG. 4 is a process-block diagram showing the operations of the encryption apparatus 110 and the decryption apparatus 120.
Figure 5:
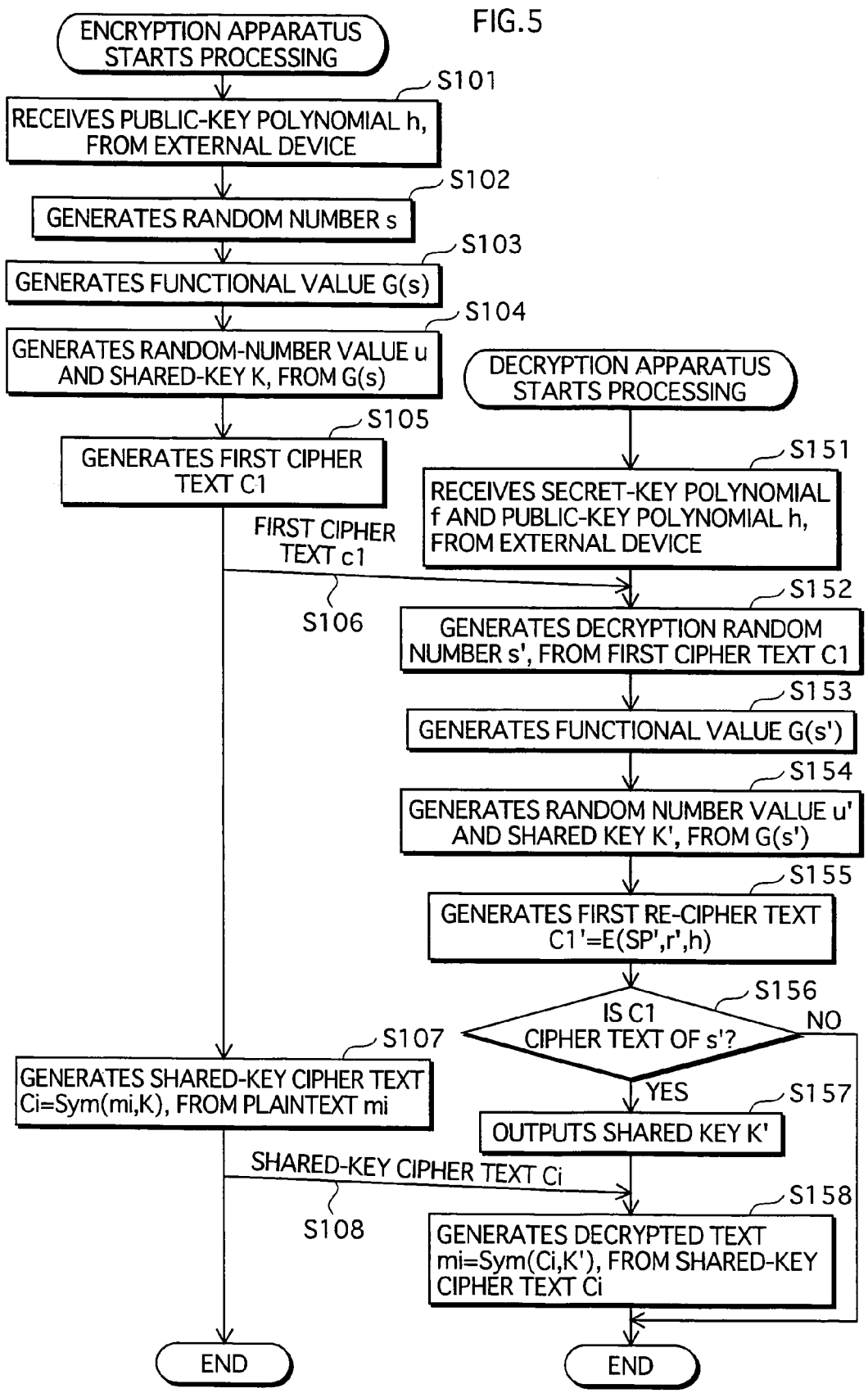
FIG. 5 is a flowchart showing the operations of the encryption apparatus 110 and the decryption apparatus 120.

The operations performed by the encryption apparatus 110 and by the decryption apparatus 120 are described, using the process-block diagram of FIG. 4, and the flowchart of FIG. 5.

The public-key input unit 111 of the encryption apparatus 110 reads, from the memory card 160, the public-key polynomial h of the decryption apparatus 120, and outputs the read public-key polynomial h to the encryption unit 114 (Step S101).

Then, the random-number generating unit 112 generates a random number s, and outputs the generated random number s to the first function unit 113 and to the encryption unit 114 (Step S102).

The first function unit 113 receives the random number s from the random-number generating unit 112, and generates a functional value G(s) of the random number s (Step S103). Next, the first function unit 113 generates a random-number value u and a shared key K from the functional value G(s), outputs the random-number value u to the encryption unit 114, and outputs the shared key K to the shared-key encryption unit 118 (Step S104).

Next, the encryption unit 114 receives the public-key polynomial h from the public-key input unit 111, receives the random number s from the random-number generating unit 112, and receives the random-number value u from the first function unit 113. Then, the encryption unit 114 generates the first cipher text c1, using the public-key polynomial h and the random-number value u, and outputs the first cipher text c1 to the first transmitting unit 117 (Step S105).

The first transmitting unit 117 receives the first cipher text c1 from the encryption unit 114, and transmits the first cipher text c1 to the decryption apparatus 120 via the Internet 130 (Step S106).

Next, the secret-key input unit 121 of the decryption apparatus 120 reads, from the memory card 170, the secret-key polynomial f and the public-key polynomial h that are for the decryption apparatus 120, and outputs the read secret-key polynomial f to the decryption unit 123, and outputs the read public-key polynomial h to the comparison unit 127 (Step S151).

The first receiving unit 122 receives the first cipher text c1 from the encryption apparatus 110 via the Internet 130, and outputs the first cipher text c1 to the decryption unit 123 (Step S106).

Next, the decryption unit 123 receives the secret-key polynomial f from the secret-key input unit 121, and receives the first cipher text c1 from the first receiving unit 122. The decryption unit 123 then decrypts the first cipher text c1 using the secret-key polynomial f, to generate a decryption random number s', and outputs the first cipher text c1 and the decryption random number s' to the comparison unit 127, and outputs the decryption random number s' to the second function unit 126 (Step S152).

The second function unit 126 receives the decryption random number s' from the decryption unit 123, and generates a functional value G(s') of the decryption random number s' (Step S153) The second function unit 126 then generates a random-number value u' and a shared key K' from the functional value G(s'), and outputs the random-number value u' and the shared key K' to the comparison unit 127 (Step S154).

Next, the comparison unit 127 receives the first cipher text c1 from the decryption unit 123, receives the random-number value u' and the shared key K' from the second function unit 126, and generates a first re-cipher text c1' (Step S155). Then the comparison unit 127 checks whether the first cipher text c1 is the cipher text of the decryption random number s' that is obtained by using the random-number value u'. If the first cipher text c1 is not the cipher text of the decryption random number s' (Step S156), the decryption apparatus 120 ends its operation.

The shared-key encryption unit 118 receives a plurality of plaintexts mi($1=<i=<n$) from an external device, receives the shared key K from the first function unit 113, and performs the symmetric key cryptographic algorithm Sym on the plaintext mi($1=<i=<n$) using the shared key K to generate a shared-key cipher text Ci=Sym(mi,K) ($1=<i=<n$), and outputs the shared-key cipher text Ci($1=<i=<n$) to the second transmitting unit 119 (Step S107).

Next, the second transmitting unit 119 receives the shared-key cipher text Ci($1=<i=<n$) from the shared-key encryption unit 118, transmits the shared-key cipher text Ci($1=<i=<n$) to the decryption apparatus 120 via the Internet 130 (Step S108), and ends the operations.

If the first cipher text c1 is the cipher text of the decryption random number s' (Step S156), the comparison unit 127 outputs the shared key K' to the shared-key decryption unit 128 (Step S157). Next, the second receiving unit 129 receives the cipher text Ci($1=<i=<n$) from the encryption apparatus 110 via the Internet 130, and outputs it to the shared-key decryption unit 128 (Step S108).

The shared-key decryption unit 128 receives the shared key K' from the comparison unit 127, receives the shared-key cipher text Ci($1=<i=<n$) from the second receiving unit 129, and performs the symmetric key cryptographic algorithm Sym on the shared-key cipher text Ci($1=<i=<n$) using the shared key K', to generate the decrypted text mi'=Sym(Ci,K) ($1=<i=<n$), and outputs the decrypted text mi'($1=<i=<n$) to the playback apparatus 150 (Step S158), and ends the operations.

1.9 Operation Verification of Content Distribution System 10

As follows, the entire operation performed by the content distribution system 10 of the first embodiment is described.

First, the encryption apparatus 110 generates a random number s, using the public-key polynomial h of the decryption apparatus 120 as an input, and derives a random-number value u and a shared key K, from the functional value G(s). Next, the encryption apparatus 110 encrypts the random number s using the public-key polynomial h and the random-number value u and according to the NTRU cryptosystem, to generate a first cipher text c1, and transmits the first cipher text c1 to the decryption apparatus 120 via the Internet 130.

Specifically, this encryption apparatus 110 performs the following operations, so as to transmit the first cipher text c1 to the decryption apparatus 120.

Generate a random number s.

Generate G(s), and generate u and K, from the G(s).

Generate a first cipher text c1 of the random number s, using the public-key polynomial h and the random-number value u.

Output the shared key K and the first cipher text c1.

Next, the encryption apparatus 110 encrypts the plaintext mi($1=<i=<n$) having been inputted from an external device, using the derived shared key K and according to the symmetric key cryptography, to generate a cipher text Ci($1=<i=<n$), and transmits the cipher text Ci($1=<i=<n$) to the decryption apparatus 120 via the Internet 130.

On the other hand, the decryption apparatus 120 receives the first cipher text c1 from the encryption apparatus 110 via the Internet 130 by using, as input, the secret-key polynomial f and the public-key polynomial h of the decryption apparatus 120, and decrypts the first cipher text c1, using the secret-key polynomial f, to generate a decryption random number s'. Then, the decryption apparatus 120 derives a random-number value u' and a shared key K', from the functional value G(s') of the decryption random number s', and encrypts the decryption random number s' to generate a first re-cipher text c1', and if c1'=c1, outputs the shared key K'.

Specifically, this decryption apparatus 120 performs the following operations, so as to derive the shared key K'.

Decrypt the first cipher text c1 using the secret-key polynomial f, to generate s'.

Generate G(s'), and generate u' and K' from the G(s').

Generate a first re-cipher text c1' of s' using the public-key polynomial h and the random-number value u'.

Check to see if c1'=c1 holds. If it holds, output the shared key K'.

Here, if the decryption apparatus 120 has used the correct secret-key polynomial f that corresponds to the public-key polynomial h that the encryption apparatus 110 has used, the first cipher text c1 will be correctly decrypted, to generate the decryption random number s'=s, therefore the random-number value u' derived from the G(s') is equal to u, and as a result the shared key K'=K holds. Since s'=s and u'=u hold, c1'=c1 also holds, therefore the decryption apparatus 120 can derive the same shared key K as that derived by the encryption apparatus 110.

Next, the decryption apparatus 120 decrypts the shared-key cipher text Ci(1=<i=<n) having been received from the encryption apparatus 110 via the Internet 130, using the derived shared key K' (=K) and according to the symmetric key cryptography, to generate a decrypted text mi'(1=<i=<n), and outputs the decrypted text mi' to an external device. Since the encryption key K (used for generation of the shared-key cipher text) is identical to the encryption key K' (used for generation of decrypted text), the decryption apparatus 120 can obtain the correct mi'=mi(1=<i=<n).

Note that if a decryption error has occurred, the decryption random number s' and the random number s are not identical. The random-number value u' and the shared key K' that are derived from the G(s') will be respectively different from u and k, too. In this case however, s' and u' will be respectively different from s and u, too. Therefore, the first re-cipher text c1' will be different from the first cipher text c1, and so the decryption apparatus 120 will not output the shared key K'.

1.10 Effect of First Embodiment

In the conventional RSA-KEM algorithm, an element s will be inputted into the hash function G to derive a shared key K, the element s being unable to be derived from the cipher text C unless the secret key is known. However, there is a possibility of decryption error if a shared key is attempted to be distributed, using the NTRU cryptosystem and applying the RSA-KEM algorithm that is a key encapsulation mechanism. This means that occasionally the elements cannot be derived even using the secret key, thereby deriving an incorrect shared key K'.

However the content distribution system, the encryption/decryption apparatuses that relate to the first embodiment are able to prevent derivation of different keys between the encryption apparatus and the decryption apparatus even when a decryption error occurs. This is realized by the processes of the first embodiment. In this process, in addition to a shared key, a random-number value u is generated from the hash functional value G(s) of the random number s, and the decryption apparatus re-encrypts the decryption random number s' using the random-number value u and the public-key polynomial h, to generate a first re-cipher text c1', and unless the first re-cipher text c1' is identical to the first cipher text c1, the decryption apparatus will not output a shared key K'.

In addition, according to the system of the present invention, the security can be logically verified using the same method as the verification method described in the non-patent reference 3.

1.11 Modification Example

The first embodiment described above is one example of carrying out the present invention. Needless to say, the present invention is not limited to this particular embodiment, and can be carried out with various modifications as long as they are within the scope of the present invention. In light of this, the following cases are included in the present invention.

(1) The parameter N to be used in NTRU cryptosystem may take a value other than 167.

(2) The conversion method between the element of each bit in the bit sequence and the coefficient of each term in the polynomial, which is performed in the encryption unit 114 and the decryption unit 123, is not limited to the aforementioned method, and may be other methods.

For example, the conversion of the random number s to the random-number polynomial sp may be performed using a function that corresponds the element of each bit in the bit sequence to the coefficient of each term in the polynomial, in one-to-one relation. Alternatively, the mentioned conversion may be performed using a functional-value table that stores the element of each bit in the bit sequence and the coefficient of each term in the polynomial in one-to-one relation.

Moreover, the conversion from the random-number value u to the random-number polynomial r may be performed in other methods, as long as the following conditions are held: r is uniquely obtained from u, and among r, the coefficient of d terms of degree is 1, the coefficient of d terms of degree is −1, and the coefficient of other terms of degree is 0. For example, the conversion may be performed using a function or a functional-value table, which correspond a random-number value u to a polynomial.

(3) The public-key cryptosystem, used in the encryption unit 114 and the decryption unit 123, is not limited to the one described, as long as its encryption unit 114 is operable to encrypt a random number s using a public key and a random-number value u to generate a first cipher text c1, and its decryption unit 123 is operable to decrypt the first cipher text c1 using a secret key to generate a decryption random number s' that is equal to the random-number value s.

Accordingly, the public-key cryptosystem used in the encryption unit 114 and in the decryption unit 123 may be other cryptosystems different from the NTRU cryptosystem.

For example, if the ElGamal cryptosystem is to be used, h and f may be respectively set as a public key and a secret key of the ElGamal cryptosystem. Then, in the encryption unit 114, the random number s is encrypted using h and u, to generate c1, and in decryption unit 123, c1 is decrypted using f, to generate s'.

Note that the ElGamal cryptosystem is described in greater detail in the non-patent reference 1, therefore is not detailed here.

(4) In the first embodiment, the first function unit 113 sets the k highest-order bits of the functional value G(s) as a random-number value u, and the k lowest-order bits thereof are set as a shared key K. However, other methods may be alternatively used, as long as the random-number value u and the shared key K are derived from the functional value G(s).

For example, the k/2 highest-order bits of the functional value G(s) may be set as a random-number value u, and the k*3/2 lowest-order bits may be set as a shared key K. Alternatively, as a random-number value u, k bits may be selected so that every other bit in the 2k bits of the functional value G(s) is selected, and the other k bits may be set as a shared key K.

(5) In the first embodiment, the random-number value u is generated in the first function unit 113 and in the second function unit 126. However, other generation methods may be used, as long as the same value is generated in the encryption apparatus 110 and in the decryption apparatus 120.

For example, u=Func(s) may be used with respect to an arbitrary function Func, so that the encryption apparatus 110 obtains the same value as that the decryption apparatus 120 obtains. More specifically, the encryption apparatus 110 and the decryption apparatus 120 may:

*generate G(s), and generate K from the G(s), and generate Func(s), and sets u=Func(s).

(6) Further, the random-number value u is generated in the first function unit 113 and in the second function unit 126, in the first embodiment. However, the condition to be satisfied here is that the encryption apparatus 110 and the decryption apparatus 120 obtain the same value. Therefore, the encryption apparatus 110 may transmit the random-number value u directly to the decryption apparatus 120.

To be more specific, the first cipher text c1 and the random-number value u may be transmitted to the decryption apparatus 120, as described below. At this time, the random-number value u may be encrypted before being transmitted.

The encryption apparatus 110:
generates G(s), and generates K from the G(s), and
transmits the random-number value u separately, from the encryption apparatus 110 to the decryption apparatus 120.

The decryption apparatus 120:
receives the random-number value u, and
generates a first re-cipher text c1' using the received random-number value u in place of the random-number value u'.

At this time, it may be arranged that the encryption apparatus 110 encrypt the random-number value u before transmitting it, and that the decryption apparatus 120 decrypts the encrypted random-number value u.

(7) As for the random-number value u, the condition is that the encryption apparatus 110 and the decryption apparatus 120 obtain the same value. Therefore, it may be arranged to generate part of the information for the random-number value u in the first function unit 113 and in the second function unit 126, and to directly transmit the rest of the information for the random-number value u from the encryption apparatus 110 to the decryption apparatus 120.

For instance, the encryption apparatus 110 may transmit the first cipher text c1 and the random-number value u2 to the decryption apparatus 120, as follows.

The encryption apparatus 110:
(a) generates G(s), and generates K, u1 from the G(s),
(b) generates the random-number value u2, and separately transmit the random-number value u2 to the decryption apparatus 120,
(c) generates a random-number value u from u=u1 xor u2, and
(d) generates a first cipher text c1 using the random-number value u.

The decryption apparatus 120:
(e) receives the random-number value u2,
(f) generates G(s'), and generates K', and u1' from the G(s'),
(g) generates a random-number value u' from u'=u1' xor u2, and
(h) generates a first re-cipher text c1' using the generated random-number value u'.

At this time, the encryption apparatus 110 may encrypt the random-number value u2 before transmitting it, and the decryption apparatus 120 may decrypt the encrypted random-number value u2.

In (c) and (g), other computation may be performed in place of bitwise exclusive-or. For example, in (c) and (g), addition and subtraction may be used respectively. Alternatively, multiplication and division may be used.

(8) In the first embodiment, the shared key K' is outputted when the first re-cipher text c1' is identical to the first cipher text c1, so as to prevent derivation of different shared keys for the encryption apparatus 110 and the decryption apparatus 120, due to decryption error. However, instead of the above arrangement, the following arrangement may be performed. That is, the encryption apparatus 110 generates a hash functional value for at least one of the random number s, the random-number value u, and the shared key K, and transmits this hash functional value to the decryption apparatus 120. The decryption apparatus 120 then verifies this hash functional value, thereby determining whether to output the shared key K'. For example, as this hash functional value, a hash functional value H(s) of the random number s may be generated for an arbitrary hash function H. Alternatively, a combination of random number s, random-number value u, and shared key K may be generated, such as a hash functional value H(s||u||k) and a hash functional value H(u||k).

In this case, the first function unit 113 in the encryption apparatus 110 may derive only a shared key K from G(s), instead of deriving a random-number value u and a shared key K from the functional value G(s).

A concrete example therefor is described as follows.

Figure 6:
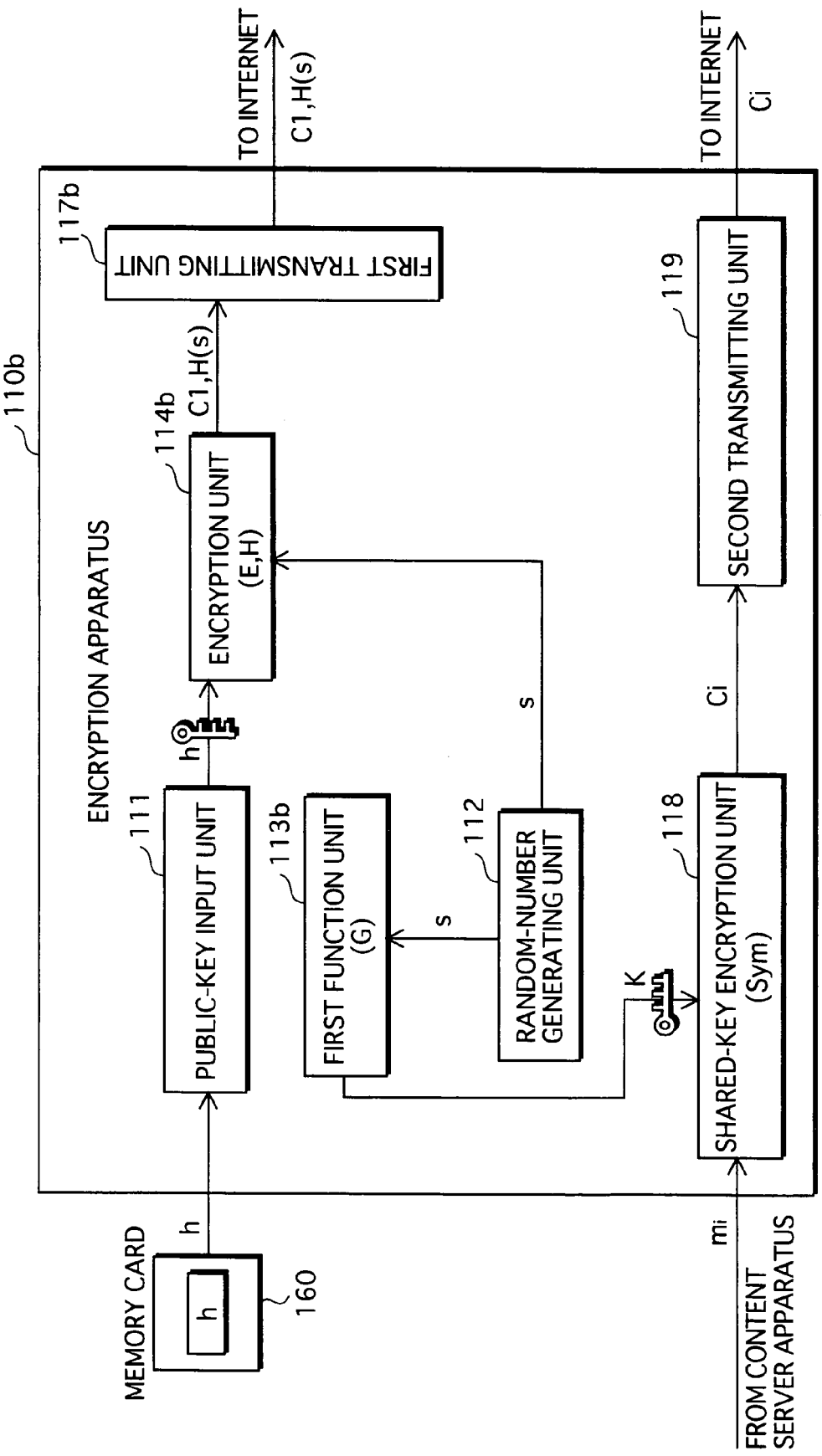
FIG. 6 is a block diagram showing the structure of an encryption apparatus 110$b$.
Figure 7:
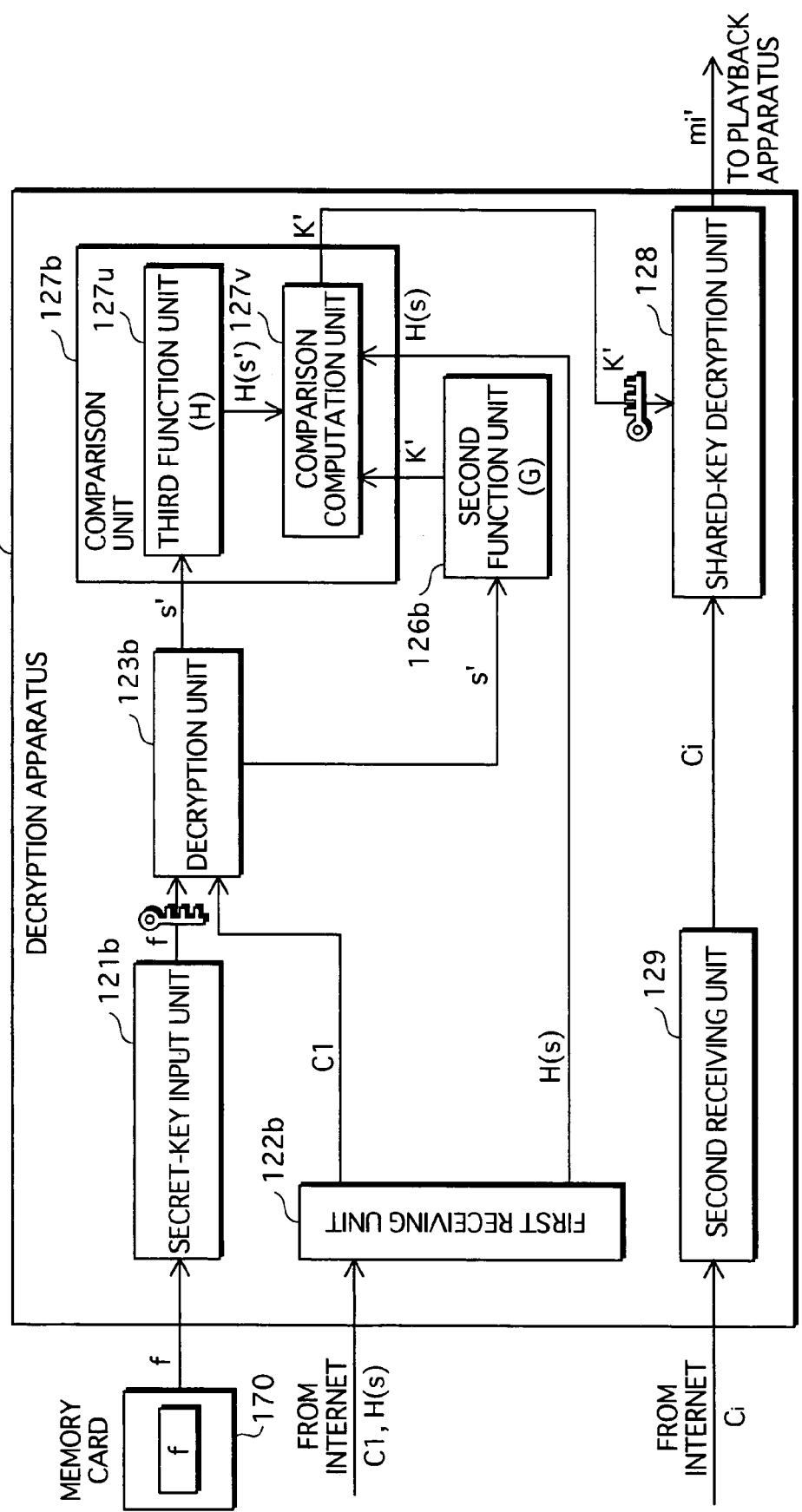
FIG. 7 is a block diagram showing the structure of a decryption apparatus 120$b$.

The content distribution system 10, instead of including the encryption apparatus 110 and the decryption apparatus 120, includes an encryption apparatus 10b and a decryption apparatus 120b. The encryption apparatus 110b, as shown in FIG. 6, includes a public-key input unit 111, a random-number generating unit 112, a first function unit 113b, an encryption unit 114b, a first transmitting unit 117b, a shared-key encryption unit 118, and a second transmitting unit 119. The decryption apparatus 120, as shown in FIG. 7, includes a secret-key input unit 121b, a first receiving unit 122b, a decryption unit 123b, a second function unit 126b, a comparison unit 127b, a shared-key decryption unit 128, and a second receiving unit 129. The comparison unit 127b includes a third function unit 127u and a comparison computation unit 127v.

Figure 8:
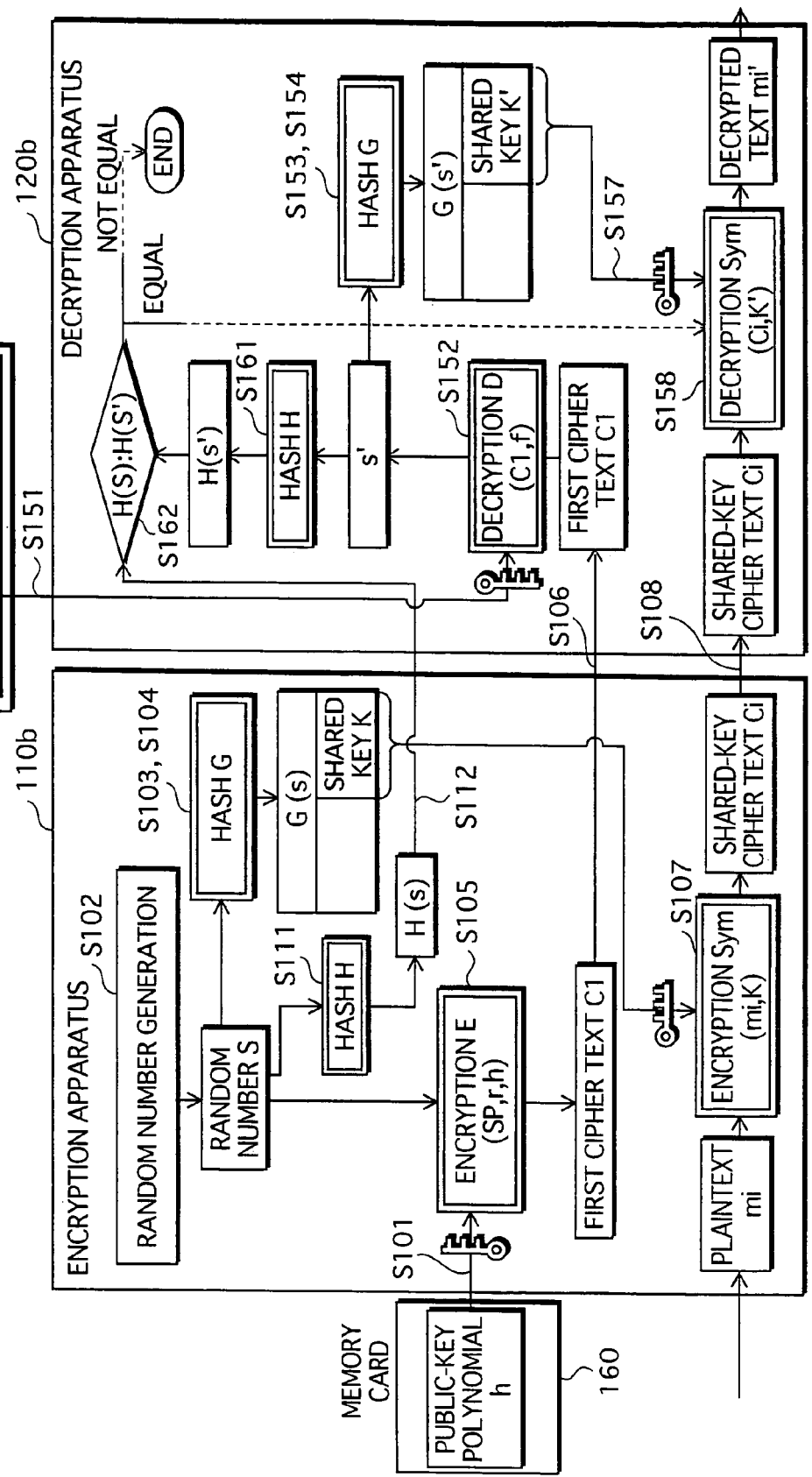
FIG. 8 is a process-block diagram showing the operations of the encryption apparatus 110$b$ and the decryption apparatus 120$b$.

The encryption apparatus 110b generates a hash functional value of the random number s, and the decryption apparatus 120b verifies this hash functional value. During this verification, in the encryption apparatus 110b, the first function unit 113b generates G(s) as shown in the process-block diagram of FIG. 8 (Step S103), and generates K from G(s) (Step S104).

Next, the encryption unit 114b generates a random-number value u, generates a random-number polynomial r from the generated random-number value u, and generates a first cipher text c1 of the random number s using a random-number polynomial r and a public-key polynomial h (Step S105), and finally generates a hash functional value H(s) (Step S111).

The first transmitting unit 117b transmits the first cipher text c1 (Step S106), and transmits the hash functional value H(s) (Step S112).

Next, in the decryption apparatus 120b, the first receiving unit 122b receives the first cipher text c1 (Step S106), and receives the hash functional value H(s) (Step S112).

The decryption unit 123b decrypts the first cipher text c1 using the secret-key polynomial f, to generate s' (Step S152).

Then, the second function unit 126 generates G(s') (Step S153), and generates K' from G(s') (Step S154).

In the comparison unit 127, the third function unit 127u generates H(s') (Step S154), and the comparison computation unit 127v checks whether H(s')=H(s) holds (Step S162), and if it holds, the shared key K' is outputted (Step S157).

In this case, for further heightening security, the method disclosed in the patent reference 1 may be used where encryption is performed on a random number s added additional information, so as to generate a first cipher text c1. Specifically, the following arrangement may be performed. That is, in FIG. 6, the encryption unit 114b generates additional information Ra, and encrypts the value of bit connecting between s and Ra (i.e. s||Ra) to generate a first cipher text c1. In FIG. 7, the decryption unit 123b decrypts the first cipher text c1 to generate s'||Ra', and removes therefrom Ra' to generate a decryption random number s'.

In addition, as shown in the patent reference 1, the value of an invertible conversion of s and Ra, namely F(s, Ra), may be used instead of the value of s||Ra.

2. Second Embodiment

The following describes a content distribution system 10c (unshown in any drawing), as another embodiment relating to the present invention.

The content distribution system 10c is a system based on the content distribution system 10 with some modifications. The differences with the content distribution system 10 are that: a verification value a is generated from G(s), in addition to the random-number value u and the shared key K; and the encryption apparatus, instead of generating the first cipher text by encrypting the random number s and transmitting it, generates a first cipher text c1 resulting from encrypting the verification value a, and a second cipher text c2 resulting from encrypting the random number s based on the verification value a, and transmits the first cipher text c1 and the second cipher text c2.

The following description focuses on the differences mentioned above.

2.1 Structure of Content Distribution System 10c

The content distribution system 10c has the similar structure as the content distribution system 10, except that the encryption apparatus 110 and the decryption apparatus 120 are replaced by an encryption apparatus 110c and a decryption apparatus 120c, respectively. The other components are the same as those included in the content distribution system 10, therefore whose explanation is omitted here.

2.2 Structure of Encryption Apparatus 110i c

Figure 9:
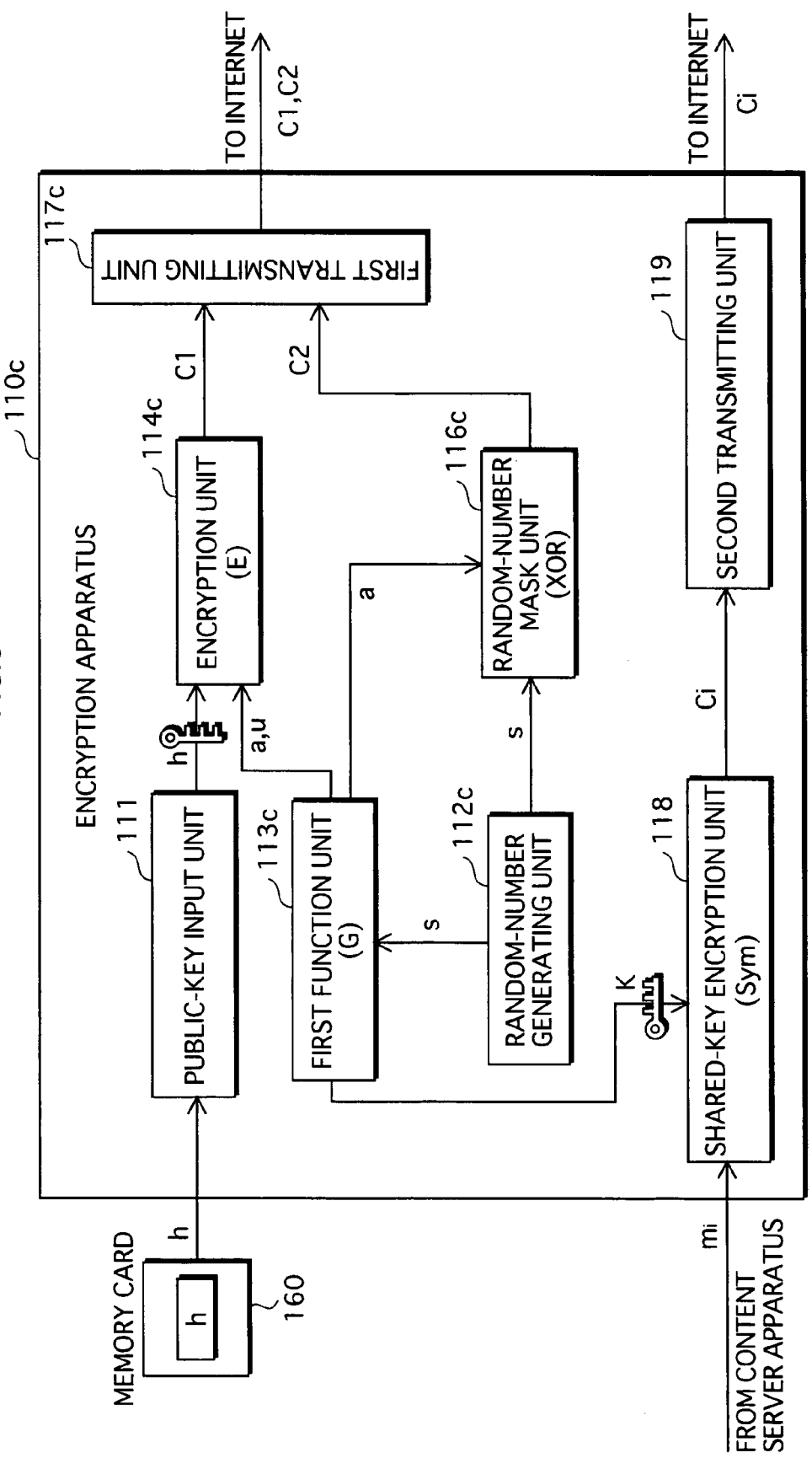
FIG. 9 is a block diagram showing the structure of an encryption apparatus 110$c$.

The encryption apparatus 110c, as shown in FIG. 9, has the similar structure as the encryption apparatus 110, and includes a random-number generating unit 112c, a first function unit 113c, an encryption unit 114c, a random-number mask unit 116c, and a first transmitting unit 117c, instead of the random-number generating unit 112, the first function unit 113, the encryption unit 114, and the first transmitting unit 117.

The following describes the random-number generating unit 112c, the first function unit 113c, the encryption unit 114c, the random-number mask unit 116c, and the first transmitting unit 117c.

(1) Random-number Generating Unit 112c

The random-number generating unit 112c generates a random number s, as a seed value on which generation of the shared key K bases, and outputs the generated random number s to the first function unit 113b and to the random-number mask unit 116c.

(2) First Function Unit 113c

The first function unit 113c receives the random number s from the random-number generating unit 112c, and generates a functional value G(s) of the random numbers, then generates a verification value a, a shared key K, and a random-number value u, from the generated functional value G(s).

Here, the function G is a hash function having output length of 3k bits. The first function unit 113c sets the k highest-order bits of the functional value G(s) as a verification value a, the middle k bits of the functional value G(s) as a shared key K, and the k lowest-order bits of the functional value G(s) as a random-number value u.

Next, the first function unit 113c outputs the verification value a and the random-number value u to the encryption unit 114c, outputs the shared key K to the shared-key encryption unit 118, and outputs the verification value a to the random-number mask unit 116c.

(3) Encryption Unit 114c

The encryption unit 114c receives the public-key polynomial h from the public-key input unit 111, receives the verification value a and the random-number value u from the first function unit 113c, and generates a first cipher text c1 of the verification value a, using the public-key polynomial h and the random-number value u, as shown below. Here, the first cipher text c1 is a cipher text generated according to the NTRU cryptography.

The encryption unit 114c generates a random-number polynomial r having the following characteristic so that it is uniquely defined by the random-number value u. The characteristic of the random-number polynomial r is such that, with respect to the parameter d of the NTRU cryptosystem, each coefficient of d terms is 1, each coefficient of other d terms is −1, and each coefficient of the rest of the terms is 0. Specifically, the encryption unit 114c sets the random-number value u as a default value of the pseudo-random number system (random-number seed), and selects $2d$ pseudo-random numbers, from among $\{0, 1, \ldots, N-1\}$, that do not overlap with each other. Then, the encryption unit 114c sets the coefficients of terms of degree shown by the first d pseudo-random numbers as 1. The encryption unit sets the coefficients of terms of degree shown by the other d pseudo-random numbers as −1, and the coefficients of the rest of the terms of degree as 0. As a result, the encryption unit 114c generates the random-number polynomial r.

Next, the encryption unit 114 converts the verification value a into a verification-value polynomial ap, by constructing the verification-value polynomial ap so that the element for each bit of an N-bit bit sequence in which the verification value a is represented in binary form, corresponds to the coefficient of a different one of the terms of the verification-value polynomial ap. This is for applying the received verification value a to the encryption algorithm E for the NTRU cryptosystem. For example, the element of the b-th lowest bit of the verification value a will be set as the value of the coefficient of the term $X^b$. Concretely, when the verification value a=10010 (representation in bit form), the verification-value polynomial ap=$X^5+X^2$ is generated.

Next, the encryption unit 114c performs the encryption algorithm E on the verification-value polynomial ap, using the public-key polynomial h as a key and also using the random-number polynomial r, to generate the first cipher text c1 (which is the cipher text polynomial)=E(ap,r,h)

Next, the encryption unit 114c outputs the generated first cipher text c1 to the first transmitting unit 117c.

(4) Random-number Mask Unit 116i c

The random-number mask unit 116c receives the random number s from the random-number generating unit 112c, and receives the verification value a from the first function unit 113c. Then, the random-number mask unit 116c generates a second cipher text c2=s xor a, and outputs the generated second cipher text c2 to the first transmitting unit 117c.

Here, xor is an operator representing bitwise exclusive-or.

Note that the random-number mask unit 116c may use a symmetric key encryption algorithm, addition, and multiplication, instead of this xor (bitwise exclusive-or).

(5) First Transmitting Unit 117c

The first transmitting unit 117c receives the first cipher text c1 from the encryption unit 114c, receives the second cipher text c2 from the random-number mask unit 116c, and transmits the first cipher text c1 and the second cipher text c2, to the decryption apparatus 120*c* via the Internet 130.

2.2 Structure of Decryption Apparatus 120*c*

Figure 10:
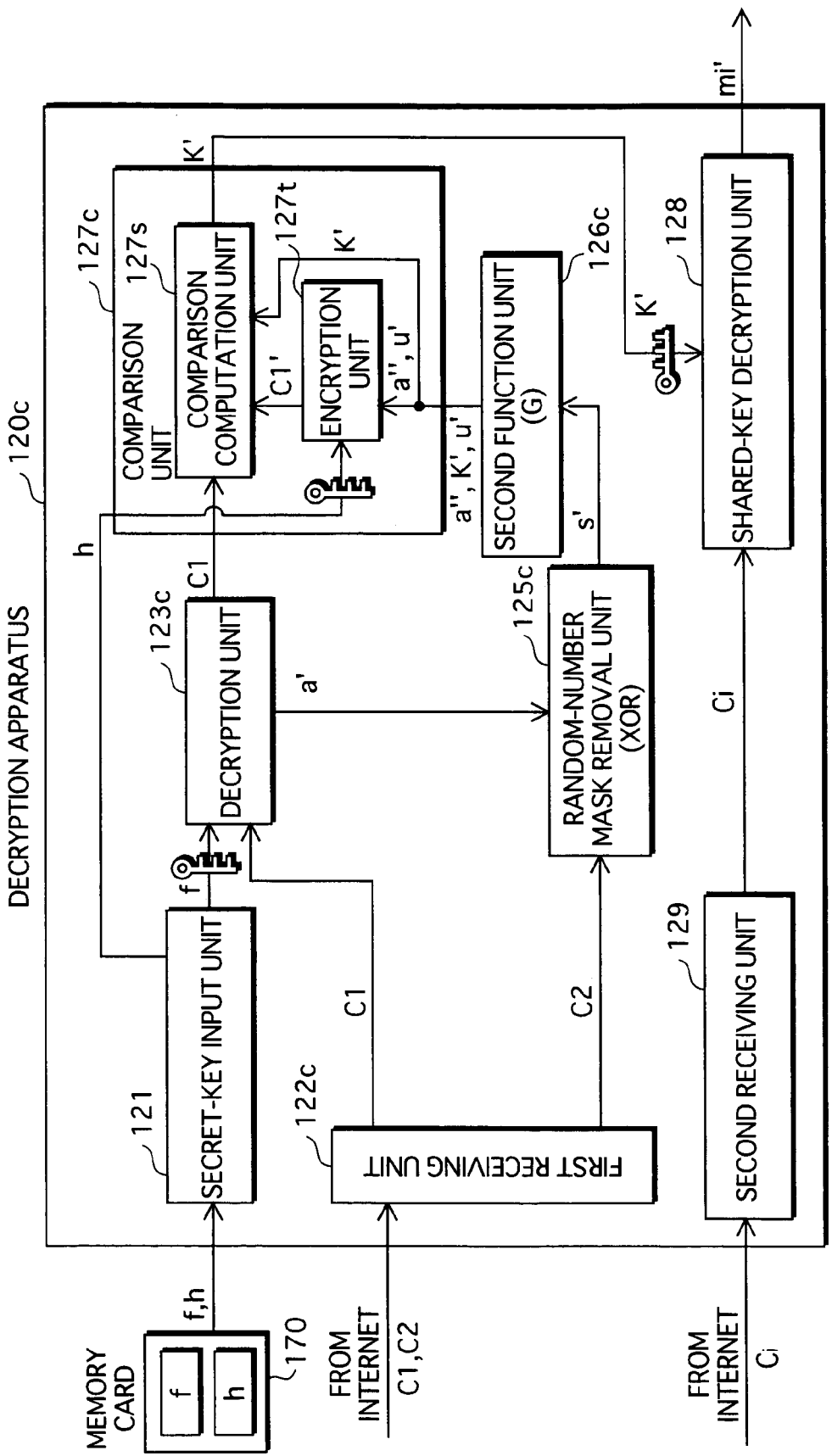
FIG. 10 is a block diagram showing the structure of a decryption apparatus 120$c$.

The decryption apparatus 120*c* has the same structure as the decryption apparatus 120, as shown in FIG. 10, and includes a first receiving unit 122*c*, a decryption unit 123*c*, a random-number mask removal unit 125*c*, a second function unit 126*c*, and a comparison unit 127*c*, in place of the first receiving unit 122, the decryption unit 123, the second function unit 126, and the comparison unit 127.

Here, the first receiving unit 122*c*, the decryption unit 123*c*, the random-number mask removal unit 125*c*, the second function unit 126*c*, and the comparison unit 127*c* will be described.

(1) First Receiving Unit 122*c*

The first receiving unit 122*c* receives the first cipher text c1 and the second cipher text c2, from the encryption apparatus 110*c* via the Internet 130. The first receiving unit 122*c* then outputs the first cipher text c1 to the decryption unit 123*c*, and outputs the second cipher text c2 to the random-number mask removal unit 125*c*.

(2) Decryption Unit 123*c*

The decryption unit 123*c* receives the secret-key polynomial f from the secret-key input unit 121, and receives the first cipher text c1 from the first receiving unit 122*c*, then as shown in the following, decrypts the first cipher text c1 using the secret-key polynomial f, to generate a decryption verification value a'. Here, the decryption verification value a' is a decrypted text generated according to the NTRU cryptosystem.

The decryption unit 123*c* performs the decryption algorithm D on the first cipher text c1 using the secret-key polynomial f as a key, to generate the decryption verification-value polynomial ap'=D(c1,f). Here, the decryption verification-value polynomial ap' is an NTRU cryptographic decrypted text, and is represented in polynomial form. Therefore the decryption unit 123*c* converts the decryption verification-value polynomial ap' into the decryption verification value a', so that the coefficient for each term of the decryption verification-value polynomial ap' corresponds to the element of each bit of the decryption verification value a', where the decryption verification value a' is an N-bit bit sequence represented in binary form. For example, the coefficient of the term $X^b$ which is the term of b-th degree of the decryption verification-value polynomial ap' is set as the element of the b-th lowest bit of the decryption verification value a'. Concretely, if the decryption verification-value polynomial ap'=$X^5+X^2$, conversion is performed so that the decryption verification value a'=10010 (representation in bit form).

Next, the decryption unit 123*c* outputs the generated decryption verification value a' to the random-number mask removal unit 125*c*, and outputs the received first cipher text c1 to the comparison unit 127*c*.

(3) Random-number Mask Removal Unit 125*c*

The random-number mask removal unit 125*c* receives the second cipher text c2 from the first receiving unit 122*c*, receives the decryption verification value a' from the decryption unit 123*c*, and then generates a decryption random number s'=c2 xor a', and outputs the generated decryption random number s' to the second function unit 126*c*.

Note that when the random-number mask unit 116*c*, instead of the bitwise exclusive-or, uses the symmetric key cryptographic encryption algorithm, the addition, or the multiplication, the random-number mask removal unit 125*c* may use the symmetric key cryptographic decryption algorithm corresponding to the symmetric key cryptographic encryption algorithm, or the subtraction, or the division.

(4) Second Function Unit 126*c*

The second function unit 126*c* has an algorithm for a function G that is the same as the function owned by the first function unit 113*c*.

The second function unit 126*c* receives the decryption random number s' from the random-number mask removal unit 125*c*, and generates a functional value G(s') of the received decryption random number s'. Next, as in the same manner as in the first function unit 113*c*, the second function unit 126*c* generates, from the functional value G(s'), a verification value a", a shared key K', and a random-number value u', and outputs the verification value a", the shared key K', and the random-number value u' to the comparison unit 127*c*.

(5) Comparison Unit 127*c*

The comparison unit 127*c*, as shown in FIG. 10, includes a comparison computation unit 127*s* and an encryption unit 127*t*.

The encryption unit 127*t* receives the public-key polynomial h from the secret-key input unit 121, and receives the verification value a" and the random-number value u' from the second function unit 126*c*. Then, the encryption unit 127*t*, in the same manner as in the encryption unit 114*c*, encrypts the verification value a", to generate the first re-cipher text c1', and outputs the generated first re-cipher text c1' to the comparison computation unit 127*s*.

Furthermore, the comparison computation unit 127*s* receives the shared key K' form the second function unit 126*c*, receives the first cipher text c1 from the decryption unit 123*c*, and receives the first re-cipher text c1' from the encryption unit 127*t*. Then, the comparison computation unit 127*s* compares the first cipher text c1 and the first re-cipher text c1', and if the first cipher text c1=the first re-cipher text c1', outputs the received shared key K' to the shared-key decryption unit 128.

2.3 Operation Performed by Content Distribution System 10*c*

Figure 11:
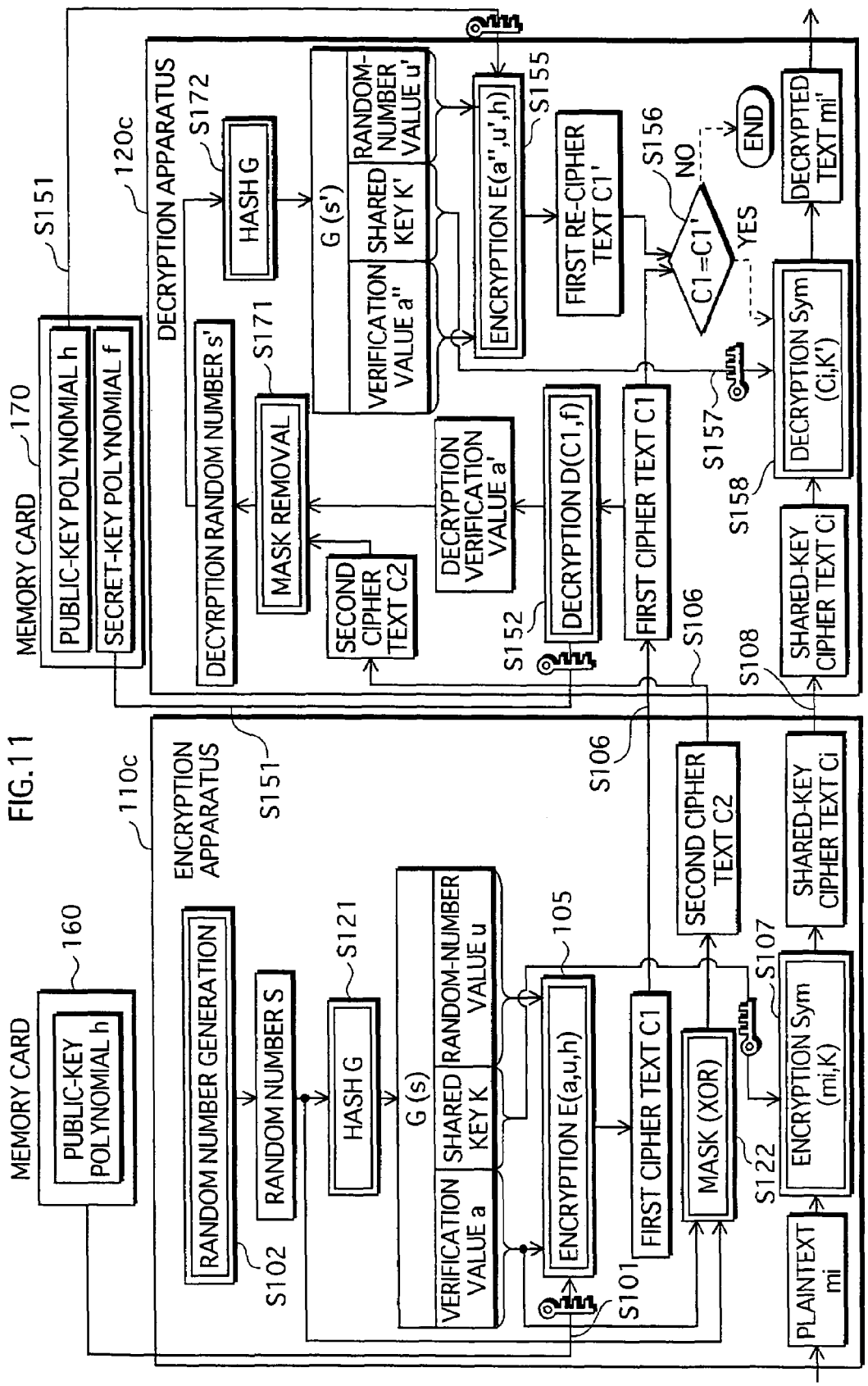
FIG. 11 is a process-block diagram showing the operations of the encryption apparatus 110$c$ and the decryption apparatus 120$c$.

As follows, the whole operation performed by the content distribution system 10*c* is described, using the process-block diagram of FIG. 11.

The encryption apparatus 110*c* receives the public-key polynomial h of the decryption apparatus 120*c* (Step S101), generates a random numbers (Step S102), obtains a functional value G(s), and derives a verification value a, a shared key K, and a random-number value u, from the functional value G(s) (Step S121). Next, the encryption apparatus 110*c* encrypts the verification value a using the public-key polynomial h and the random-number value u and according to the NTRU cryptosystem, to generate a first cipher text c1 (Step S105), and encrypts the random number s based on the verification value a, to generate the second cipher text c2=s xor a (Step S122). Next, the encryption apparatus 110*c* transmits the first cipher text c1 and the second cipher text c2 to the decryption apparatus 120*c* via the Internet 130 (Step S106).

Specifically, this encryption apparatus 110*c* performs the following operations, so as to transmit the cipher text C=(c1, c2) to the decryption apparatus 120*c*.

(a) Generate a random number s.
(b) Generate G(s), and generate a, K, and u from the G(s).
(c) Generate a first cipher text c1 of a verification value a, using a public-key polynomial h and a random-number value u.
(d) Generate c2=s xor a.

Next, the encryption apparatus 110*c* encrypts the plaintext mi(1=<i=<n) received from the content server apparatus 140, using the derived shared key K and according to the symmetric key cryptography, to generate a cipher text Ci(1=<i=<n) (Step S107), and transmits the cipher text Ci(1=<i=<n) to the decryption apparatus 120*c* via the Internet 130 (Step S108).

On the other hand, the decryption apparatus 120c receives the secret-key polynomial f and the public-key polynomial h for the decryption apparatus 120c (Step S151), receives the first cipher text c1 and the second cipher text c2, form the encryption apparatus 10c via the Internet 130 (Step S106), and decrypts the first cipher text c1 using the secret-key polynomial f, to generate a decryption verification value a' (Step S152). Then, the decryption apparatus 120c decrypts the second cipher text c2 based on the decryption verification value a', to generate a decryption random number s'=c2 xor a' (Step S171). Next, the decryption apparatus 120c derives a verification value a", a shared key K', and a random-number value u', from the functional value G (s') of the decryption random number s' (Step S172). Further, the decryption apparatus 120c encrypts the verification value a", to generate a first re-cipher text c1' (Step S155), and if c1'=c1 (Step S156), outputs the shared key K' (Step S157).

Specifically, this decryption apparatus 120c performs the following operations, so as to derive the shared key K'.
(a) Decrypt a first cipher text c1 using a secret-key polynomial f, to generate a'.
(b) Generate s'=c2 xor a'.
(c) Generate G(s'), and generate a", K', u' from the G(s').
(d) Generate a first re-cipher text c1' of a" using a public-key polynomial h and a random-number value u'.
(e) Check to see if c1'=c1 holds. If it holds, output the shared key K'.

Here, if the decryption apparatus 120c has used the regular secret-key polynomial f that corresponds to the public-key polynomial h used in the encryption apparatus 110c, the first cipher text c1 will be correctly decrypted, thereby yielding a decryption verification value a' =a, and a decryption random number s'=s (the decryption random number s' having been generated from the second cipher text c2 and a'). Therefore, a verification value a"=a (the verification value a" having been derived from G(s")), and so a shared key K'=K, and a random-number value u'=u will hold. As a result, a"=a', and u'=u hold, therefore c1'=c1 will hold too. This means that the decryption apparatus 120c has derived the shared key K that is the same one derived by the encryption apparatus 110c.

Next, the decryption apparatus 120c receives the shared-key cipher text Ci(1=<i=<n) from the encryption apparatus 110c via the Internet 130 (Step S108), and decrypts the shared-key cipher text Ci(1=<i=<n) using the derived shared key K' (=K) and according to the symmetric key cryptography to generate a decrypted text mi'(1=<i=<n) (Step S158), and outputs the decrypted text mi'(1=<i=<n) to the playback apparatus 150.

Here, since the encryption key K (used for generation of shared-key cipher text) is identical to the encryption key K' (used for generation of decrypted text), the decryption apparatus 120c can obtain the correct decrypted text mi'=mi (1=<i=<n).

Note that if a decryption error has occurred, the decryption verification value a' and the verification value a are not identical. The decryption random number s' obtained from the second cipher text c2 is different from s, too. Therefore, the random-number value u' and the shared key K', which are derived from the G(s'), are respectively different from u and K. In this case however, since a' and u' are respectively different from a and u, the first re-cipher text c1' is different from the first cipher text c1. Therefore, the decryption apparatus 120c will not output the shared key K'.

2.4 Effect of Second Embodiment

In the conventional RSA-KEM algorithm, an element s will be inputted into the hash function G to derive a shared key K, the element s being unable to be derived from the cipher text C unless the secret key is known. However, there is a possibility of decryption error if a shared key is attempted to be distributed, using the NTRU cryptosystem and applying the RSA-KEM algorithm that is a key encapsulation mechanism. This means that occasionally the elements cannot be derived even using the secret key, thereby deriving an incorrect shared key K'.

However the content distribution system, the encryption/decryption apparatuses that relate to the second embodiment are able to prevent derivation of different key between the encryption apparatus and the decryption apparatus even when a decryption error occurs. This is realized by the process of the second embodiment, as follows. In this process, in addition to a shared key, a verification value a and a random-number value u are generated from the hash functional value G(s) of the random number s, and the decryption apparatus re-encrypts the decryption verification value a' using the random-number value u and the public-key polynomial h, to generate a first re-cipher text c1', and unless the first re-cipher text c1' is identical to the first cipher text c1, the decryption apparatus will not output the shared key K'.

In addition, according to the method of the present invention, the security can be logically verified using the same method as the verification method described in the non-patent reference 3.

2.5 Modification Example

The second embodiment described above is one example of carrying out the present invention. However, the present invention is not limited to this particular embodiment, and can be carried with various modifications as long as they are within the scope of the present invention. Needless to say, the same modifications as those in the first embodiment can be applied hereto, but the following cases are also included in the present invention.

(1) The conversion from the verification value a to the verification-value polynomial ap may be other methods. For example, the conversion may be performed using a function that corresponds the element of each bit in the bit sequence to the coefficient of each term in the polynomial, in one-to-one relation. Alternatively, the mentioned conversion may be performed using a functional-value table that stores the element of each bit in the bit sequence and the coefficient of each term in the polynomial in one-to-one relation.

In addition, the conversion from the random-number value u to the random-number polynomial r may be performed in other methods, as long as the following conditions are held: r is uniquely obtained from r, and the coefficient of d terms of degree is 1, the coefficient of d terms of degree is −1, and the coefficient of other terms of degree is 0. For example, the conversion may be performed using a function or a functional-value table, which correspond a random-number value u to a polynomial.

(2) The public-key cryptosystem, used in the encryption unit 114c and the decryption unit 123c, is not limited to the one described above, as long as its encryption unit 114c is operable to encrypt a verification value a using a public key and a random-number value u to generate a first cipher text c1, and its decryption unit 123c is operable to decrypt the first cipher text c1 using a secret key to generate a decryption verification value a' which is identical to the verification value a. Accordingly, the public-key cryptosystem used in the encryption unit 114c and in the decryption unit 123c may be other cryptosystems different from the NTRU cryptosystem, as long as a random number is used therein.

For example, if the ElGamal cryptosystem is to be used, h and f may be respectively set as a public key and a secret key of the ElGamal cryptosystem. Then, in the encryption unit 114c, a is encrypted using h and the random-number value u, to generate c1, and in decryption unit 123c, c1 is decrypted using f, to generate a'.

(3) In the second embodiment, the random-number value u is generated in the first function unit 113c and in the second function unit 126c. However, other generation methods may be used therefor, as long as the same value is generated in the encryption apparatus 110c and in the decryption apparatus 120c.

For example, u=Func(s) may be used with respect to an arbitrary function Func, so that the encryption apparatus 10c obtains the same value as that the decryption apparatus 120c obtains. More specifically, the following processes may be used.

Generate G(s), and generate a and K from the G(s).
Generate Func(s), and sets u=Func(s).

(4) Moreover, the random-number value u is generated in the first function unit 113c and in the second function unit 126c. However, the condition to be satisfied is to obtain the same value therefor, between the encryption apparatus 110c and the decryption apparatus 120c. Accordingly, the encryption apparatus 110c may directly transmit the random-number value u to the decryption apparatus 120c.

More specifically, the encryption apparatus 110c may transmit the cipher text C and the random-number value u to the decryption apparatus 120b, as follows. Here, the random-number value u may be encrypted before being transmitted.

Generate G(s), and generate a, and K from the G(s).
The encryption apparatus 110c transmits the random-number value u separately, to 120b.

(5) As for the random-number value u, the condition is that the encryption apparatus 110c and the decryption apparatus 120c obtain the same value. Therefore, it may be arranged to generate part of the information for the random-number value u in the first function unit 113c and in the second function unit 126c, and to directly transmit the rest of the information for the random-number value u from the encryption apparatus 110c to the decryption apparatus 120c.

For instance, the encryption apparatus 110c may transmit the cipher text C and the random-number value u2 to the decryption apparatus 120c, as in the following. In addition, the encryption apparatus may encrypt the random-number value u2 before transmission.

Generate a, K, u1, from the G(s).
The encryption apparatus 110c transmits the random-number value u2 separately to the decryption apparatus 120c.
The encryption apparatus 110c generates the random-number value u=u1 xor u2.

(6) The decryption apparatus 120c checks whether the first cipher text c1 is a cipher text of the verification value a", obtained in the second function unit 126c, and if c1=cipher text of a", decrypts the shared-key cipher text C1 using the shared key K'. Alternatively, however, it is possible to check whether the first cipher text c1 is a cipher text of the decryption verification value a'.

Figure 12:
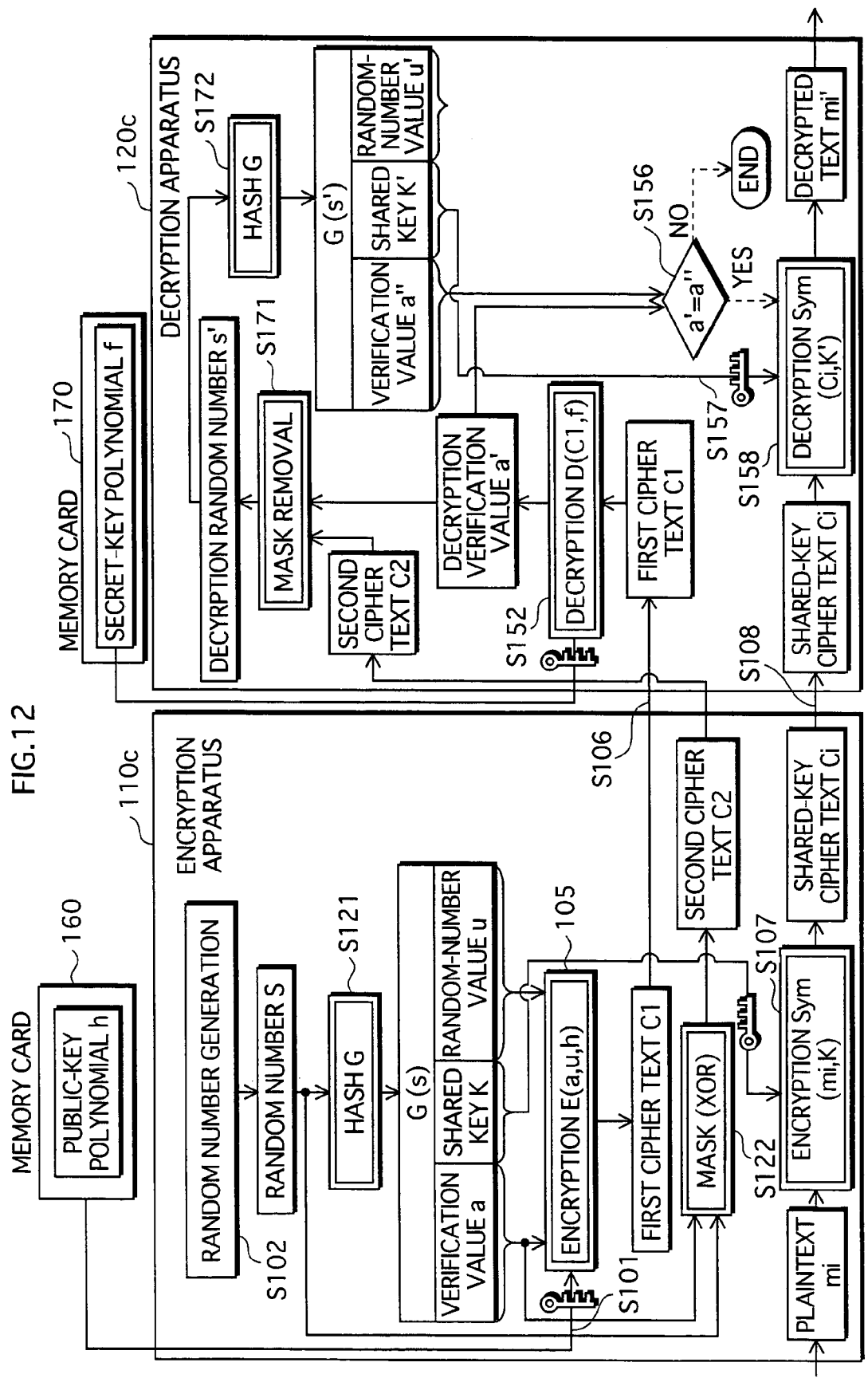
FIG. 12 is a process-block diagram showing the operations of a modification example for the encryption apparatus 110$c$ and the decryption apparatus 120$c$.

(7) The decryption apparatus 120c checks whether the first cipher text c1 is a cipher text of the verification value a", obtained in the second function unit 126c, and if c1=cipher text of a", decrypts the shared-key cipher text C1 using the shared key K'. Alternatively, however, the comparison unit 127c may be arranged to check whether the value of a' resulting from decryption of the decryption unit 123c is equal to the value of a" generated by the second function unit 126c, as shown in Step S156 of the process-block diagram of FIG. 12.

(8) In the second embodiment, the shared key K' is outputted when the first re-cipher text c1' is identical to the first cipher text c1, so as to prevent derivation of different shared keys for the encryption apparatus 110c and the decryption apparatus 120c. However, instead of the above arrangement, the following arrangement may be performed. That is, the encryption apparatus 110c generates a hash functional value for at least one of the random numbers, the verification value a, the random-number value u, and the shared key K, and transmits the generated hash functional value to the decryption apparatus 120c. The decryption apparatus 120c then verifies the hash functional value, thereby determining whether to output the shared key K'. Alternatively, the method disclosed in the patent reference 1 may be used therefor. In other words, the modification example (8) relating to the first embodiment may be used instead.

3. Summary of First and Second Embodiments

As described so far, the present invention is a shared-key generation apparatus, which outputs shared-key data, and encryption shared-key data resulting from encrypting the shared-key data based on predetermined public-key data. The shared-key generation apparatus specifically includes: a secret-number data generating unit operable to generate secret-number data; a shared-key derivation unit operable to convert the secret-number data into random-number data and the shared-key data, based on a predetermined process; and a first encryption unit operable to encrypt the secret-number data based on the public-key data and the random-number data, to generate encryption shared-key data.

In addition, the present invention is a shared-key generation apparatus, which outputs shared-key data, and encryption shared-key data resulting from encrypting the shared-key data based on predetermined public-key data. The shared-key generation apparatus specifically includes: a secret-number generating unit operable to generate secret-number data; a shared-key derivation unit operable to convert the secret-number data into verification-value data, random-number data, and the shared-key data; a first encryption unit operable to encrypt the verification-value data based on the public-key data and the random-number data, to generate first encryption preliminary data; and a second encryption unit operable to encrypt the secret-number data based on the verification-value data, to generate second encryption preliminary data, where the encryption shared-key data is made up of the first encryption preliminary data and the second encryption preliminary data.

Here, the second encryption unit may perform bitwise exclusive-or on the secret-number data and the verification-value data, to generate the second encryption preliminary data.

Here, the second encryption unit may encrypt the secret-number data using the verification-value data as a cryptographic key and according to the symmetric key cryptography, to generate the second encryption preliminary data.

Here, the second encryption unit may add the verification-value data to the secret-number data, to generate the second encryption preliminary data.

Here, the second encryption unit may multiply the secret-number data by the verification-value data, to generate the second encryption preliminary data.

Here, the encryption shared-key data may be bit connecting data between the first encryption preliminary data and the second encryption preliminary data.

Here, the first encryption unit may perform NTRU cryptographic encryption, to generate the encryption shared-key data.

Here, the first encryption unit may perform NTRU cryptographic encryption, to generate the first encryption preliminary data.

Here, the secret-number data may be a random number having been randomly generated.

Here, the shared-key derivation unit may use a one-way hash function, as the predetermined process.

Furthermore, the present invention is a shared-key recovery apparatus, which decrypts encryption shared-key data based on secret-key data and public-key data that are predetermined, to generate shared-key data, and outputs the generated shared-key data. The shared-key recovery apparatus includes: a first decryption unit operable to decrypt the encryption shared-key data based on the secret-key data, to generate secret-number data; a shared-key derivation unit operable to convert the secret-number data into random-number data and the shared-key data, based on a predetermined process; and a third encryption unit operable to encrypt the secret-number data based on the public-key data and the random-number data, to generate re-encryption shared-key data, where the shared-key recovery apparatus outputs the shared-key data when the encryption shared-key data is equal to the re-encryption shared-key data.

In addition, the present invention is a shared-key recovery apparatus, which decrypts encryption shared-key data based on secret-key data and public-key data that are predetermined, to generate shared-key data, and outputs the generated shared-key data, the encryption shared-key data being made up of first encryption preliminary data and second encryption preliminary data. The shared-key recovery apparatus includes: a first decryption unit operable to decrypt the first encryption preliminary data based on the secret-key data, to generate verification-value data; a second decryption unit operable to decrypt the second encryption preliminary data based on the verification-value data, to generate secret-number data; a shared-key derivation unit operable to convert, based on a predetermined process, the secret-number data into verification-value verification data, random-number data, and the shared-key data; and a third encryption unit operable to encrypt the verification-value verification data based on the public-key data and the random-number data, to generate third encryption preliminary data, where the shared-key recovery apparatus outputs the shared-key data when the first encryption preliminary data is equal to the third encryption preliminary data.

In addition, the present invention is a shared-key recovery apparatus, which decrypts encryption shared-key data based on secret-key data and public-key data that are predetermined, to generate shared-key data, and outputs the generated shared-key data, the encryption shared-key data being made up of first encryption preliminary data and second encryption preliminary data. The shared-key recovery apparatus includes: a first decryption unit operable to decrypt the first encryption preliminary data based on the secret-key data, to generate verification-value data; a second decryption unit operable to decrypt the second encryption preliminary data based on the verification-value data, to generate secret-number data; a shared-key derivation unit operable to convert, based on a predetermined process, the secret-number data into verification-value verification data, random-number data, and the shared-key data; and a third encryption unit operable to encrypt the verification-value data based on the public-key data and the random-number data, to generate third encryption preliminary data, where the shared-key recovery apparatus outputs the shared-key data when the first encryption preliminary data is equal to the third encryption preliminary data.

Here, the second decryption unit may perform bitwise exclusive-or on the second encryption preliminary data and on the verification-value data, to generate the secret-number data.

Here, the second decryption unit may decrypt the second encryption preliminary data using the verification-value data as a cryptographic key and according to the symmetric key cryptography, to generate the secret-number data.

Here, the second decryption unit may subtract the verification-value data from the second encryption preliminary data, to generate the secret-number data.

Here, the second decryption unit may divide the second encryption preliminary data by the verification-value data, to generate the secret-number data.

Here, the first decryption unit may perform NTRU cryptographic decryption, to generate the shared-key data.

Here, the first decryption unit may perform NTRU cryptographic decryption, to generate the verification-value data.

Here, the shared-key derivation unit may use a one-way hash function, as the predetermined process.

Furthermore, the present invention is an encryption apparatus that encrypts plaintext data based on predetermined public-key data, to generate cipher-text data. The encryption apparatus includes: a secret-number data generating unit operable to generate secret-number data; a shared-key derivation unit operable to convert, based on a predetermined process, the secret-number data into random-number data and shared-key data; a first encryption unit operable to encrypt the secret-number data based on the public-key data and the random-number data, to generate first encryption preliminary data; a second encryption unit operable to encrypt the plaintext data based on the shared-key data, to generate second encryption preliminary data, where the cipher-text data is made up of the first encryption preliminary data and the second encryption preliminary data.

Further, the present invention is a decryption apparatus that decrypts cipher-text data made up of first encryption preliminary data and second encryption preliminary data, based on secret-key data and public-key data that are predetermined, to generate decrypted-text data, and outputs the decrypted-text data. The decryption apparatus includes: a first decryption unit operable to decrypt the first encryption preliminary data based on the secret-key data, to generate secret-number data; a shared-key derivation unit operable to convert, based on a predetermined process, the secret-number data into random-number data and shared-key data; a third encryption unit operable to encrypt the secret-number data based on the public-key data and the random-number data, to generate third encryption preliminary data; and a decryption unit operable, when the first encryption preliminary data is equal to the third encryption preliminary data, to decrypt the second encryption preliminary data based on the shared-key data, to generate the decrypted-text data.

In addition, the present invention is a cryptosystem comprised of an encryption apparatus and a decryption apparatus, the encryption apparatus encrypting plaintext data based on predetermined public-key data to generate cipher-text data, and the decryption apparatus decrypting the cipher-text data based on the public-key data and predetermined secret-key data and outputting resulting decrypted-text data. The encryption apparatus includes: a secret-number data generating unit operable to generate secret-number data; a shared-key derivation unit operable to convert, based on a predetermined process, the secret-number data into random-number data and shared-key data; a first encryption unit operable to encrypt the secret-number data based on the public-key data and the random-number data, to generate first encryption preliminary data; a second encryption unit operable to encrypt the plaintext data based on the shared-key data, to generate second encryption preliminary data, where the cipher-text data is made up of the first encryption preliminary data, the second encryption preliminary data, and third encryption preliminary data. The decryption apparatus includes: a first decryption unit operable to decrypt the first encryption preliminary data based on the secret-key data, to generate secret-number data; a shared-key derivation unit operable to convert, based on a predetermined process, the secret-number data into random-number data and shared-key data; a third encryption unit operable to encrypt the secret-number data based on the public-key data and the random-number data, to generate the third encryption preliminary data; and a decryption unit operable, when the first encryption preliminary data is equal to the third encryption preliminary data, to decrypt the second encryption preliminary data based on the shared-key, to generate the decrypted-text data.

As described above, the present invention has been conceived in view of the problems that the conventional system has, and constructs in a cryptosystem a new encapsulation mechanism to which NTRU cryptosystem can be applied to, thereby preventing derivation of different keys between its encryption apparatus and decryption apparatus, and realizing assured cryptographic communication from the transmission apparatus to the reception apparatus, with use of a key derived from the key encapsulation mechanism.

As is clear from the above, the present invention provides a cryptosystem that the conventional technologies were not able to provide, and therefore is very valuable.

4. Third Embodiment

The following describes a content distribution system 10d (unshown in any drawing), as another embodiment relating to the present invention.

The content distribution system 10d is a system resulting by modifying the content distribution system 10.

The following describes the content distribution system 10d, focusing on the differences with the content distribution system 10.

4.1 Structure of Content Distribution System 10d

The content distribution system 10d has the similar structure as the content distribution system 10, except that the encryption apparatus 110 and the decryption apparatus 120 are replaced by an encryption apparatus 110d and a decryption apparatus 120d, respectively. The other components are the same as those included in the content distribution system 10, therefore whose explanation is omitted here.

The content distribution system 10d is a cryptographic communication system that performs cryptographic communication that uses NTRU cryptography and performs key distribution according to the key encapsulation mechanism. In the content distribution system 10d, the encryption apparatus 110d and the decryption apparatus 120d are connected to each other, via the Internet 130.

4.2 Structure of Encryption Apparatus 110d

Figure 13:
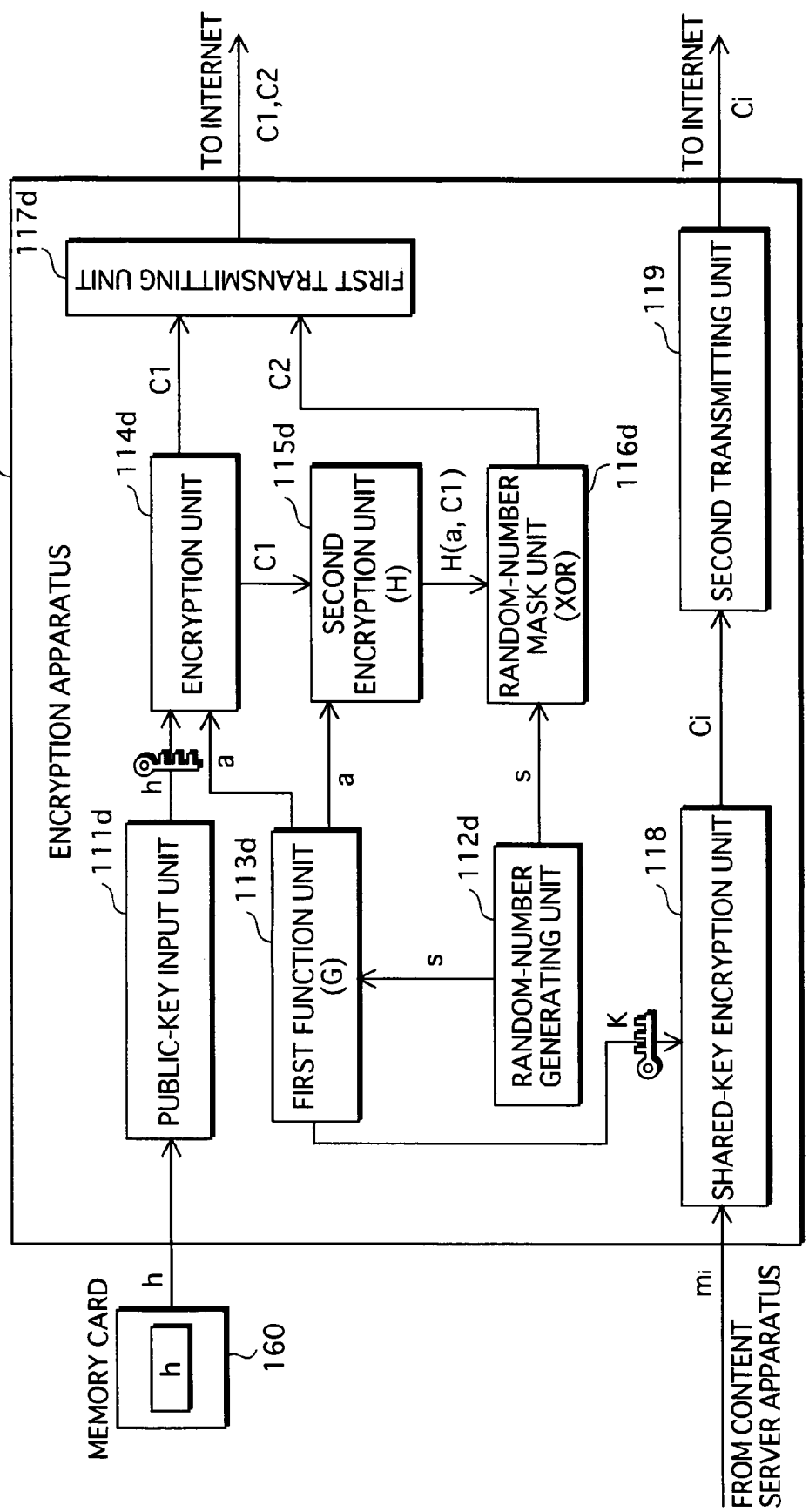
FIG. 13 is a block diagram showing the structure of an encryption apparatus 110$d$.

The encryption apparatus 110d, as shown in FIG. 13, includes a public-key input unit 111d, a random-number generating unit 112d, a first function unit 113d, an encryption unit 114d, a second function unit 115d, a random-number mask unit 116d, a first transmitting unit 117d, a shared-key encryption unit 118, and a second transmitting unit 119.

The encryption apparatus 110d is a computer system similar to the encryption apparatus 110, and performs its function, by operation of the microprocessor according to the computer program.

(1) Public-key Input Unit 111d

The public-key input unit 111d reads, from the memory card 160, the public-key polynomial h for the decryption apparatus 120, and outputs the read public-key polynomial h to the encryption unit 114d.

(2) Random-number Generating Unit 112d

The random-number generating unit 112d generates a random number s, as a seed value on which the generation of the shared key K bases, and outputs the generated random numbers to the first function unit 113d and the random-number mask unit 116d.

(3) First Function Unit 113d

The first function unit 113d receives the random number s from the random-number generating unit 112d, and generates a functional value G(s) of the random numbers, then generates a verification value a, and a shared key K, from the generated functional value G(s). Here, the function G is a hash function having output length of 2k bits. Note that the hash function is one of the one-way functions. The first function unit 113d sets the k highest-order bits of the G(s) as a verification value a, and the k lowest-order bits of the G(s) as a shared key K.

Next, the first function unit 113d outputs the generated verification value a to the encryption unit 114d and to the second function unit 115d, and outputs the generated shared key K to the shared-key encryption unit 118.

(4) Encryption Unit 114d

The encryption unit 114d receives the public-key polynomial h from the public-key input unit 111d, and receives the verification value a from the first function unit 113d. Then, as described below, the encryption unit 114d generates a first cipher text c1 of the verification value a using the received public-key polynomial h. Here, the generated first cipher text c1 is a cipher text generated according to NTRU cryptosystem.

The encryption unit 114d randomly generates a random-number polynomial r, so that with respect to the parameter d of NTRU cryptosystem, each coefficient of d terms is 1, each coefficient of other d terms is −1, and each coefficient of the rest of the terms is 0. Next, the encryption unit 114d generates the verification-value polynomial ap, so that the element for each bit of an N-bit bit sequence in which the verification value a is represented in binary form, corresponds to the coefficient of a different one of the terms of the verification-value polynomial ap. This is for applying the verification value a to the encryption algorithm E of the NTRU cryptosystem. For example, the element of the b-th lowest bit of the verification value a will be set as the coefficient of the term $X^b$ of the verification-value polynomial ap, thereby converting the verification value a into the verification-value polynomial ap. Concretely, when s=10010 (representation in bit form), conversion is performed so that the verification-value polynomial ap=$X^5+X^2$. Next, the encryption unit 114d performs the encryption algorithm E on the verification-value polynomial ap, using the public-key polynomial hand the random-number polynomial r, to generate the following:

The first cipher text c1=the cipher text polynomial E(ap,r, h).

Next, the encryption unit 114d outputs the generated first cipher text c1 to the second function unit 115d and to the first transmitting unit 117d.

(5) Second Function Unit 115d

The second function unit 115d receives the verification value a from the first function unit 113d, and receives the first cipher text c1 from the encryption unit 114d. Then, as described below, the second function unit 115d generates a functional value for the verification value a and the first cipher text c1, namely the functional value H(a, c1).

Here, the function H is a hash function, and is one of the one-way functions.

The first cipher text c1 is an NTRU cryptographic cipher text and is represented in polynomial form.

Therefore the second function unit 115d generates a first cipher text bit sequence c1', so that the coefficient of each term of the first cipher text c1 corresponds to the element of each bit of the N-bit first cipher-text bit sequence c1', which is represented in binary form. For example, the coefficient of the term $X^b$ which is the term of b-th degree of the first cipher text c1 is set as the element of the b-th lowest bit of the first cipher-text bit sequence c1', thereby converting the first cipher text c1 into the first cipher-text bit sequence c1'. Concretely, if the first cipher text c1=$X^5+X^2$, the conversion is performed so that the first cipher-text bit sequence c1'=10010 (representation in bit form).

Next, the second function unit 115d inputs, into the hash function H, a||c1' (which is the bit connecting between the verification value a and the first cipher-text bit sequence c1'), to generate the functional value H(a, c1)=H(a||c1'). Here, "||" is an operand representing bit connecting.

Next, the second function unit 115d outputs the generated functional value H(a, c1) to the random-number mask unit 116d.

(6) Random-number Mask Unit 116d

The random-number mask unit 116d receives the random number s from the random-number generating unit 112d, and receives the functional value H(a, c1) from the second function unit 115d. Next, the random-number mask unit 116d generates the second cipher text c2=s xor H(a,c1), and outputs the generated second cipher text c2 to the first transmitting unit 117d.

Note that the random-number mask unit 116d may use the symmetric key cryptographic encryption algorithm, addition, and multiplication, instead of xor (bitwise exclusive-or).

(7) First Transmitting Unit 117d

The first transmitting unit 117d receives the first cipher text c1 from the encryption unit 114d, and receives the second cipher text c2 from the random-number mask unit 116d. Then the first transmitting unit 117d transmits the first cipher text c1 and the second cipher text c2, to the decryption apparatus 120d via the Internet 130.

(8) Shared-key Encryption Unit 118 and Second Transmitting Unit 119

The shared-key encryption unit 118 and the second transmitting unit 119 are the same as the shared-key encryption unit 118 and the second transmitting unit 119 that are included in the encryption apparatus 110, except the following points.

The shared-key encryption unit 118 receives the shared key K from the first function unit 113d.

4.3 Structure of Decryption Apparatus 120d

Figure 14:
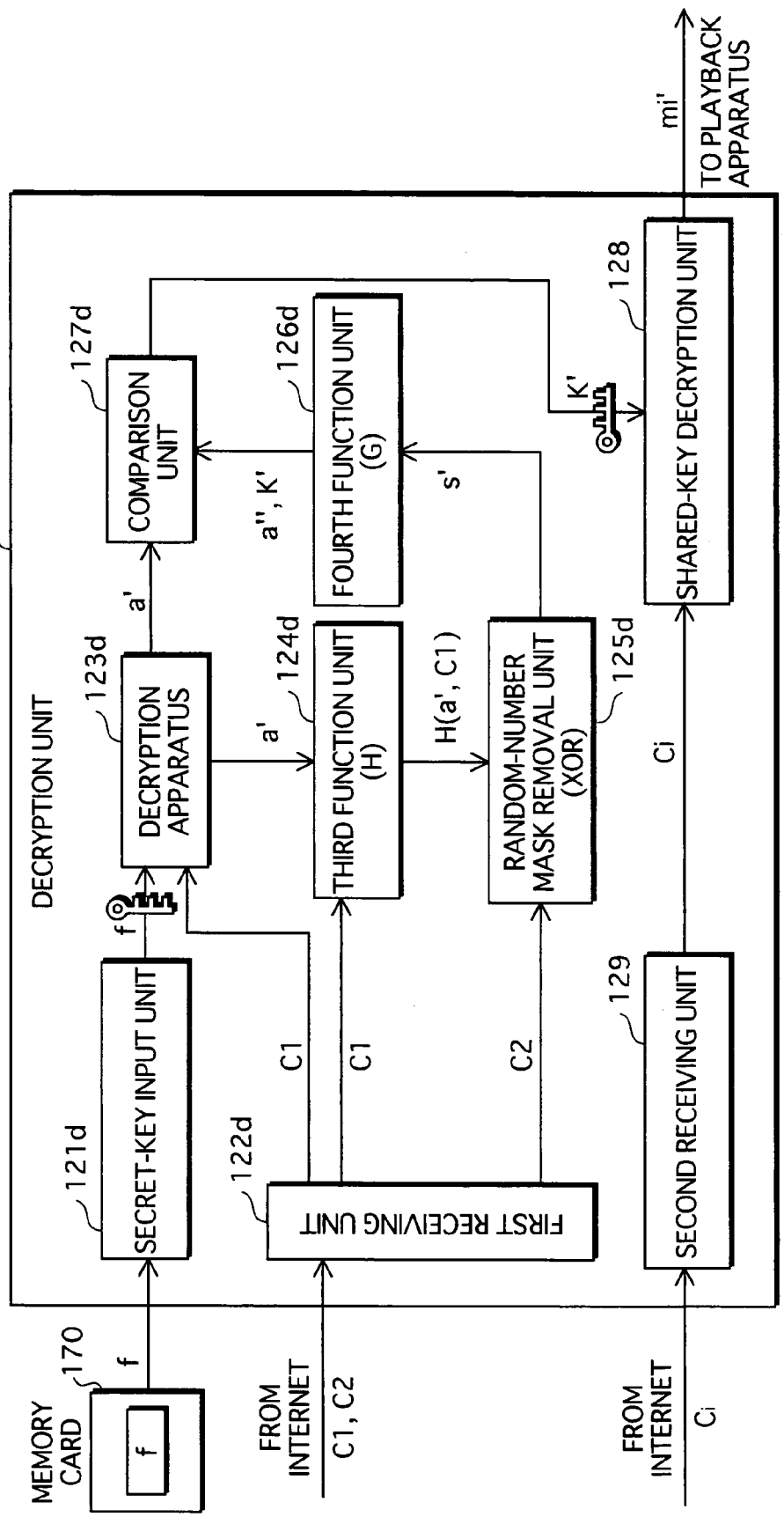
FIG. 14 is a block diagram showing the structure of a decryption apparatus 120$d$.

The decryption apparatus 120d, as shown in FIG. 14, is comprised of a secret-key input unit 121d, a first receiving unit 122d, a decryption unit 123d, a third function unit 124d, a random-number mask removal unit 125d, a fourth function unit 126d, a comparison unit 127d, a shared-key decryption unit 128, and a second receiving unit 129.

The decryption apparatus 120d is a computer system similar to the decryption apparatus 120, and performs its function by operation of the microprocessor according to the computer program.

Note that the shared-key decryption unit 128 and the second receiving unit 129 are respectively the same as the shared-key decryption unit 128 and the second receiving unit 129 that are included in the decryption apparatus 120, and therefore will not be described in the following.

(1) Secret-key Input Unit 121d

The secret-key input unit 121d reads, from the memory card 170, the secret-key polynomial f for the decryption apparatus 120d, and outputs the read secret-key polynomial f to the decryption unit 123d.

(2) First Receiving Unit 122d

The first receiving unit 122d receives the first cipher text c1 and the second cipher text c2, from the encryption apparatus 110d via the Internet 130, and outputs the received first cipher text c1 to the decryption unit 123d and to the third function unit 124d, and outputs the received second cipher text c2 to the random-number mask removal unit 125d.

Note that when the random-number mask unit 116d, instead of the bitwise exclusive-or, uses the symmetric key cryptographic encryption algorithm, the addition, or the multiplication, the random-number mask removal unit 125d may use the symmetric key cryptographic decryption algorithm corresponding to the symmetric key cryptographic encryption algorithm, the subtraction, or the division.

(3) Decryption Unit 123d

The decryption unit 123d receives the secret-key polynomial f from the secret-key input unit 121d, and receives the first cipher text c1 from the first receiving unit 122d, and decrypts the first cipher text c1 using the secret-key polynomial f to generate a decryption verification value a'. Here, the decryption verification value a' is an NTRU cryptographic decrypted text.

The decryption unit 123d performs the decryption algorithm D on the first cipher text c1 using the secret-key polynomial f, to generate the decryption verification-value polynomial ap'=D(c1,f). Since the decryption verification-value polynomial ap' is an NTRU cryptographic decrypted text and is represented in polynomial form, the decryption unit 123d generates a decryption verification value a', so that each coefficient of the decryption verification-value polynomial ap' corresponds to the number of each bit of the N-bit bit sequence in which the decrypted verification value a' is represented in binary form. For example, the coefficient of the term $X^b$ which is the term of b-th degree of the decryption verification-value polynomial ap' is set as the element of the b-th lowest bit of the decryption verification value a', thereby converting the decryption verification-polynomial ap' into the decryption verification value a'. Concretely, if the decryption verification-value polynomial ap'=$X^5+X^2$, conversion is performed so that the decryption verification value a'=10010 (representation in bit form).

Next, the decryption unit 123d outputs the decryption verification value a' to the third function unit 124d and to the comparison unit 127d.

(4) Third Function Unit 124d

The third function unit 124d has an algorithm for a function H that is the same function owned by the second function unit 115d.

The third function unit 124d receives the first cipher text c1 from the first receiving unit 122d, and receives the decryption verification value a' from the decryption unit 123d. Next, the third function unit 124d, in the same manner as in the second function unit 115d, generates a functional value of the verification value a' and the first cipher text c1, namely H(a',c1), and outputs the generated H(a',c1) to the random-number mask removal unit 125d.

(5) Random-number Mask Removal Unit 125d

The random-number mask removal unit 125d receives the second cipher text c2 from the first receiving unit 122d, and receives the hash functional value H(a',c1) from the third function unit 124d. Then it generates a decryption random number s'=c2 xor H(a',c1), and outputs the generated decryption random numbers to the fourth function unit 126d.

(6) Fourth Function Unit 126d

The fourth function unit 126d has an algorithm for a function G that is the same as the function owned by the first function unit 113d.

The fourth function unit 126d receives the decryption random number s' from the random-number mask removal unit 125d, and generates a hash functional value G(s') of the decryption random number s'. Next, in the same manner as the first function unit 113d, the fourth function unit 126d generates a verification value a" and a shared key K' from the functional value G(s'), and outputs the verification value a" and the shared key K' to the comparison unit 127d.

(7) Comparison Unit 127d

The comparison unit 127d receives the decryption verification value a' from the decryption unit 123d, receives the verification value a" and the shared key K' from the fourth function unit 126d, and checks whether the decryption verification value a' is equal to the verification value a". If they are equal, the comparison unit 127d outputs the shared key K' to the shared-key decryption unit 128.

(8) Shared-key Decryption Unit 128 and Second Receiving Unit 129

The shared-key decryption unit 128 receives the shared key K' from the comparison unit 127d.

For other points, the shared-key decryption unit 128 is the same as the shared-key decryption unit 128 included in the decryption apparatus 120, and so description thereof is omitted here.

In addition, the second receiving unit 129 is the same as the second receiving unit 129 included in the decryption apparatus 120, and description thereof is omitted here.

4.4 Operation of Content Distribution System 10d

Figure 15:
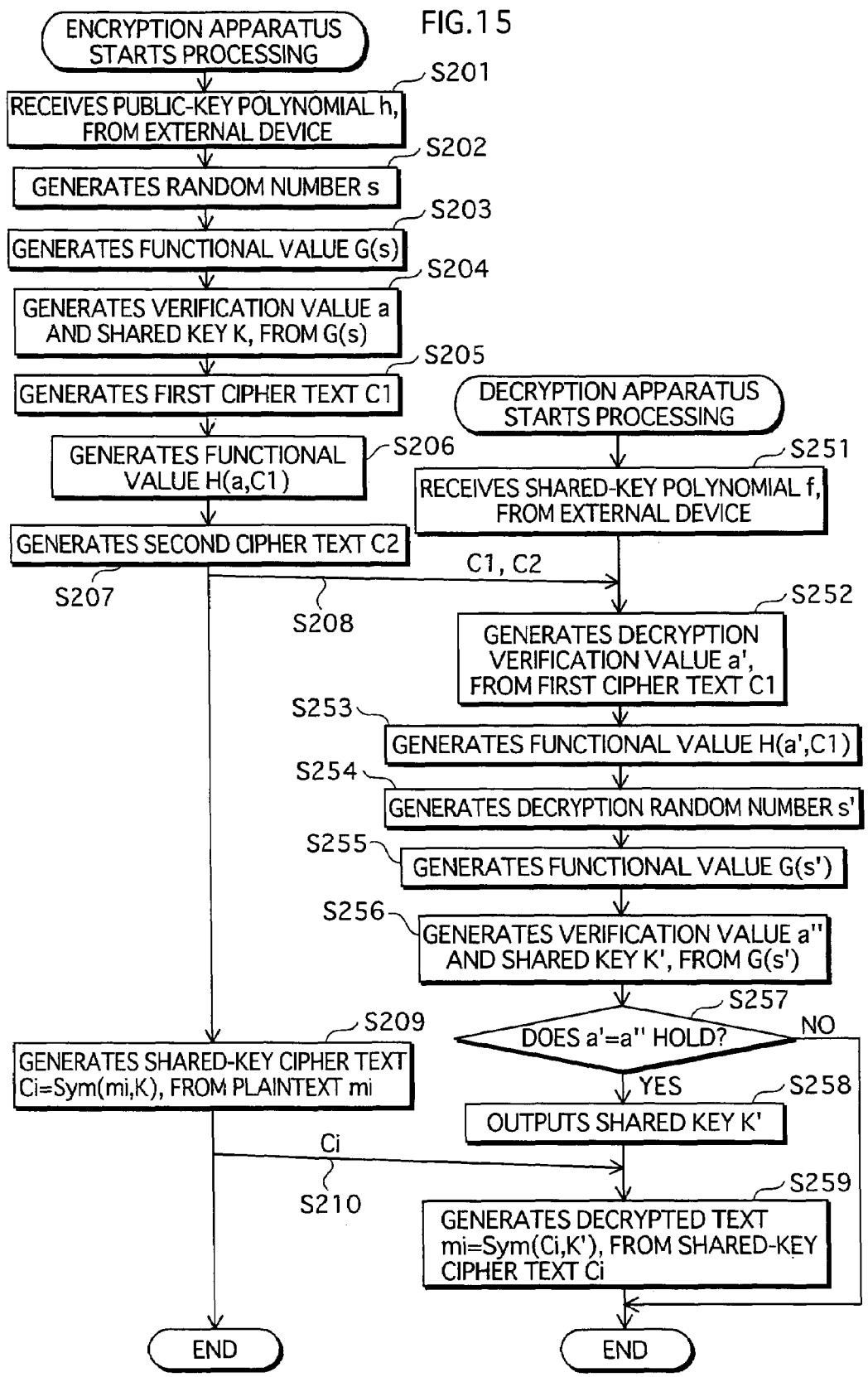
FIG. 15 is a flowchart showing the operations of the encryption apparatus 110$d$ and the decryption apparatus 120$d$.
Figure 16:
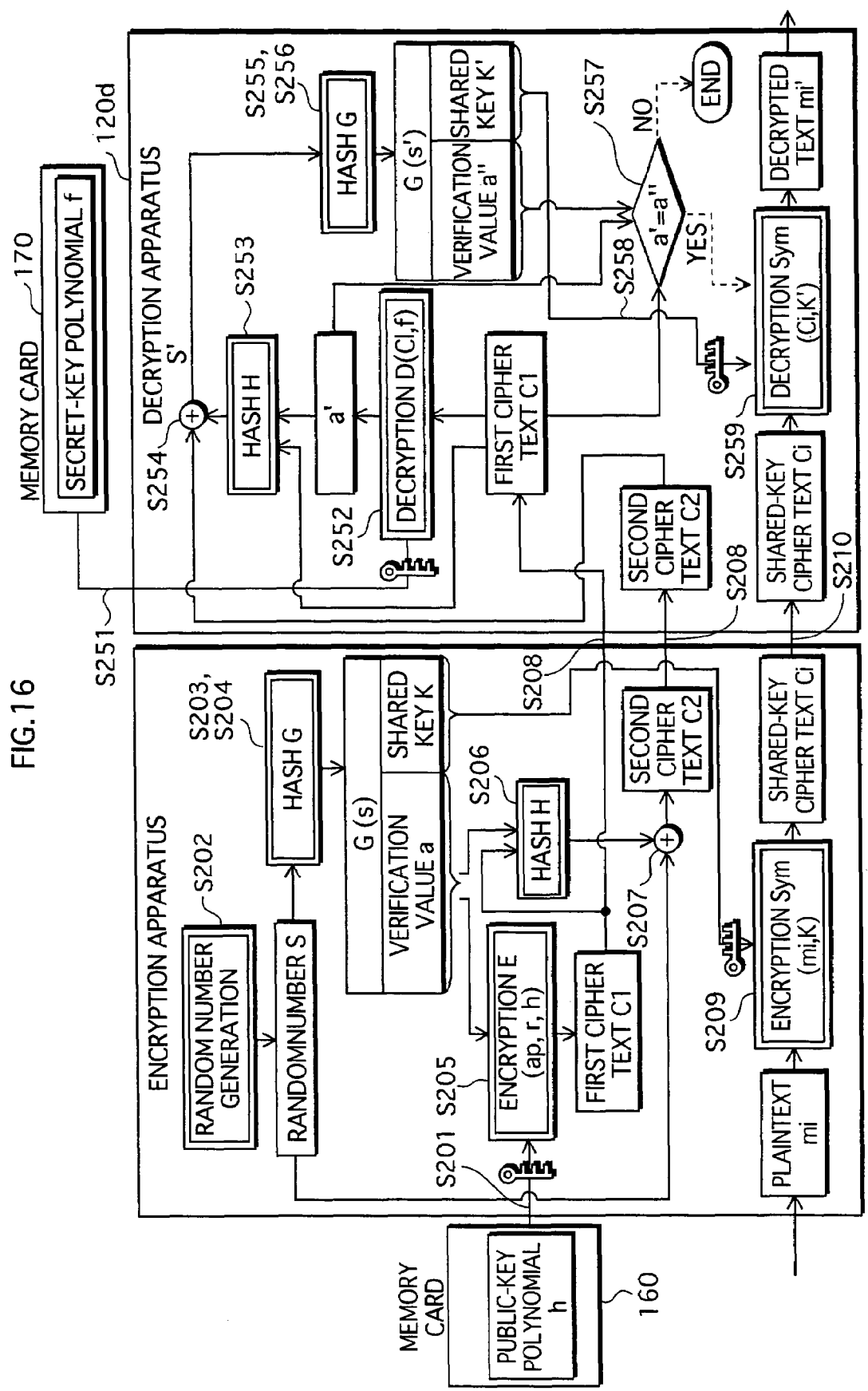
FIG. 16 is a process-block diagram showing the operations of the encryption apparatus 110$d$ and the decryption apparatus 120$d$.

The operations performed by the content distribution system 10d are described, using the process-block diagrams of FIG. 15 and FIG. 16.

The public-key input unit 111d receives, from the memory card 160, the public-key polynomial h for the decryption apparatus 120d, and outputs the public-key polynomial h to the encryption unit 114d (Step S201).

Next, the random-number generating unit 112d generates a random number s, and outputs the random number s to the first function unit 113d and to the random-number mask unit 116d (Step S202).

The first function unit 113d receives the random number s from the random-number generating unit 112d, and generates a functional value G(s) for the random number s (Step S203). Then the first function unit 113d generates a verification value a and a shared key K from the functional value G (s), outputs the verification value a to the encryption unit 114d and to the second function unit 115d, and outputs the shared key K to the shared-key encryption unit 118 (Step S204).

Next, the encryption unit 114d receives the public-key polynomial h from the public-key input unit 111d, and receives the verification value a from the first function unit 113d. Then, the encryption unit 114d generates a first cipher text c1 of the verification value a using the public-key polynomial h, and outputs the first cipher text c1 to the second function unit 115d and to the first transmitting unit 117d (Step S205).

Next, the second function unit 115d receives the verification value a from the first function unit 113d, receives the first cipher text c1 from the encryption unit 114d, and generates a functional value of the verification value a and the first cipher text c1, namely the functional value H(a,c1), and outputs the functional value H(a,c1) to the random-number mask unit 116 (Step S206).

The random-number mask unit 116d receives the random number s from the random-number generating unit 112d, and receives the functional value H(a,c1) from the second function unit 115d. The random-number mask unit 116d generates a second cipher text c2=s xor H(a, c1) and outputs the second cipher text c2 to the first transmitting unit 117d (Step S207).

Next, the first transmitting unit 117d receives the first cipher text c1 from the encryption unit 114d, receives the second cipher text c2 from the random-number mask unit 116d, and transmits the first cipher text c1 and the second cipher text c2 to the decryption apparatus 120d via the Internet 130 (Step S208).

Next, the shared-key encryption unit 118 receives a plurality of plaintexts mi(1=<i=<n) from a content server apparatus 140, receives the shared key K from the first function unit 113d, and performs the symmetric key cryptographic algorithm Sym on the plaintext mi(1=<i=<n) to generate a shared-key cipher text Ci=Sym(mi,K) (1=<i=<n), and outputs the shared-key cipher text Ci(1=<i=<n) to the second transmitting unit 119 (Step S209).

The second transmitting unit 119 receives the shared-key cipher text Ci(1=<i=<n) from the shared-key encryption unit 118, transmits the shared-key cipher text Ci(1=<i=<n) to the decryption apparatus 120 via the Internet 130 (Step S210), and ends the operations.

On the other hand, the secret-key input unit 121d receives, from the memory card 170, the secret-key polynomial f for the decryption apparatus 120d, and outputs the secret-key polynomial f to the decryption apparatus 123 (Step S251).

The first receiving unit 122d receives the first cipher text c1 and the second cipher text c2 from the encryption apparatus 110d via the Internet 130, outputs the first cipher text c1 to the decryption unit 123d and to the third function unit 124d, and outputs the second cipher text c2 to the random-number mask removal unit 125d (Step S208).

Next, the decryption unit 123d receives the secret-key polynomial f from the secret-key input unit 121, and receives the first cipher text c1 from the first receiving unit 122d. Then the decryption unit 123d decrypts the first cipher text c1 using the secret-key polynomial f, to generate a decryption verification value a', and outputs the decryption verification value a' to the third function unit 124d and to the comparison unit 127d (Step S252).

Next, the third function unit 124d receives the first cipher text c1 from the first receiving unit 122d, and receives the decryption verification value a' from the decryption unit 123d. Then as in the same manner as the second function unit 115d, the third function unit 124d generates a functional value H(a',c1) of the verification value a' and the first cipher text c1, and outputs the functional value H (a',c1) to the random-number mask removal unit 125d (Step S253).

The random-number mask removal unit 125d receives the second cipher text c2 from the first receiving unit 122d, receives the hash functional value (a', c1) from the third function unit 124d, generates a decryption random number s'=c2 xor H(a',c1), and outputs the decryption random number s to the fourth function unit 126d (Step S254).

The fourth function unit 126d receives the decryption random number s' from the random-number mask removal unit 125, and generates a hash functional value G(s') of the decryption random number s' (S255). In the same manner as the first function unit 113d, the fourth function unit 126d generates a verification value a" and a shared key K' from the functional value G(s'), and outputs the verification value a" and the shared key K' to the comparison unit 127d (Step S256).

Next, the comparison unit 127d receives the decryption verification value a' from the decryption unit 123, receives the verification value a" and the shared key K' from the fourth function unit 126d, checks whether the decryption verification value a' is equal to the verification value a", and if they are not equal (Step S257), ends the operations.

If the decryption verification value a' and the verification value a" are equal (Step S257), the comparison unit 127d outputs the shared key K' to the shared-key decryption unit 128 (Step S258).

Next, the second receiving unit 129 receives the cipher text $Ci(1=<i=<n)$ from the encryption apparatus 110d via the Internet 130, and outputs it to the shared-key decryption unit 128 (Step S210).

The shared-key decryption unit 128 receives the shared key K' from the comparison unit 127d, receives the shared-key cipher text $Ci(1=<i=<n)$ from the second receiving unit 129, performs the symmetric key cryptographic algorithm Sym on the shared-key cipher text $Ci(1=<i=<n)$ using the shared key K' to generate the decrypted text $mi'=Sym(Ci,K)$ $(1=<i=<n)$, and outputs the decrypted text $mi'(1=<i=<n)$ to an external device (Step S259), and ends the operations.

4.5 Operation Verification of Content Distribution System 10d

As follows, the entire operation performed by the content distribution system 10d is described. First, the encryption apparatus 10d generates a random numbers, using the public-key polynomial h of the decryption apparatus 120d as an input, and derives a verification value a and a shared key K, from the functional value G(s). Next, the encryption apparatus 110d encrypts the verification value a using the public-key polynomial h and according to the NTRU cryptosystem, to generate a first cipher text c1. Then the encryption apparatus 10d generates a functional value H(a,c1) from the verification value a and the first cipher text c1, and generates a second cipher text c2=s xor H(a,c1) from the random number s and the functional value H(a,c1). Next, the encryption apparatus 110d transmits the first cipher text c1 and the second cipher text c2 to the decryption apparatus 120d via the Internet 130.

Specifically, this encryption apparatus 110d performs the following operations, so as to transmit the cipher text C=(c1, c2) to the decryption apparatus 120d.

Generate a random number s.
Generate G(s), and generate a and K, from the G(s).
Generate a first cipher text c1 of the verification value a, using a public-key polynomial h.
Generate c2=s xor H(a,c1).
Output the shared key K and the cipher text C=(c1,c2).

Next, the encryption apparatus 110d encrypts the plaintext $mi(1=<i=<n)$ having been inputted from a content server apparatus 140, using the derived shared key K and according to the symmetric key cryptography, to generate a cipher text $Ci(1=<i=<n)$, and transmits the cipher text $Ci(1=<i=<n)$ to the decryption apparatus 120d via the Internet 130.

On the other hand, the decryption apparatus 120d, using the secret-key polynomial f of the decryption apparatus 120d as an input, receives the first cipher text c1 and the second cipher text c2 from the encryption apparatus 110d via the Internet 130, and decrypts the first cipher text c1, using the secret-key polynomial f, to generate a decryption verification value a'. Then, the decryption apparatus 120d generates a functional value H(a',c1) from the decryption verification value a' and the first cipher text c1, and generates a decryption random number s'=c2 xor H(a',c1), from the second cipher text c2 and the functional value H(a',c1). The decryption apparatus 120d derives a verification value a" and a shared key K', from the functional value G(s') of the decryption random number s', and if the verification value a"=a', outputs the shared key K'.

Specifically, this decryption apparatus 120d performs the following operations, so as to derive the shared key K'.

Decrypts the first cipher text c1 using the secret-key polynomial f, to generate a'.
Generate s'=c2 xor H(a',c1).
Generate G(s'), and generate a" and K' from the G(s').
Check to see if a"=a' holds. If it holds, output the shared key K'.

Here, if the decryption apparatus 120d has used the correct secret-key polynomial f that corresponds to the public-key polynomial h that the encryption apparatus 110d has used, the first cipher text c1 will be correctly decrypted, to generate the decryption verification value a'=a, therefore the decryption random number s'=s (the decryption random number s' having been generated from the second cipher text c2 and the H(a',c1)). Therefore, the verification value a"=a (the verification value a" having been derived from the G(s')). As a result, K'=K holds. Since a"=a' holds, the decryption apparatus 120d can derive the same shared key K as that derived by the encryption apparatus 110d.

Next, the decryption apparatus 120d decrypts the shared-key cipher text $Ci(1=<i=<n)$ having been received from the encryption apparatus 110d via the Internet 130, using the derived shared key K' (=K) and according to the symmetric key cryptography, to generate a decrypted text $mi'(1=<i=<n)$, and outputs the decrypted text mi' to the playback apparatus 150.

Since the encryption key K (used for generation of the shared-key cipher text) is identical to the encryption key K' (used for generation of decrypted text), the decryption apparatus can obtain the correct $mi'=mi$ $(1=<i=<n)$.

4.6 Effect of Third Embodiment

The conventional RSA-KEM algorithm uses a*P and a*W as input of a hash function H, and uses the Diffie-Hellman problem in the final stage of deriving the shared key K, with which the derivation of the shared key K is difficult unless the secret key is known. Therefore, other public-key cryptosystems that do not use the Diffie-Hellman problem, such as the NTRU cryptography, cannot take advantage of the PSEC-KEM algorithm, since these cryptosystems do not have inputs that correspond to a*P, and a*W of the Diffie-Hellman problem.

However in the present invention, the content distribution system, the encryption apparatus, and the decryption apparatus have a verification value a and its cipher text c1, as input of a hash function H. Therefore, PSEC-KEM algorithm can be applied, so as to use the NTRU cryptosystem and the other public-key cryptosystems.

Note that in the NTRU cryptosystem, there is a possibility that the resulting decrypted text is different from an original plaintext, even if a public key is used to encrypt a plaintext to generate a cipher text, and the cipher text is decrypted using the secret key (e.g. refer to the non-patent reference 2). If such a decryption error has occurred, an incorrect decryption verification value a' will be obtained. However, the decryption apparatus of the present invention will not output the shared key K', since a' will not be equal to the verification value a" obtained from G(s'). Therefore, the present invention has an effect of preventing different keys to be established between the encryption apparatus and the decryption apparatus, even if a decryption error has occurred.

In addition, the decryption apparatus will not perform operation for generating a re-cipher text. Therefore, the computation amount will be reduced, compared to the conventional technology.

According to this, key encapsulation mechanism can be constructed using the NTRU cryptography, and so the key distribution is realized between the encryption apparatus and decryption apparatus using the NTRU cryptography.

In addition, according to the system of the present invention, the security can be logically verified using the same method as the verification method described in the non-patent reference 3.

4.7 Modification Example

The third embodiment described above is one example of carrying out the present invention. Needless to say, the present invention is not limited to this particular embodiment, and can be carried with various modifications as long as they are within the scope of the present invention. In light of this, the following cases are included in the present invention.

(1) The parameter N to be used in NTRU cryptosystem may take other value than 167.

(2) The conversion from a bit sequence to polynomial, performed in the encryption unit 114d, the second function unit 115d, the decryption unit 123d, and the third function unit 124d, is not limited to as described and may be other methods.

For example, the conversion may be performed using a function or a functional-value table, which correspond bit sequence and polynomial in one-to-one relation.

Alternatively, the conversion method stated in the modification example (1) for the second embodiment may also be used.

(3) The public-key cryptosystem, used in the encryption unit 114d and in the decryption unit 123d, is not limited to the one described, as long as its encryption unit 114d is operable to encrypt a verification value a using a public key to generate a first cipher text c1, and its decryption unit 123d is operable to decrypt the first cipher text c1 using a secret key, to generate a decryption verification value a' that is equal to the verification value a.

Accordingly, the public-key cryptosystem used in the encryption unit 114d and in the decryption unit 123d may be other cryptosystems different from the NTRU cryptosystem.

For example, if the RSA cryptosystem is to be used, h and f may be respectively set as a public key and a secret key of the RSA cryptosystem. Then, in the encryption unit 114d, a is encrypted using h, to generate c1, and in decryption unit 123d, c1 is decrypted using f, to generate a'.

In addition, if the ElGamal cryptosystem is to be used, h and f may be respectively set as a public key and a secret key of the ElGamal cryptosystem. Then, in the encryption unit 114d, the random number r is generated, and a is encrypted using h and r, to generate c1, and in decryption unit 123d, c1 is decrypted using f, to generate a'.

Note that the RSA cryptosystem and the ElGamal cryptosystem are described in greater detail in the non-patent reference 1, therefore are not detailed here.

(4) In the third embodiment, the first function unit 113d sets the K highest-order bits of the functional value G(s) as a verification value a, and the k lowest-order bits thereof are set as a shared key K. However, other methods may be alternatively used, as long as the verification value a and the shared key K are derived from the functional value G(s).

(5) The second function unit 115d may use other methods, as long as a functional value H(a,c1) is derived from the verification value a and the first cipher text c1.

For example, with respect to a two term operation #, a#c1 may be inputted in the function H, thereby deriving the functional value. Note that the first cipher text c1 is a polynomial in the NTRU cryptosystem, and so it is possible to obtain the functional value by converting the first cipher text c1 to the first cipher text bit sequence c1', and then inputting the a#c1' in the function H.

(6) Furthermore, the method used in the second function unit 115d may be other methods, as long as a functional value is derived using a verification value a.

For example, the second function unit 115d may alternatively output H(a), or output the verification value a as it is. Specifically, in the encryption apparatus 10d, the second cipher text c2 may be derived by:

making c2=s xor H(a), or making c2=s xor a.

In such cases, the third function unit 124d of the decryption apparatus 120d may respectively output:

*H(a'), or

*a'.

(7) In the third embodiment, the random-number mask unit 116d and the random-number mask removal unit 125d may use other methods, as long as the random-number mask unit 116d can derive a second cipher text c2 from the random number s and the functional value H(a,c1), and the random-number mask removal unit 125d can derive a random number s from the second cipher text c2 and the functional value H(a,c1).

For example, the random-number mask unit 116d may derive a second cipher text c2, by making c2=s+H(a,c1), or making s*H(a,c1)

5. Fourth Embodiment

The following describes a content distribution system 10e (unshown in any drawing), as another embodiment relating to the present invention.

The content distribution system 10e is a system based on the content distribution system 10d of the third embodiment, with some modifications. The differences with the content distribution system 10d are that: the encryption apparatus generates a random-number value u from the functional value (G), in addition to the verification value a and the shared key K, and generates the first cipher text c1 by encrypting the verification value a using the random-number value u; and the method used in the decryption apparatus for performing judging relating to outputting of the shared key K.

The following description focuses on the differences mentioned above.

5.1 Structure of Content Distribution System 10e

The content distribution system 10e has the similar structure as the content distribution system 10d, except that the encryption apparatus 110d and the decryption apparatus 120d are replaced by an encryption apparatus 10e and a decryption apparatus 120e, respectively. The other components are the same as those included in the content distribution system 10d, therefore whose explanation is omitted here.

The content distribution system 10e is a system that performs key distribution using the NTRU cryptosystem, where the encryption apparatus 110e and the decryption apparatus 120e are connected to each other, via the Internet 130.

5.2 Structure of Encryption Apparatus 110e

Figure 17:
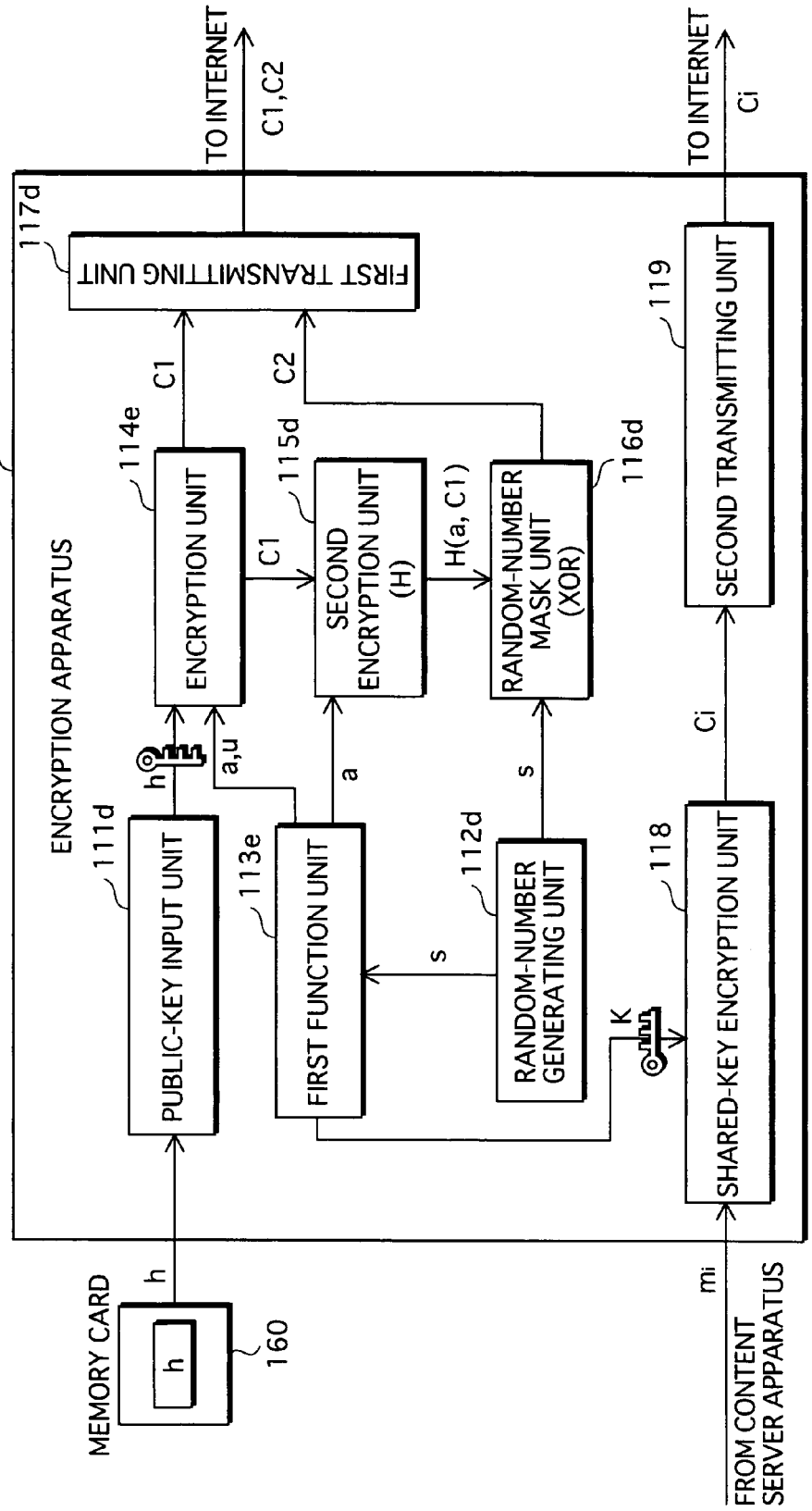
FIG. 17 is a block diagram showing the structure of an encryption apparatus 110$e$.

The encryption apparatus 110e, as shown in FIG. 17, includes a public-key input unit 111d, a random-number generating unit 112d, a first function unit 113e, an encryption unit 114e, a second function unit 115d, a random-number mask unit 116d, a first transmitting unit 117d, a shared-key encryption unit 118, and a second transmitting unit 119.

Among the mentioned components, the public-key input unit 111d, the random-number generating unit 112d, the second function unit 115d, the random-number mask unit 116d, the first transmitting unit 117d, the shared-key encryption unit 118, and the second transmitting unit 119 are the same as the components constituting the encryption apparatus 110d, therefore will not be described here. Here, the first function unit 113e and the encryption unit 114e are focused, which are different from the counterparts of the encryption apparatus 110d, and their structure and operation are described.

(1) First Function Unit 113e

The first function unit 113e receives a random number s from the random-number generating unit 112d, and generates a functional value G(s) of the random number s, then as shown below, generates a verification value a, a shared key K, and a random-number value u, from the generated functional value G(s).

Here, the function G is a hash function having output length of 3k bits. The first function unit 113e sets the k highest-order bits of the functional value G(s), as a verification value a, the middle k bits of the functional value G(s) as a shared key K, and the k lowest-order bits of the functional value G(s) as a random-number value u.

Next, the first function unit 113e outputs the verification value a to the encryption unit 114e and to the second function unit 115d, outputs the shared key K to the shared-key encryption unit 118, and outputs the random-number value u to the encryption unit 114e.

(2) Encryption Unit 114e

The encryption unit 114e receives a public-key polynomial h from the public-key input unit 111d, and receives the verification value a and the random-number value u from the first function unit 113e, and generates a first cipher text c1 of the verification value a, using the public-key polynomial h and the random-number value u, as shown below. Here, the first cipher text c1 is an NTRU cryptographic cipher text, and the random-number value u is a blind value used to making unclear the verification value a to be encrypted.

The encryption unit 114e generates a random-number polynomial r having the following characteristic so that it is uniquely defined by the random-number value u. The characteristic of the random-number polynomial r is such that, with respect to the parameter d of the NTRU cryptosystem, each coefficient of d terms is 1, each coefficient of other d terms is −1, and each coefficient of the rest of the terms is 0.

Specifically, the encryption unit 114e sets the random-number value u as a default value of the pseudo-random number system (random-number seed), and selects 2d pseudo-random numbers, from among {0, 1, . . . , N−1}, that do not overlap with each other. Then, the encryption unit 114e sets the coefficients of d terms of degree shown by the next d pseudo-random numbers as 1. The encryption unit 114e sets the coefficients of d terms of degree shown by the rest of d pseudo-random numbers as −1, and the coefficients of the other terms of degree as 0. As a result, the encryption unit 114e generates the random-number polynomial r.

Next, in the same manner as the encryption unit 114d, the encryption unit 114e generates a first cipher text c1=E(ap,r,h) using the random-number polynomial r.

Next, the encryption unit 114e outputs the generated first cipher text c1 to the second function unit 115d and to the first transmitting unit 117d.

5.3 Structure of Decryption Apparatus 120e

Figure 18:
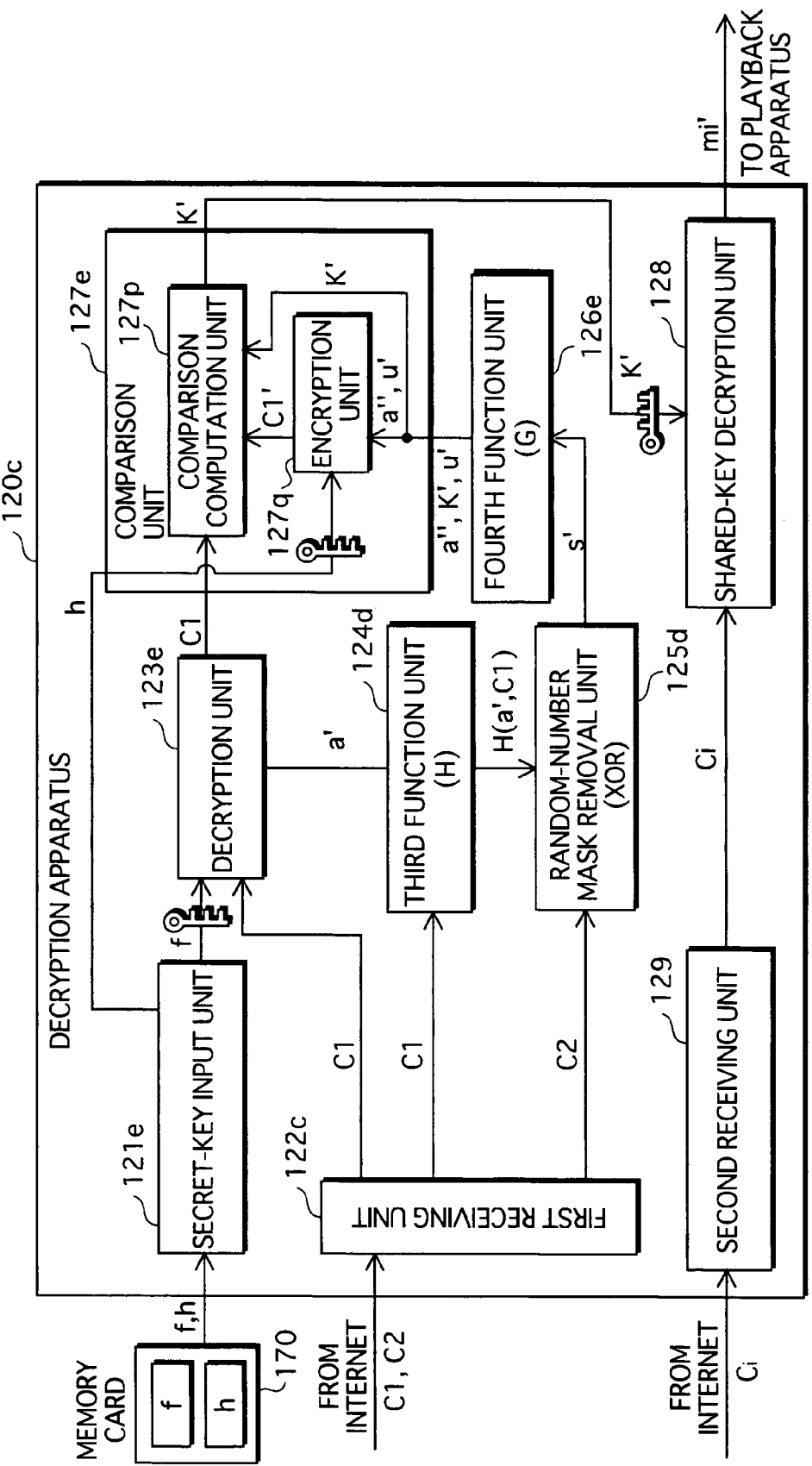
FIG. 18 is a block diagram showing the structure of a decryption apparatus 120$e$.

The decryption apparatus 120e, as shown in FIG. 18, includes a secret-key input unit 121e, a decryption unit 123e, a third function unit 124d, a random-number mask removal unit 125d, a fourth function unit 126e, a comparison unit 127e, a shared-key decryption unit 128, and a second receiving unit 129.

Here, among the mentioned components, the third function unit 124d, the random-number mask removal unit 125d, the shared-key decryption unit 128, and the second receiving unit 129 are the same as their counterparts included in the decryption apparatus 120d, therefore will not be described here. Here, the secret-key input unit 121e, the decryption unit 123e, the fourth function unit 126e, and the comparison unit 127e are focused, which are different from the counterparts of the decryption apparatus 120d, and their structure and operation are described.

(1) Secret-key Input Unit 121e

The secret-key input unit 121e receives, from the memory card 170, the secret-key polynomial f and the public-key polynomial h of the decryption apparatus 120e, outputs the secret-key polynomial f to the decryption unit 123e, and outputs the public-key polynomial h to the comparison unit 127e.

(2) Decryption Unit 123e

The decryption unit 123e receives the secret-key polynomial f from the secret-key input unit 121e, and receives the first cipher text c1 from the first receiving unit 122d. Next, the decryption unit 123e decrypts the first cipher text c1 using the secret-key polynomial f to generate a decryption verification value a', outputs the decryption verification value a' to the third function unit 124d, and outputs the first cipher text c1 to the comparison unit 127e.

(3) Fourth Function Unit 126e

The fourth function unit 126e has an algorithm for a function G that is the same as the function owned by the first function unit 113e.

The fourth function unit 126e receives a decryption random number s' from the random-number mask removal unit 125d, and generates a hash functional value G(s') for the received decryption random number s'. Then, in the same manner as the first function unit 113e, the fourth function unit 126e generates a verification value a'' a shared key K', and a random-number value u' from the functional value G(s'), and outputs the verification value a'', the shared key K', and the random-number value u', to the comparison unit 127e.

(4) Comparison Unit 127e

The comparison unit 127e is, as shown in FIG. 18, is comprised of a comparison computation unit 127p and an encryption unit 127q.

The encryption unit 127q receives the public-key polynomial h from the secret-key input unit 121e, and receives the verification value a'' and the random-number value u' from the fourth function unit 126e. Then, the encryption unit 127q encrypts the verification value a'' using the public-key polynomial h and the random-number value u' and in the same way as in the encryption unit 114d, to generate a first re-cipher text c1', and outputs the first re-cipher text c1' to the comparison computation unit 127p.

The comparison computation unit 127p receives the first cipher text c1 from the decryption unit 123b, and receives the first re-cipher text c1' from the encryption unit 127q. Next, the comparison computation unit 127p compares the first cipher text c1 and the first re-cipher text c1', to judge whether c1'=c1 holds. If c1'=c1 holds, the comparison computation unit 127p outputs the shared key K' to the shared-key decryption unit 128, and if c1'=c1 does not hold, does not output the shared key K'.

5.4 Operation Verification of Content Distribution System 10e

As follows, the entire operation performed by the content distribution system 10e is described using the process-block diagram of FIG. 19.

The encryption apparatus 10e receives the public-key polynomial h for the decryption apparatus 120e (Step S201), generates a random number s (Step S202), generates a functional value G(s) (Step S203), and derives a verification value a, a shared key K, and a random-number value u from the functional value G(s) (Step S204e). Next, the encryption apparatus 110e encrypts the verification value a using the public-key polynomial h and the random-number value u and according to the NTRU cryptosystem, to generate a first cipher text c1 (Step S205), generates a functional value H(a, c1) from the verification value a and the first cipher text c1 (Step S206), and generates a second cipher text c2=s xor H(a,c1), from the random number s and the functional value H(a,c1) (Step S207). Then the encryption apparatus 10b transmits the first cipher text c1 and the second cipher text c2 to the decryption apparatus 120e via the Internet 130 (Step S208).

Specifically, this encryption apparatus 110e performs the following operations (a)-(d), so as to transmit the cipher text C(c1,c2) to the decryption apparatus 120e.

(a) Generate a random number s.

(b) Generate G(s), and generate a, K, and u, from the G(s).

(c) Generate a first cipher text c1 of the verification value a, using a public-key polynomial h and a random-number value u.

(d) Generate c2=s xor H(a,c1).

Next, the encryption apparatus 110e encrypts the plaintext mi(1=<i=<n) having been inputted from the content server apparatus 140, using the derived shared key K and according to the symmetric key cryptography, to generate a cipher text Ci(1=<i=<n) (Step S209), and transmits the cipher text Ci(1=<i=<n) to the decryption apparatus 120e via the Internet 130 (Step S210).

On the other hand, the decryption apparatus 120e receives the secret-key polynomial f and the public-key polynomial h of the decryption apparatus 120e (Step S251, Step S251e), and receives the first cipher text c1 and the second cipher text c2 from the encryption apparatus 110e via the Internet 130 (Step S208), then decrypts the first cipher text c1, using the secret-key polynomial f, to generate a decryption verification value a' (Step S252). Then, the decryption apparatus 120e generates a functional value H(a',c1) from the decryption verification value a' and the first cipher text c1 (Step S253), and generates a decryption random number s'=c2 xor H(a', c1), from the second cipher text c2 and the functional value H(a',c1) (Step S254). The decryption apparatus 120e generates a functional value G(s') of the decryption random number s' (Step S255), derives a verification value a", a shared key K', a random-number value u', from the generated functional value G(s') (Step S256e), generates a first re-cipher text c1' by encrypting the verification value a" (Step S261) and if c1'=c1 holds (Step S257e), outputs the shared key K' (Step S258).

Specifically, the decryption apparatus 120e performs the following processes (a)-(e), to derive the shared key K'.

(a) Decrypt the first cipher text c1 using the secret-key polynomial f, to generate a'.

(b) Generate s'=c2 xor H(a',c1).

(c) Generate G(s'), and generate a", K', and u' from the G(s').

(d) Generate a first re-cipher text c1' of a" using the public-key polynomial h and the random-number value u'

(e) Check to see if c1'=c1 holds, if it holds, output the shared key K'.

Here, if the decryption apparatus 120e has used the correct secret-key polynomial f that corresponds to the public-key polynomial h that the encryption apparatus 110e has used, the first cipher text c1 will be correctly decrypted, to generate the decryption verification value a'=a, therefore the decryption random numbers'=s (the decryption random number s' having been generated from the second cipher text c2 and the H(a', c1)). Therefore, the verification value a"=a (the verification value a" having been derived from the G(s')). As a result, the shared key K'=K holds, and the random-number value u'=u holds. Since a"=a, and u'=u hold, c1'=c1 also holds, the decryption apparatus 120e can derive the same shared key as that derived by the encryption apparatus 110e.

Next, the decryption apparatus 120e using the derived shared key K' (=K), receives the shared-key cipher text Ci (1=<i=<n) from the encryption apparatus 110e via the Internet 130 (Step S210), decrypts the shared-key cipher text Ci(1=<i=<n) using the derived shared key K' (=K) and according to the symmetric key cryptography, to generate a decrypted text mi'(1=<i=<n) (Step S259), and outputs the decrypted text mi'(1=<i=<n) to the playback apparatus 150.

Since the encryption key K (used for generation of the shared-key cipher text) is identical to the encryption key K' (used for generation of decrypted text), the decryption apparatus can obtain the correct mi'=mi (1=<i=<n).

5.5 Effect of Content Distribution System 10e

The conventional RSA-KEM algorithm uses a*P and a*W as input of a hash function H, and uses the Diffie-Hellman problem in the final stage of deriving the shared key K, with which the derivation of the shared key K is difficult unless the secret key is known. Therefore, other public-key cryptosystems that do not use the Diffie-Hellman problem, such as the NTRU cryptography, cannot take advantage of the PSEC-KEM algorithm, since these cryptosystems do not have inputs that correspond to a*P, and a*W of the Diffie-Hellman problem.

However in the present invention, the content distribution system, the encryption apparatus, and the decryption apparatus have a verification value a and its cipher text c1, as input of a hash function H. Therefore, the NTRU cryptosystem and the other public-key cryptosystems can be applied thereto, just as to the third embodiment.

If a decryption error has occurred, an incorrect decryption verification value a' will be obtained. However, the decryption apparatus of the present invention will not output the shared key K', since c1' will not be equal to c1. Therefore, the present invention has an effect of preventing different keys to be established between the encryption apparatus and the decryption apparatus, even if a decryption error has occurred.

According to this, key encapsulation mechanism can be constructed using the NTRU cryptosystem, and so the key distribution is realized between the encryption apparatus and decryption apparatus using the NTRU cryptosystem.

In addition, according to the system of the present invention, the security can be logically verified using the same method as the verification method described in the non-patent reference 3.

5.6 Modification Example

The fourth embodiment described above is one example of carrying out the present invention. The present invention is not limited to this particular embodiment, and can be carried with various modifications as long as they are within the scope of the present invention. Needless to say, the same modification examples for the third embodiment can be provided for the fourth embodiment. However, the following cases are also included in the present invention.

(1) The method of converting the random-number value u to the random-number polynomial r, performed in the encryption unit 114e, is not limited to the described method, as long as r is uniquely obtained from u. For example, a function or a functional-value table may be alternatively used, which correspond the random-number value u to the polynomial.

Alternatively, the conversion method stated in the modification example (1) for the second embodiment may also be used.

(2) The public-key cryptosystem, used in the encryption unit 114e and in the decryption unit 123e, is not limited to the one described, as long as its encryption unit 114e is operable to encrypt a verification value a using a public key and a random-number value u to generate a first cipher text c1, and its decryption unit 123e is operable to decrypt the first cipher text c1 using a secret key, to generate a decryption verification value a' that is equal to the verification value a. Accordingly, the public-key cryptosystem used in the encryption unit 114e and in the decryption unit 123e may be other cryptosystems different from the NTRU cryptosystem, as long as they use random number.

If the ElGamal cryptosystem is to be used, h and f may be respectively set as a public key and a secret key of the ElGamal cryptosystem. Then, in the encryption unit 114e, a is encrypted using h and a random-number value u, to generate c1, and in decryption unit 123e, c1 is decrypted using f, to generate a'.

(3) In the fourth embodiment, the random-number value u is generated in the first function unit 113e and in the second function unit 126e. However, other generation methods may be used, as long as the same value is generated in the encryption apparatus 110e and in the decryption apparatus 120e.

For example, u=Func(s) may be used with respect to an arbitrary function Func, so that the encryption apparatus 110e obtains the same value as that the decryption apparatus 120e obtains. Specifically, generate G(s), and generate a, and K from the G(s), and generate Func(s), and sets u=Func(s).

(4) Further, the random-number value u is generated in the first function unit 113e and in the fourth function unit 126e. However, the condition to be satisfied here is that the encryption apparatus 110e and the decryption apparatus 120e obtain the same value. Therefore, the encryption apparatus 110e may transmit the random-number value u directly to the decryption apparatus 120e.

Specifically, the cipher text C and the random-number value u may be transmitted to the decryption apparatus 120e as stated below.

Generate G(s), and generate a and K from the G(s).

The encryption apparatus 110e transmits the random-number value u separately, to the decryption apparatus 120e.

At this time, it may be arranged that the encryption apparatus 110 encrypt the random-number value u before transmitting it.

(5) Furthermore, as for the random-number value u, the condition is that the encryption apparatus 110e and the decryption apparatus 120e obtain the same value. Therefore, it may be arranged to generate part of the information for the random-number value u in the first function unit 113e and in the fourth function unit 126e, and to directly transmit the rest of the information for the random-number value u from the encryption apparatus 110e to the decryption apparatus 120e.

For instance, the cipher text C and the random-number value u2 may be transmitted to the decryption apparatus 120e, as follows:

*Generate G(s), and generate a, K, and u1, from the G(s).

The encryption apparatus 110e transmits the random-number value u2 separately to the decryption apparatus 120e.

Generate a random-number value u, from u=u1 x or u2.

At this time, the encryption apparatus 110e may encrypt the random-number value u2 before transmitting it.

(6) The decryption apparatus 120e checks to see if the first cipher text c1 is a cipher text of the verification value a" that the fourth function unit 126e obtains, and uses the shared key K' in decrypting the shared-key cipher text Ci, only if c1 is turned out to be a cipher text of a". However, the same checking method as used by the decryption apparatus 120d of the third embodiment may be used.

Specifically, as the process-block diagram of FIG. 20 shows, the check may be performed using the decryption unit 123d corresponding to the decryption apparatus 120d, and the comparison unit 127d, in the following manner.

(a) Decrypt the first cipher text c1 using the secret-key polynomial f, to generate a' (Step S252).

(b) Generate s'=c2 xor H(a',c1) (Step S254).

(c) Generate G(s') (Step S255), and generate a", K', and u', from the G(s') (Step S256e).

(d) Check to see if a" =a' holds (Step S257). If it holds, output the shared key K' (Step S258).

In addition, in this process, it may check whether the first cipher text c1 is a cipher text of the decryption verification value a'.

7. Summary of Third and Fourth Embodiments

As described so far, the present invention is a shared-key generation apparatus, which outputs shared-key data, and encryption shared-key data resulting from encrypting the shared-key data based on predetermined public-key data. The shared-key generation apparatus specifically includes: a secret-number data generating unit operable to generate secret-number data; a shared-key derivation unit operable to convert the secret-number data into verification-value data and the shared-key data, based on a predetermined process; and a first encryption unit operable to encrypt the verification-value data based on the public-key data, to generate first encryption preliminary data; a verification-value conversion unit operable to convert the verification-value data into conversion verification-value data, based on a predetermined process; and a second encryption unit operable to encrypt the secret-number data based on the conversion verification-value data, to generate second encryption preliminary data, where the encryption shared-key data is made up of the first encryption preliminary data and the second encryption preliminary data.

In addition, the present invention is a shared-key generation apparatus, which outputs shared-key data, and encryption shared-key data resulting from encrypting the shared-key data based on predetermined public-key data. The shared-key generation apparatus specifically includes: a secret-number data generating unit operable to generate secret-number data; a shared-key derivation unit operable to convert the secret-number data and first encryption preliminary data into verification-value data and the shared-key data, based on a predetermined process; and a first encryption unit operable to encrypt the verification-value data based on the public-key data, to generate the first encryption preliminary data; a verification-value conversion unit operable to convert the verification-value data into conversion verification-value data, based on a predetermined process; and a second encryption unit operable to encrypt the secret-number data based on the conversion verification-value data, to generate second encryption preliminary data, where the encryption shared-key data is made up of the first encryption preliminary data and the second encryption preliminary data.

In addition, the present invention is a shared-key generation apparatus, which outputs shared-key data, and encryption shared-key data resulting from encrypting the shared-key data based on predetermined public-key data. The shared-key generation apparatus specifically includes: a secret-number data generating unit operable to generate secret-number data; a shared-key derivation unit operable to convert the secret-number data into verification-value data, random-number data, and the shared-key data, based on a predetermined process; a first encryption unit operable to encrypt the verification-value data based on the public-key data and the random-number data, to generate first encryption preliminary data; a verification-value conversion unit operable to convert the verification-value data into conversion verification-value data, based on a predetermined process; and a second encryption unit operable to encrypt the secret-number data based on the conversion verification-value data, to generate second encryption preliminary data, where the encryption shared-key data is made up of the first encryption preliminary data and the second encryption preliminary data.

In addition, the present invention is a shared-key generation apparatus, which outputs shared-key data, and encryption shared-key data resulting from encrypting the shared-key data based on predetermined public-key data. The shared-key generation apparatus specifically includes: a secret-number data generating unit operable to generate secret-number data; a shared-key derivation unit operable to convert the secret-number data into verification-value data, random-number data, and the shared-key data, based on a predetermined process; a first encryption unit operable to encrypt the verification-value data based on the public-key data and the random-number data, to generate first encryption preliminary data; a verification-value conversion unit operable to convert the verification-value data and the first encryption preliminary data into conversion verification-value data, based on a predetermined process; and a second encryption unit operable to encrypt the secret-number data based on the conversion verification-value data, to generate second encryption preliminary data, where the encryption shared-key data is made up of the first encryption preliminary data and the second encryption preliminary data.

Here, the secret-number data may be a random number having been randomly generated.

Here, the shared-key derivation unit may use a one-way hash function, as the predetermined process.

Here, the first encryption unit may perform an NTRU cryptographic encryption, to generate the first encryption preliminary data.

Here, the verification-value conversion unit may use a one-way hash function, as the predetermined process.

Here, the predetermined process preformed by the verification-value conversion unit may be to set the verification-value data as it is, as the conversion verification-value data.

Here, the second encryption unit may perform bitwise exclusive-or on the secret-number data and the conversion verification-value data, to generate the second encryption preliminary data.

Here, the second encryption unit may encrypt the secret-number data using the conversion verification-value data as a cryptographic key and according to the symmetric key cryptography, to generate the second encryption preliminary data.

Here, the second encryption unit may add the conversion verification-value data to the secret-number data, to generate the second encryption preliminary data.

Here, the second encryption unit may multiply the secret-number data by the conversion verification-value data, to generate the second encryption preliminary data.

Here, the encryption shared-key data may be bit connecting data between the first encryption preliminary data and the second encryption preliminary data.

Furthermore, the present invention is a shared-key recovery apparatus, which decrypts encryption shared-key data based on predetermined secret-key data, to generate shared-key data, and outputs the generated shared-key data, the encryption shared-key data being made up of first encryption preliminary data and second encryption preliminary data. The shared-key recovery apparatus includes: a first decryption unit operable to decrypt the first encryption preliminary data based on the secret-key data, to generate verification-value data; a verification-value conversion unit operable to convert, based on a predetermined process, the verification-value data into conversion verification-value data; a second decryption unit operable to decrypt the second encryption preliminary data based on the conversion verification-value data, to generate secret-number data; and a shared-key derivation unit operable to convert, based on a predetermined process, the secret-number data into verification-value verification data and the shared-key data, where the shared-key recovery apparatus outputs the shared-key data when the verification-value data is equal to the verification-value verification data.

In addition, the present invention is a shared-key recovery apparatus, which decrypts encryption shared-key data based on predetermined secret-key data, to generate shared-key data, and outputs the generated shared-key data, the encryption shared-key data being made up of first encryption preliminary data and second encryption preliminary data. The shared-key recovery apparatus includes: a first decryption unit operable to decrypt the first encryption preliminary data based on the secret-key data, to generate verification-value data; a verification-value conversion unit operable to convert, based on a predetermined process, the verification-value data and the first encryption preliminary data into conversion verification-value data; a second decryption unit operable to decrypt the second encryption preliminary data based on the conversion verification-value data, to generate secret-number data; and a shared-key derivation unit operable to convert, based on a predetermined process, the secret-number data into verification-value verification data and the shared-key data, where the shared-key recovery apparatus outputs the shared-key data when the verification-value data is equal to the verification-value verification data.

In addition, the present invention is a shared-key recovery apparatus, which decrypts encryption shared-key data based on predetermined secret-key data, to generate shared-key data, and outputs the generated shared-key data, the encryption shared-key data being made up of first encryption preliminary data and second encryption preliminary data. The shared-key recovery apparatus includes: a first decryption unit operable to decrypt the first encryption preliminary data based on the secret-key data, to generate verification-value data; a verification-value conversion unit operable to convert, based on a predetermined process, the verification-value data into conversion verification-value data; a second decryption unit operable to decrypt, based on the conversion verification-value data, the second encryption preliminary data into secret-number data; and a shared-key derivation unit operable to convert, based on a predetermined process, the secret-number data into verification-value verification data, random-number data, and the shared-key data, where the shared-key recovery apparatus outputs the shared-key data when the verification-value data is equal to the verification-value verification data.

In addition, the present invention is a shared-key recovery apparatus, which decrypts encryption shared-key data based on predetermined secret-key data, to generate shared-key data, and outputs the generated shared-key data, the encryption shared-key data being made up of first encryption preliminary data and second encryption preliminary data. The shared-key recovery apparatus includes: a first decryption unit operable to decrypt the first encryption preliminary data based on the secret-key data, to generate verification-value data; a verification-value conversion unit operable to convert, based on a predetermined process, the verification-value data and the first encryption preliminary data into conversion verification-value data; a second decryption unit operable to decrypt, based on the conversion verification-value data, the second encryption preliminary data into secret-number data; a shared-key derivation unit operable to convert, based on a predetermined process, the secret-number data into verification-value verification data, random-number data, and the shared-key data, where the shared-key recovery apparatus outputs the shared-key data when the verification-value data is equal to the verification-value verification data.

In addition, the present invention is a shared-key recovery apparatus, which decrypts encryption shared-key data based on secret-key data and public key data that are predetermined, to generate shared-key data, and outputs the generated shared-key data, the encryption shared-key data being made up of first encryption preliminary data and second encryption preliminary data. The shared-key recovery apparatus includes: a first decryption unit operable to decrypt the first encryption preliminary data based on the secret-key data, to generate verification-value data; a verification-value conversion unit operable to convert, based on a predetermined process, the verification-value data into conversion verification-value data; a second decryption unit operable to decrypt, based on the conversion verification-value data, the second encryption preliminary data into secret-number data; a shared-key derivation unit operable to convert, based on a predetermined process, the secret-number data into verification-value verification data, random-number data, and the shared-key data; and a third encryption unit operable to encrypt the verification-value verification data based on the public-key data and the random-number data, to generate third encryption preliminary data, where the shared-key recovery apparatus outputs the shared-key data when the first encryption preliminary data is equal to the third encryption preliminary data.

In addition, the present invention is a shared-key recovery apparatus, which decrypts encryption shared-key data based on secret-key data and public key data that are predetermined, to generate shared-key data, and outputs the generated shared-key data, the encryption shared-key data being made up of first encryption preliminary data and second encryption preliminary data. The shared-key recovery apparatus includes: a first decryption unit operable to decrypt the first encryption preliminary data based on the secret-key data, to generate verification-value data; a verification-value conversion unit operable to convert, based on a predetermined process, the verification-value data into conversion verification-value data; a second decryption unit operable to decrypt, based on the conversion verification-value data, the second encryption preliminary data into secret-number data; a shared-key derivation unit operable to convert, based on a predetermined process, the secret-number data into verification-value verification data, random-number data, and the shared-key data; and a third encryption unit operable to encrypt the verification-value data based on the public-key data and the random-number data, to generate third encryption preliminary data, where the shared-key recovery apparatus outputs the shared-key data when the first encryption preliminary data is equal to the third encryption preliminary data.

In addition, the present invention is a shared-key recovery apparatus, which decrypts encryption shared-key data based on secret-key data and public key data that are predetermined, to generate shared-key data, and outputs the generated shared-key data, the encryption shared-key data being made up of first encryption preliminary data and second encryption preliminary data. The shared-key recovery apparatus includes: a first decryption unit operable to decrypt the first encryption preliminary data based on the secret-key data, to generate verification-value data; a verification-value conversion unit operable to convert, based on a predetermined process, the verification-value data and the first encryption preliminary data into conversion verification-value data; a second decryption unit operable to decrypt, based on the conversion verification-value data, the second encryption preliminary data into secret-number data; a shared-key derivation unit operable to convert, based on a predetermined process, the secret-number data into verification-value verification data, random-number data, and the shared-key data; and a third encryption unit operable to encrypt the verification-value verification data based on the public-key data and the random-number data, to generate third encryption preliminary data, where the shared-key recovery apparatus outputs the shared-key data when the first encryption preliminary data is equal to the third encryption preliminary data.

In addition, the present invention is a shared-key recovery apparatus, which decrypts encryption shared-key data based on secret-key data and public key data that are predetermined, to generate shared-key data, and outputs the generated shared-key data, the encryption shared-key data being made up of first encryption preliminary data and second encryption preliminary data. The shared-key recovery apparatus includes: a first decryption unit operable to decrypt the first encryption preliminary data based on the secret-key data, to generate verification-value data; a verification-value conversion unit operable to convert, based on a predetermined process, the verification-value data and the first encryption preliminary data into conversion verification-value data; a second decryption unit operable to decrypt, based on the conversion verification-value data, the second encryption preliminary data into secret-number data; a shared-key derivation unit operable to convert, based on a predetermined process, the secret-number data into verification-value verification data, random-number data, and the shared-key data; and a third encryption unit operable to encrypt the verification-value data based on the public-key data and the random-number data, to generate third encryption preliminary data, where the shared-key recovery apparatus outputs the shared-key data when the first encryption preliminary data is equal to the third encryption preliminary data.

Here, the shared-key derivation unit may use a one-way hash function, as the predetermined process.

Here, the first decryption unit may perform NTRU cryptographic decryption, to generate the verification-value data.

Here, the verification-value conversion unit may use a one-way hash function, as the predetermined process.

Here, the predetermined process preformed by the verification-value conversion unit may be to set the verification-value data as it is, as the conversion verification-value data.

Here, the second decryption unit may perform bitwise exclusive-or on the second encryption preliminary data and the conversion verification-value data, to generate the secret-number data.

Here, the second decryption unit may decrypt the second encryption preliminary data using the conversion verification-value data as a cryptographic key and according to the symmetric key cryptography, to generate the secret-number data.

Here, the second decryption unit may subtract the conversion verification-value data from the second encryption preliminary data, to generate the secret-number data.

Here, the second decryption unit may divide the second encryption preliminary data by the conversion verification-value data, to generate the secret-number data.

In addition, the present invention is an encryption apparatus that encrypts data based on predetermined public-key data, to generate cipher-text data. The encryption apparatus includes: a secret-number data generating unit operable to generate secret-number data; a shared-key derivation unit operable to convert, based on a predetermined process, the secret-number data into verification-value data and shared-key data; a first encryption unit operable to encrypt the verification-value data based on the public-key data, to generate first encryption preliminary data; a verification-value conversion unit operable to convert, based on a predetermined process, the verification-value data into conversion verification-value data; a second encryption unit operable to encrypt the secret-number data based on the conversion verification-value data, to generate second encryption preliminary data; and a third encryption unit operable to encrypt the plaintext data based on the shared-key data, to generate third encryption preliminary data, where the cipher-text data is made up of the first encryption preliminary data, the second encryption preliminary data, and the third encryption preliminary data.

Further, the present invention is a decryption apparatus that decrypts, based on predetermined secret-key data, cipher-text data made up of first encryption preliminary data, second encryption preliminary data, and third encryption preliminary data, to generate decrypted-text data, and outputs the decrypted-text data. The decryption apparatus includes: a first decryption unit operable to decrypt the first encryption preliminary data based on the secret-key data, to generate verification-value data; a verification-value conversion unit operable to convert, based on a predetermined process, the verification-value data into conversion verification-value data; a second decryption unit operable to decrypt the second encryption preliminary data based on the conversion verification-value data, to generate secret-number data; and a shared-key derivation unit operable to convert, based on a predetermined process, the secret-number data into verification-value verification data and shared-key data; and a decryption unit operable, when the verification-value data is identical to the verification-value verification data, to decrypt the third encryption preliminary data based on the shared-key, to generate the decrypted-text data.

In addition, the present invention is a cryptosystem comprised of an encryption apparatus and a decryption apparatus, the encryption apparatus encrypting plaintext data based on predetermined public-key data to generate cipher-text data, and the decryption apparatus decrypting the cipher-text data based on predetermined secret-key data and outputting resulting decrypted-text data. The encryption apparatus includes: a secret-number data generating unit operable to generate secret-number data; a shared-key derivation unit operable to convert, based on a predetermined process, the secret-number data into verification-value data and shared-key data; a first encryption unit operable to encrypt the verification-value data based on the public-key data, to generate first encryption preliminary data; a verification-value conversion unit operable to convert, based on a predetermined process, the verification-value data into conversion verification-value data; a second encryption unit operable to encrypt the secret-number data based on the conversion verification-value data, to generate second encryption preliminary data; and a third encryption unit operable to encrypt the plaintext data based on the shared-key data, to generate third encryption preliminary data, where the cipher-text data is made up of the first encryption preliminary data, the second encryption preliminary data, and the third encryption preliminary data.

The decryption apparatus includes: a first decryption unit operable to decrypt the first encryption preliminary data based on the secret-key data, to generate verification-value data; a verification-value conversion unit operable to convert, based on a predetermined process, the verification-value data into the conversion verification-value data; a second decryption unit operable to decrypt the second encryption preliminary data based on the conversion verification-value data, to generate the secret-number data; a shared-key derivation unit operable to convert, based on a predetermined process, the secret-number data into verification-value verification data and shared-key data; and a decryption unit operable, when the verification-value data is identical to the verification-value verification data, to decrypt the third encryption preliminary data based on the shared-key data, to generate the decrypted-text data.

As described above, the present invention has been conceived in view of the problems that the conventional system has, and constructs in a cryptosystem an encapsulation mechanism to which NTRU cryptosystem can be applied, thereby realizing key distribution between its encryption apparatus and decryption apparatus using NTRU cryptography.

As clear from the above, the present invention provides a cryptosystem that the conventional technologies were not able to provide, therefore is very valuable.

8. Other Modification Examples

So far, the present invention has been described by way of the aforementioned embodiments. However, needless to say, the present invention is not limited to the aforementioned embodiments, and includes the following cases.

(1) Instead of transmitting each of cipher texts to the decryption apparatus via the Internet, the encryption apparatus may alternatively write each cipher text in a recording medium such as a DVD, and the decryption apparatus may accordingly read each cipher text from the recording medium.

(2) The NTRU cryptosystem used in the present invention may be, instead of in the type described in the non-patent reference 3, in an EESS (efficient embedded security standard) type. The detail of the EESS-type NTRU cryptosystem is described in "EESS:Consortium for efficient embedded security, efficient embedded security standards #1: Implementation aspects of NTRU encrypt and NTRU sign, Version 2.0,", May 2003. Therefore, the following only briefly discusses the EESS-type NTRU cryptosystem.

In the EESS-type NTRU cryptosystem, a random-number polynomial r is either a polynomial expression that has d coefficients of 1, and (N-d) coefficients of 0, or a polynomial expression obtained using a plurality of such polynomial expressions. Therefore, if the random polynomial r in the above-described embodiments is generated to yield such polynomial expressions, the EESS-type NTRU cryptosystem may be alternatively used, instead of the NTRU cryptosystem, with a similar effect.

(3) The content distribution system may be structured as follows.

That is, the content distribution system may be comprised of a content server apparatus, an encryption apparatus, a broadcast apparatus, a reception apparatus, a decryption apparatus, a playback apparatus, and a monitor.

Here, the encryption apparatus and the decryption apparatus respectively correspond to the encryption apparatus 110 and the decryption apparatus 120 of the content distribution system 10.

The content server apparatus and the encryption apparatus are connected to each other via a dedicated circuit, and the content server apparatus transmits contents such as movie, made up of image and audio, to the encryption apparatus via this dedicated circuit. The encryption apparatus and the broadcast apparatus are connected with each other via a dedicated circuit. The encryption apparatus transmits each of cipher texts to the broadcast apparatus, and the broadcast apparatus performs multiplexing on the cipher texts, and broadcasts them over a digital broadcast wave.

The reception apparatus and the decryption apparatus are connected to each other, and likewise, the decryption apparatus and the playback apparatus are connected to each other too. The reception apparatus receives a digital broadcast wave, extracts each of cipher texts from the received digital broadcast wave, and transmits extracted cipher texts to the decryption apparatus. The decryption apparatus receives the cipher texts, generates a playback content using the received cipher texts, and outputs the generated playback content to the playback apparatus. The playback apparatus is connected to the decryption apparatus and to the monitor that includes therein a speaker. The playback apparatus receives the playback content, and generates an image signal and an audio signal, from the received play back content, and the monitor displays an image and outputs an audio.

(4) The content server apparatus and the encryption apparatus may be integrated into one apparatus. The decryption apparatus and the playback apparatus may be also integrated into one apparatus.

(5) In each of the aforementioned embodiments, the memory card 160 prestores a public-key polynomial h, and the memory card 170 prestores a secret-key polynomial f and a public-key polynomial h. The encryption apparatus 110 and the decryption apparatus 120 obtain, from the memory card 160 and the memory card 170, a public-key polynomial and a secret-key polynomial respectively. However, the present invention is not limited to such.

Alternatively, the encryption apparatus 110 may prestore a public-key polynomial, and the decryption apparatus 120 may prestore a public-key polynomial and a secret-key polynomial.

In addition, the key management apparatus may generate a secret-key polynomial and a public-key polynomial, and transmit the secret-key polynomial and the public-key polynomial secretly and securely, to the decryption apparatus 120, and transmit the public-key polynomial secretly and securely to the encryption apparatus 110.

(6) The contents to be distributed in the content distribution system is not limited to contents such as movie, comprised of image and audio. Alternatively, the contents may include a database generated by moving images, still images, audio, music, document, novel, DB software, and the like. Further, electric spreadsheet-data and computer program generated using spreadsheet software, and other kinds of data for computer may be included therein.

Furthermore, the contents may, instead of being the mentioned work, may alternatively be key information used for such as encryption, decryption, digital signature, and signature verification.

For example, the following arrangement is possible. As described in each of the above embodiments, the encryption apparatus and the decryption apparatus share a same shared-key. On this premise, the encryption apparatus encrypts a content key using the shared key to generate an encrypted content key, encrypts a content using the content key to generate an encrypted content, and transmits the encrypted content key and the encrypted content to the decryption apparatus. Then the decryption apparatus receives the encrypted content key and the encrypted content, decrypts the encrypted content key using the shared key to generate the content key, and decrypts the encrypted content using thus obtained content key, to finally obtain the content.

(7) The present invention may be methods of the above description. Moreover, the present invention may be a computer program that realizes these methods using a computer, or may be a digital signal comprised of the computer program.

In addition, the present invention may be a computer-readable recording medium storing the mentioned computer program or the mentioned digital signal. The computer-readable recording medium includes: a flexible disc, a hard disc, a CD-ROM, an MO, a DVD, a DVD-ROM, a DVD-RAM, a BD(blu-ray disc), and a semiconductor memory.

In addition, the present invention may be the computer program and the digital signal, in a form recorded in these recording mediums.

In addition, the present invention may be to transmit the computer program or the digital signal, such as via a network and a data broadcast and the like, the network being represented by an electric communication circuit, a radio circuit, a cable communication circuit, and the Internet.

In addition, the present invention may be a computer system equipped with a microprocessor and a memory, where the memory stores the computer program, and the microprocessor operates according to the computer program.

In addition, another computer system that is independent may execute the present invention, by transmitting the computer program or the digital signal in a form stored in the recording medium, or by transmitting the computer program or the digital signal via the described network, and the like.

(8) The present invention may be a combination of some of the described embodiments and the modification examples.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A key agreement system comprising a shared-key generation apparatus and a shared-key recovery apparatus, each apparatus establishing therein a same shared key in secrecy stored in memory, wherein the shared-key generation apparatus includes:
a seed-value generating unit configured to generate a seed value;
a first shared-key generating unit configured to generate a verification value and a shared key, from the seed value;

a first encryption unit configured to encrypt the verification value to generate first encryption information;

a second encryption unit configured to encrypt the seed value based on the verification value, to generate second encryption information; and a transmitting unit configured to transmit to the shared-key recovery apparatus the first encryption information and the second encryption information without transmitting to the shared-key recovery apparatus the generated shared-key, wherein the shared-key recovery apparatus includes:

a receiving unit configured to receive from the shared-key generation apparatus the first encryption information and the second encryption information;

a first decryption unit configured to decrypt the first encryption information, to generate a first decryption verification value;

a second decryption unit configured to decrypt the second encryption information based on the first decryption verification value, to generate a decryption seed value;

a second shared-key generating unit configured to generate a second decryption verification value and a decryption shared key, from the decryption seed value according to the same method as used in the first shared-key generating unit of the shared-key generation apparatus; and a judging unit configured to judge whether the first decryption verification value generated from the received first encryption information is identical to the second decryption verification value generated from the decryption seed value, the decryption seed value being generated based on the received second encryption information and the first decryption verification value, and to judge that the decryption shared key is identical to the shared key generated in the shared-key generation apparatus if it is judged that the first decryption verification value is identical to the second decryption verification value, wherein the shared-key generation apparatus is distinct from the shared-key recovery apparatus, and wherein the first encryption information is distinct from the second encryption information.

2. The key agreement system of claim 1, wherein the shared-key generation apparatus further includes:

an obtaining unit configured to obtain a content; and an encryption unit configured to encrypt the obtained content using the shared key, to generate an encrypted content, wherein the transmitting unit further transmits to the shared-key recovery apparatus the encrypted content, and wherein the shared-key recovery apparatus further includes:

a decryption unit, when the receiving unit receives from the shared-key generation apparatus the encrypted content, configured to decrypt the received encrypted content using the decryption shared key, to generate a decrypted content.

3. The key agreement system of claim 1, wherein the shared key is generated according to a key generation algorithm of the NTRU cryptosystem, the Diffie-Hellman key agreement protocol being not used in the NTRU cryptosystem.

4. The key agreement system of claim 1, wherein the judging unit judges that the decryption shared key is not identical to the shared key generated in the shared-key generation apparatus and that the decryption shared key is not used for a decryption, if it is judged that the first decryption verification value is not identical to the second decryption verification value.

5. A shared-key generation apparatus comprising:

a memory storing a seed value, a verification value, a first encryption information, second encryption information, a first decryption verification value, a second decryption verification value, a decryption seed value, a decryption shared-key;

the seed-value generating unit configured to generate a seed value;

a shared-key generating unit configured to generate the verification value and a shared key, from the seed value;

a first encryption unit configured to encrypt the verification value to generate the first encryption information;

a second encryption unit configured to encrypt the seed value based on the verification value, to generate the second encryption information; and a transmitting unit configured to transmit to a shared-key recovery apparatus the first encryption information and the second encryption information without transmitting to the shared-key recovery apparatus the generated shared-key, wherein the shared-key recovery apparatus decrypts the first encryption information to generate the first decryption verification value, decrypts the second encryption information based on the first decryption verification value to generate the decryption seed value, generates the second decryption verification value and the decryption shared-key from the decryption seed value according to the same method as used in the shared-key generating unit of the shared-key generation apparatus, judges whether the first decryption verification value is identical to the second decryption verification value, and judges that the generated decryption shared key is identical to the shared key generated in the shared-key generation apparatus if it is judged that the first decryption verification value is identical to the second decryption verification value, wherein the shared-key generation apparatus is distinct from the shared-key recovery apparatus, and wherein the first encryption information is distinct from the second encryption information.

6. The shared-key generation apparatus of claim 5, wherein the seed-value generating unit generates a random number, as the seed value.

7. The shared-key generation apparatus of claim 5, wherein the shared-key generating unit performs a one-way function on the seed value to generate a functional value, and generates the verification value and the shared key from the functional value.

8. The shared-key generation apparatus of claim 7, wherein the shared-key generating unit performs, on the seed value, a hash function as the one-way function, to generate the functional value.

9. The shared-key generation apparatus of claim 7, wherein the shared-key generating unit generates the verification value by setting a part of the functional value as the verification value, and generates the shared key by setting another part of the functional value as the shared key.

10. The shared-key generation apparatus of claim 5, wherein the shared-key generating unit performs a one-way function on the seed value to generate a functional value, and generates the verification value, the shared key, and a blind value, from the functional value.

11. The shared-key generation apparatus of claim 10, wherein the first encryption unit includes:
a public-key obtaining subunit configured to obtain a public key; and
a public-key encryption subunit configured to perform a public-key encryption algorithm on the verification value, using the public key and the blind value, to generate the first encryption information.

12. The shared-key generation apparatus of claim 11, wherein
the public-key encryption algorithm conforms to an NTRU cryptosystem,
the public-key obtaining subunit obtains a public-key polynomial generated according to a key-generation algorithm of the NTRU cryptosystem, as the public key, and
the public-key encryption subunit generates a verification-value polynomial from the verification value, generates a blind-value polynomial from the blind value, and encrypts the verification-value polynomial according to an encryption algorithm of the NTRU cryptosystem, using the public-key polynomial as a key, and using the blind-value polynomial to randomize the verification-value polynomial, to generate the first encryption information as a polynomial.

13. The shared-key generation apparatus of claim 5, wherein the first encryption unit includes:
a public-key obtaining subunit configured to obtain a public key; and
a public-key encryption subunit configured to perform a public-key encryption algorithm on the verification value, using the public key, to generate the first encryption information.

14. The shared-key generation apparatus of claim 13, wherein
the public-key encryption algorithm conforms to an NTRU cryptosystem,
the public-key obtaining subunit obtains a public-key polynomial generated according to a key-generation algorithm of the NTRU cryptosystem, as the public key, and
the public-key encryption subunit generates a verification-value polynomial from the verification value, generates a blind value, generates a blind-value polynomial from the blind value, and encrypts the verification-value polynomial according to an encryption algorithm of the NTRU cryptosystem, using the public-key polynomial as a key, and using the blind-value polynomial to randomize the verification-value polynomial, to generate the first encryption information as a polynomial.

15. The shared-key generation apparatus of claim 5, wherein the second encryption unit performs a one-way function on the verification value to generate a functional value, and performs an encryption algorithm, on the seed value, using the functional value, to generate the second encryption information.

16. The shared-key generation apparatus of claim 15, wherein
the second encryption unit performs bitwise exclusive-or as the encryption algorithm, on the functional value and the seed value, to generate the second encryption information.

17. The shared-key generation apparatus of claim 15, wherein
the second encryption unit performs a symmetric key encryption algorithm as the encryption algorithm, on the functional value and the seed value, to generate the second encryption information.

18. The shared-key generation apparatus of claim 15, wherein
the second encryption unit performs addition as the encryption algorithm, on the functional value and the seed value, to generate the second encryption information.

19. The shared-key generation apparatus of claim 15, wherein
the second encryption unit performs multiplication as the encryption algorithm, on the functional value and the seed value, to generate the second encryption information.

20. The shared-key generation apparatus of claim 15, wherein
the second encryption unit performs, on the verification value, a hash function as the one-way function, to generate the functional value.

21. The shared-key generation apparatus of claim 5, wherein
the second encryption unit performs an encryption algorithm on the seed value using the verification value, to generate the second encryption information.

22. The shared-key generation apparatus of claim 5, wherein
the second encryption unit encrypts the seed value using the verification value and the first encryption information.

23. The shared-key generation apparatus of claim 22, wherein
the second encryption unit performs a one-way function on the verification value and the first encryption information, to generate the functional value, and performs an encryption algorithm on the seed value using the functional value, to generate the second encryption information.

24. The shared-key generation apparatus of claim 23, wherein
the second encryption unit performs bitwise exclusive-or as the encryption algorithm, on the functional value and the seed value, to generate the second encryption information.

25. The shared-key generation apparatus of claim 5, further comprising:
an obtaining unit configured to obtain a content; and
an encryption unit configured to encrypt the obtained content using the shared key, to generate an encrypted content, wherein
the transmitting unit further transmits the encrypted content to the shared-key recovery apparatus.

26. A shared-key recovery apparatus that receives and stores in memory information regarding a shared key from a shared-key generation apparatus in secrecy, the shared-key generation apparatus generating a seed value, generating a verification value and a shared key from the seed value, encrypting the verification value to generate first encryption information, encrypting the seed value based on the verification value to generate second encryption information, and transmitting to the shared-key recovery apparatus the first encryption information and the second encryption information without transmitting to the shared-key recovery apparatus the generated shared-key, the shared-key recovery apparatus comprising:
a receiving unit configured to receive from the shared-key generation apparatus the first encryption information and the second encryption information;

a first decryption unit configured to decrypt the first encryption information, to generate a first decryption verification value;

a second decryption unit configured to decrypt the second encryption information based on the first decryption verification value, to generate a decryption seed value;

a shared-key generating unit configured to generate a second decryption verification value and a decryption shared key, from the decryption seed value according to the same method as used in the shared-key generation apparatus;

a judging unit configured to judge whether the first decryption verification value generated from the received first encryption information is identical to the second decryption verification value generated from the decryption seed value, the decryption seed value being generated based on the received second encryption information and the first decryption verification value, and to judge that the decryption shared key is identical to the shared key generated in the shared-key generation apparatus if it is judged that the first decryption verification value is identical to the second decryption verification value, wherein the shared-key generation apparatus is distinct from the shared-key recovery apparatus, and wherein the first encryption information is distinct from the second encryption information.

27. The shared-key recovery apparatus of claim 26, wherein the shared-key generation apparatus obtains a public key, and performs a public-key encryption algorithm on the verification value, using the public key, to generate the first encryption information, and the first decryption unit includes:
  a secret-key obtaining subunit configured to obtain a secret key that corresponds to the public key; and
  a public-key decryption subunit configured to perform a public-key decryption algorithm on the first encryption information, to generate the first decryption verification value, the public-key decryption algorithm corresponding to the public-key encryption algorithm.

28. The shared-key recovery apparatus of claim 27, wherein the public-key encryption algorithm and the public-key decryption algorithm conform to an NTRU cryptosystem, the shared-key generation apparatus obtains, as the public key, a public-key polynomial generated according to a key-generation algorithm of the NTRU cryptosystem, generates a verification-value polynomial from the verification value, generates a blind value, generates a blind-value polynomial from the blind value, and encrypts the verification-value polynomial according to an encryption algorithm of the NTRU cryptosystem, using the public-key polynomial as a key, and using the blind-value polynomial to randomize the verification-value polynomial, to generate the first encryption information as a polynomial, the receiving unit receives the first encryption information as a polynomial, the secret-key obtaining subunit obtains, as the secret key, a secret-key polynomial generated according to the key-generation algorithm of the NTRU cryptosystem, and the public-key decryption subunit decrypts the first encryption information as a polynomial, according to a decryption algorithm corresponding to the NTRU cryptosystem's encryption algorithm, using the secret-key polynomial as a key, to generate a decryption verification-value polynomial, and generates the first decryption verification value from the decryption verification-value polynomial.

29. The shared-key recovery apparatus of claim 26, wherein the shared-key generation apparatus performs a one-way function on the verification value, to generate a functional value, and performs an encryption algorithm on the seed value using the functional value, to generate the second encryption information, and the second decryption unit performs the one-way function on the first decryption verification value, to generate a decryption functional value, and performs, on the second encryption information, a decryption algorithm corresponding to the encryption algorithm, using the decryption functional value, to generate the decryption seed value.

30. The shared-key recovery apparatus of claim 29, wherein the shared-key generation apparatus performs, on the functional value and the seed value, bitwise exclusive-or as the encryption algorithm, to generate the second encryption information, and the second decryption unit performs, on the decryption functional value and the second encryption information, bitwise exclusive-or as the decryption algorithm, to generate the decryption seed value.

31. The shared-key recovery apparatus of claim 29, wherein the shared-key generation apparatus performs, on the functional value and the seed value, a symmetric key encryption algorithm as the encryption algorithm, to generate the second encryption information, and the second decryption unit performs, on the decryption functional value and the second encryption information, a symmetric key decryption algorithm as the decryption algorithm, to generate the decryption seed value, the symmetric key decryption algorithm corresponding to the symmetric key encryption algorithm.

32. The shared-key recovery apparatus of claim 29, wherein the shared-key generation apparatus performs, on the functional value and the seed value, addition as the encryption algorithm, to generate the second encryption information, and the second decryption unit performs, on the decryption functional value and the second encryption information, subtraction as the decryption algorithm, to generate the decryption seed value.

33. The shared-key recovery apparatus of claim 29, wherein the shared-key generation apparatus performs, on the functional value and the seed value, multiplication as the encryption algorithm, to generate the second encryption information, and the second decryption unit performs, on the decryption functional value and the second encryption information, division as the decryption algorithm, to generate the decryption seed value.

34. The shared-key recovery apparatus of claim 29, wherein the shared-key generation apparatus performs, on the verification value, a hash function as the one-way function, to generate the functional value, and the second decryption unit performs, on the first decryption verification value, the hash function as the one-way function, to generate the decryption functional value.

35. The shared-key recovery apparatus of claim 26, wherein
the shared-key generation apparatus performs an encryption algorithm on the seed value using the verification value, to generate the second encryption information, and
the second decryption unit performs a decryption algorithm corresponding to the encryption algorithm, on the second encryption information using the first decryption verification value, to generate the decryption seed value.

36. The shared-key recovery apparatus of claim 26, wherein
the shared-key generation apparatus encrypts the seed value using the verification value and the first encryption information, and
the second decryption unit decrypts the second encryption information, using the first decryption verification value and the first encryption information, to generate the decryption seed value.

37. The shared-key recovery apparatus of claim 36, wherein
the shared-key generation apparatus performs a one-way function on the verification value and the first encryption information, to generate a functional value, and performs an encryption algorithm on the seed value using the functional value, to generate the second encryption information, and
the second decryption unit performs the one-way function on the first decryption verification value and the first encryption information, to generate a decryption functional value, and performs a decryption algorithm corresponding to the encryption algorithm, on the second encryption information, using the decryption functional value, to generate the decryption seed value.

38. The shared-key recovery apparatus of claim 37, wherein the shared-key generation apparatus performs bitwise exclusive-or as the encryption algorithm, on the functional value and the seed value, to generate the second encryption information, and
the second decryption unit performs bitwise exclusive-or as the decryption algorithm, on the decryption functional value and the second encryption information, to generate the decryption seed value.

39. The shared-key recovery apparatus of claim 26, wherein
the shared-key generation apparatus performs a one-way function on the seed value, to generate a functional value, and generates the verification value and the shared key from the functional value, and
the shared-key generating unit performs the one-way function on the decryption seed value, to generate a decryption functional value, and generates the second decryption verification value and the decryption shared key from the decryption functional value.

40. The shared-key recovery apparatus of claim 39, wherein
the shared-key generation apparatus performs, on the seed value, a hash function as the one-way function, to generate the functional value, and
the shared-key generating unit performs, on the decryption seed value, the hash function as the one-way function, to generate the decryption functional value.

41. The shared-key recovery apparatus of claim 39, wherein
the shared-key generation apparatus generates the verification value by setting a part of the functional value as the verification value, and generates the shared key by setting another part of the functional value as the shared key, and
the shared-key generating unit generates the second decryption verification value by setting a part of the decryption functional value as the second decryption verification value, and generates the decryption shared key by setting another part of the decryption functional value as the decryption shared key.

42. The shared-key recovery apparatus of claim 26, wherein
the shared-key generation apparatus performs a one-way function on the seed value, to generate a functional value, generates the verification value, the shared key, and a blind value, from the functional value, obtains a public key, and performs a public-key encryption algorithm on the verification value, using the public key and the blind value, to generate the first encryption information, and
the shared-key generating unit performs the one-way function on the decryption seed value, to generate a decryption functional value, and generates, from the decryption functional value, the second decryption verification value, the decryption shared key, and the decryption blind value.

43. The shared-key recovery apparatus of claim 42, wherein
the shared-key generation apparatus obtains a public key, performs a public-key encryption algorithm on the verification value, using the public key and the blind value, to generate the first encryption information, and
the judging unit, instead of performing the judging based on the first decryption verification value and the second decryption verification value, includes:
a public-key obtaining subunit configured to obtain the public key;
a re-encryption subunit configured to perform the public-key encryption algorithm on one of the first decryption verification value and the second decryption verification value, using the public key and the decryption blind value, to generate re-encryption information; and
a judging subunit configured to judge, based on the first encryption information and the re-encryption information, whether the decryption shared key should be outputted or not.

44. The shared-key recovery apparatus of claim 43, wherein
the judging subunit compares the first encryption information and the re-encryption information, thereby judging that the decryption shared key should be outputted if the first encryption information is identical to the re-encryption information.

45. The shared-key recovery apparatus of claim 43, wherein
the public-key encryption algorithm conforms to an NTRU cryptosystem,
the shared-key generation apparatus obtains, as the public key, a public-key polynomial generated according to a key-generation algorithm of the NTRU cryptosystem, generates a verification-value polynomial from the verification value, generates a blind-value polynomial from the blind value, and encrypts the verification-value polynomial according to an encryption algorithm of the NTRU cryptosystem, using the public-key polynomial as a key, and using the blind-value polynomial to randomize the verification-value polynomial, to generate the first encryption information as a polynomial, the public-key obtaining subunit obtains the public-key polynomial, and the re-encryption subunit generates a decryption verification-value polynomial from the second decryption verification value, generates a decryption blind-value polynomial from the decryption blind value, and encrypts the decryption verification-value polynomial according to the encryption algorithm of the NTRU cryptosystem, using the public-key polynomial as a key, and using the decryption blind-value polynomial to randomize the decryption verification-value polynomial, to generate the re-encryption information as a polynomial.

46. The shared-key recovery apparatus of claim 26, wherein the judging unit compares the first decryption verification value and the second decryption verification value, thereby judging that the decryption shared key should be outputted if the first decryption verification value is identical to the second decryption verification value.

47. The shared-key recovery apparatus of claim 26, wherein the shared-key generation apparatus further obtains a content, encrypts the content using the shared key to generate an encrypted content, and transmits the encrypted content, the receiving unit further receives the encrypted content, and the shared-key recovery apparatus further comprises:
a decryption unit configured to decrypt the received encrypted content using the decryption shared key, to generate a decrypted content; and
an outputting unit configured to output the decrypted content.

48. A shared-key generating method used in a shared-key generation apparatus, the shared-key generating method comprising:

generating a seed value;

generating a verification value and a shared key, from the seed value;

encrypting the verification value to generate first encryption information;

encrypting the seed value based on the verification value, to generate second encryption information; and transmitting to a shared-key recovery apparatus the first encryption information and the second encryption information without transmitting to the shared-key recovery apparatus the generated shared-key, wherein the shared-key recovery apparatus decrypts the first encryption information to generate a first decryption verification value, decrypts the second encryption information based on the first decryption verification value to generate a decryption seed value, generates a second decryption verification value and a decryption shared key from the decryption seed value according to the same method as used in the shared-key generating unit of the shared-key generation apparatus, judges whether the first decryption verification value is identical to the second decryption verification value, and judges that the generated decryption shared key is identical to the shared key generated in the shared-key generation apparatus if it is judged that the first decryption verification value is identical to the second decryption verification value, wherein the shared-key generation apparatus is distinct from the shared-key recovery apparatus, and wherein the first encryption information is distinct from the second encryption information.

49. A shared-key generating program used in a shared-key generation apparatus, the shared-key generating program causing the shared-key generation apparatus to perform a method comprising:

generating a seed value;

generating a verification value and a shared key, from the seed value;

encrypting the verification value to generate first encryption information;

encrypting the seed value based on the verification value, to generate second encryption information; and transmitting to a shared-key recovery apparatus the first encryption information and the second encryption information without transmitting to the shared-key recovery apparatus the generated shared-key, wherein the shared-key recovery apparatus decrypts the first encryption information to generate a first decryption verification value, decrypts the second encryption information based on the first decryption verification value to generate a decryption seed value, generates a second decryption verification value and a decryption shared key from the decryption seed value according to the same method as used in the shared-key generating unit of the shared-key generation apparatus, judges whether the first decryption verification value is identical to the second decryption verification value, and judges that the generated decryption shared key is identical to the shared key generated in the shared-key generation apparatus if it is judged that the first decryption verification value is identical to the second decryption verification value, wherein the shared-key generation apparatus is distinct from the shared-key recovery apparatus, and wherein the first encryption information is distinct from the second encryption information.

50. A shared-key recovery method used in a shared-key recovery apparatus that receives information regarding a shared key from a shared-key generation apparatus in secrecy, the shared-key generation apparatus generating a seed value, generating a verification value and a shared key from the seed value, encrypting the verification value to generate first encryption information, encrypting the seed value based on the verification value to generate second encryption information, and transmitting to the shared-key recovery apparatus the first encryption information and the second encryption information without transmitting to the shared-key recovery apparatus the generated shared-key, the shared-key recovery method comprising:

receiving from the shared-key generation apparatus the first encryption information and the second encryption information;

decrypting the first encryption information, to generate a first decryption verification value;

decrypting the second encryption information based on the first decryption verification value, to generate a decryption seed value;

generating a second decryption verification value and a decryption shared key, from the decryption seed value according to the same method as used in the shared-key generation apparatus;

judging whether the first decryption verification value generated from the received first encryption information is identical to the second decryption verification value generated from the decryption seed value, the decryption seed value being generated based on the received second encryption information and the first decryption verification value; and judging that the generated decryption shared key is identical to the shared key generated in the shared-key generation apparatus if it is judged that the first decryption verification value is identical to the second decryption verification value, wherein the shared-key generation apparatus is distinct from the shared-key recovery apparatus, and wherein the first encryption information is distinct from the second encryption information.

51. A shared-key recovery program used in a shared-key recovery apparatus that receives information regarding a shared key from a shared-key generation apparatus in secrecy, the shared-key generation apparatus generating a seed value, generating a verification value and a shared key from the seed value, encrypting the verification value to generate first encryption information, encrypting the seed value based on the verification value to generate second encryption information, and transmitting to the shared-key recovery apparatus the first encryption information and the second encryption information without transmitting to the shared-key recovery apparatus the generated shared-key, the shared-key recovery program causing the shared-key recovery apparatus to perform a method comprising:

receiving from the shared-key generation apparatus the first encryption information and the second encryption information;

decrypting the first encryption information, to generate a first decryption verification value;

decrypting the second encryption information based on the first decryption verification value, to generate a decryption seed value;

generating a second decryption verification value and a decryption shared key, from the decryption seed value according to the same method as used in the shared-key generation apparatus;

judging whether the first decryption verification value generated from the received first encryption information is identical to the second decryption verification value generated from the decryption seed value, the decryption seed value being generated based on the received second encryption information and the first decryption verification value; and judging that the generated decryption shared key is identical to the shared key generated in the shared-key generation apparatus if it is judged that the first decryption verification value is identical to the second decryption verification value, wherein the shared-key generation apparatus is distinct from the shared-key recovery apparatus, and wherein the first encryption information is distinct from the second encryption information.

\* \* \* \* \*